United States Patent
Yang

(10) Patent No.: US 8,418,585 B2
(45) Date of Patent: *Apr. 16, 2013

(54) CLUTCH CONTROL REVERSIBLE TRANSMISSION WHEEL SYSTEM WITH BIDIRECTIONAL INPUT AND ONE-WAY OUTPUT

(76) Inventor: Tai-Her Yang, Dzan-Hwa (TW)

(*) Notice: Subject to any disclaimer, the term of this patent is extended or adjusted under 35 U.S.C. 154(b) by 545 days.

This patent is subject to a terminal disclaimer.

(21) Appl. No.: 12/699,124

(22) Filed: Feb. 3, 2010

(65) Prior Publication Data
US 2011/0190085 A1 Aug. 4, 2011

(51) Int. Cl.
*F16H 3/00* (2006.01)
(52) U.S. Cl.
USPC .......................................... 74/810.2; 74/319
(58) Field of Classification Search .......... 74/640, 74/665 R, 810.1, 319, 810.2, 361
See application file for complete search history.

(56) References Cited

U.S. PATENT DOCUMENTS

| 5,230,669 | A | * | 7/1993 | Tervola | 475/210 |
| 5,531,651 | A | * | 7/1996 | Yang | 475/12 |
| 5,540,629 | A | * | 7/1996 | Gotman | 475/248 |
| 5,607,369 | A | * | 3/1997 | Yang | 475/12 |
| 7,806,796 | B2 | * | 10/2010 | Zhu | 475/73 |
| 8,201,839 | B2 | * | 6/2012 | Yang | 280/238 |
| 2006/0032322 | A1 | * | 2/2006 | Yang | 74/393 |
| 2011/0177902 | A1 | * | 7/2011 | Yang | 475/12 |
| 2011/0185849 | A1 | * | 8/2011 | Yang | 74/810.1 |

* cited by examiner

*Primary Examiner* — Justin Holmes
(74) *Attorney, Agent, or Firm* — Bacon & Thomas, PLLC

(57) ABSTRACT

The clutch control reversible transmission wheel system with bidirectional input and one-way output relates to a transmission structure, wherein the drive rotary direction of the input shaft of the wheel system with bidirectional input and one-way output is changed to make the direction of the output of the output shaft to be constant, which is characterized by releasing the connectable or releasable clutch device installed between transmissions of the wheel system with bidirectional input and one-way output, the output shaft is moved reversely when reversely driven.

43 Claims, 20 Drawing Sheets

CLUTCH CONTROL REVERSIBLE TRANSMISSION WHEEL SYSTEM WITH BIDIRECTIONAL INPUT AND ONE-WAY OUTPUT

BACKGROUND OF THE INVENTION (a) Field of the Invention

The clutch control reversible transmission wheel system with bidirectional input and one-way output relates to a transmission structure, wherein the drive rotary direction of the input shaft of the wheel system with bidirectional input and one-way output is changed to make the direction of the output of the output shaft to be constant, which is characterized by controlling the release of the connectable or releasable clutch device installed between transmissions of the wheel system with bidirectional input and one-way output, the output shaft is moved reversely when reversely driven.

(b) Description of the Prior Art

The limitation of the conventional gear train with dual rotary direction input and constant rotary direction output is to be locked when the output side is reversely driven.

SUMMARY OF THE INVENTION

For the clutch control reversible transmission wheel system with bidirectional input and one-way output, a connectable or releasable clutch device is installed between the rotating parts of the wheel system with bidirectional input and one-way output thereof, for releasing the connectable or releasable clutch device, when the output shaft is driven by the external power source at reverse rotary direction, idling is produced between the transmissions of the wheel system with bidirectional input and one-way output, so as to prevent the wheel system from the conventional structural shortcoming of rigid lock status when the output shaft is driven by the external power source at reverse rotary direction in the wheel system with bidirectional input and one-way output.

Figure 1:
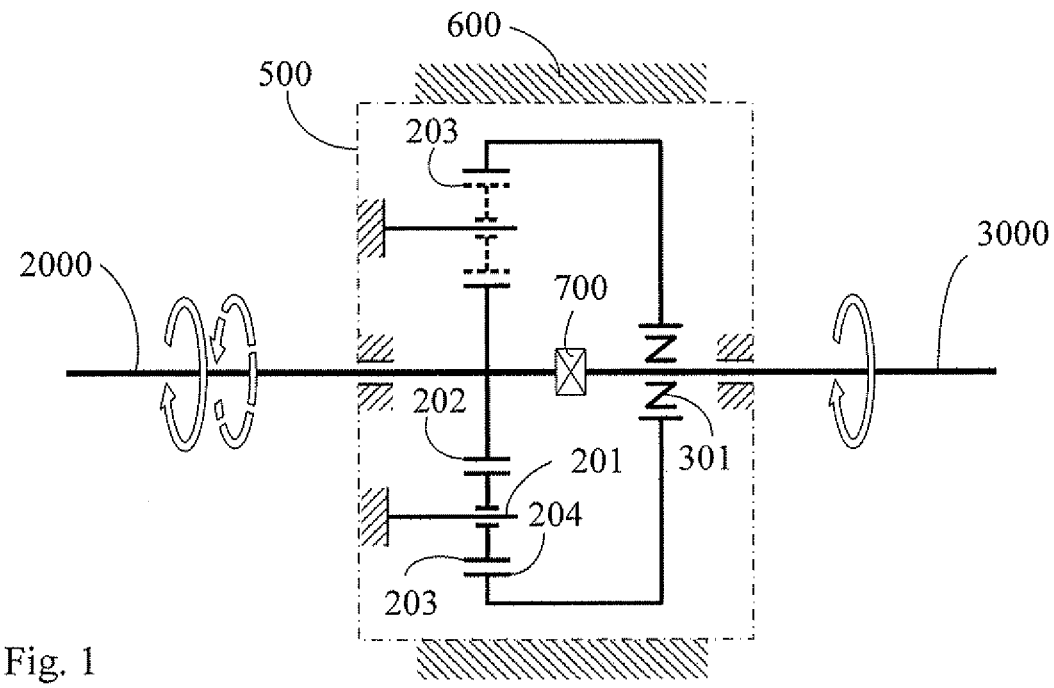
FIG. 1 is a structural schematic view showing the 1st embodiment of the clutch control reversible transmission wheel system with bidirectional input and one-way output constituted by the planetary gear train, according to the present invention.

DESCRIPTION OF MAIN COMPONENT SYMBOLS (202): Sun wheel
(203): Planetary wheel
(204): Outer wheel
(200): Planetary wheel support arm annular shelf
(201): Planetary wheel shaft
(301), (302), (303), (305): One-way transmission
(400): Epicyclic gear support arm annular shelf
(401): Epicyclic gear shaft
(402): Inner bevel wheel
(403): Epicyclic gear
(404): Outer bevel wheel
(500): Shell of the transmission gear train
(600): Machine body
(602), (603), (605), (606), (615), (616), (617): Transmission wheel
(604): Revolving shaft
(607): Transmission belt
(618): Revolving shaft
(700), (701): Connectable or releasable clutch device
(2000): Input shaft
(3000): Output shaft

DETAILED DESCRIPTION OF THE PREFERRED EMBODIMENTS

The limitation of the conventional gear train with dual rotary direction input and constant rotary direction output is to be locked when the output side is reversely driven.

For the clutch control reversible transmission wheel system with bidirectional input and one-way output, a connectable or releasable clutch device is installed between the rotating parts of the wheel system with bidirectional input and one-way output thereof, for releasing the connectable or releasable clutch device, when the output shaft is driven by the external power source at reverse rotary direction, idling is produced between the transmissions of the wheel system with bidirectional input and one-way output, so as to prevent the wheel system from the conventional structural shortcoming of rigid lock status when the output shaft is driven by the external power source at reverse rotary direction in the wheel system with bidirectional input and one-way output.

For the clutch control reversible transmission wheel system with bidirectional input and one-way output, the structural types include the input shaft and the output shaft coaxially installed in series, or the both coaxial fitting, or the both have different axes;

the main features are as following:

a connectable or releasable clutch device (700) is installed between the transmissions in power transmission chain from input end to output end of the wheel system with bidirectional input and one-way output, in the clutch control reversible transmission wheel system with bidirectional input and one-way output, including: 1) the radial or axial connectable or releasable clutch device (700) is installed between transmissions in power transmission chain from input end to output end of the first transmission gear train, and driven by the first rotary direction input; and/or 2) the radial or axial connectable or releasable clutch device (700) is coaxially installed between transmissions in power transmission chain from input end to output end of the second transmission gear train, and driven by the second rotary direction input;

by way of the connectable or releasable clutch device (700) installed between the transmissions of the wheel system with bidirectional input and one-way output, through releasing the connectable or releasable clutch device (700), to prevent the wheel system with bidirectional input and one-way output from the structural deficiency of rigid lock status when the input side is driven at reverse rotary direction by the output side;

the connectable or releasable clutch device (700) used to break away from or close up the drive status for the input end driven at the first rotary direction and/or the input end driven at the second rotary direction;

the wheel system with bidirectional input and one-way output constituted by the planetary gear train or the epicyclic gear train, which have the same functions, or by integrating with the transmissions with different rotary directions;

connectable or releasable clutch device (700): related to a clutch device driven to be connected or released by human power, or machine power, or aerodynamic force, or fluid power, or electromagnetic force;

transmission: constituted by gear, friction wheel, pulley, transmission belt group, sprocket, transmission chain group, transmission linkage, or rotary transmission actuated by liquid, for getting rotary output with same or different direction, and same or different speed ratio with rotary input;

the forward and reverse rotary power source deriving from one or more than one of the following power sources, including human power, machine power, electric motors, hydraulic motors or pneumatic motors; including:

(1) forward and reversely driven by human power; or
(2) forward and reversely driven by machine power; or
(3) forward and reversely driven by hydraulic or pneumatic current driving motors; or
(4) forward and reversely driven by electric motors; or
(5) driven at different directions by the rotary power sources from (1)~(4);

The operational features of the clutch control reversible transmission wheel system with bidirectional input and one-way output are as following:

the first rotary direction and the second rotary direction are reverse;

if the input end is driven by the first rotary direction, it is through the first transmission gear train to drive the output end to produce the first rotary direction output;

if the input end is driven by the second rotary direction, it is through the second transmission gear train to drive the output end to produce the first rotary direction output;

an one-way transmission is installed between the first transmission gear train and the second transmission gear train to avoid the interference from the second transmission gear train when the first transmission gear train is used to be the first rotary direction input and produces the first rotary direction output; and an one-way transmission is installed between the second transmission gear train and the first transmission gear train to avoid the interference from the first transmission gear train when the second transmission gear train is used to be the second rotary direction input and produces the first rotary direction output;

Some embodiments are provided as following to describe the enforceability of the clutch control reversible transmission wheel system with bidirectional input and one-way output, and the other embodiments with same functions are omitted:

The following are a variety of structural types of the clutch control reversible transmission wheel system with bidirectional input and one-way output, including:

A) as shown in FIGS. 1 to 14, which is constituted by the planetary gear train;

B) as shown in FIGS. 15 to 28, which is constituted by the epicyclic gear train; and C) as shown in FIGS. 29 to 40, which is constituted by integrating with the transmissions with different drive rotary directions.

The structural descriptions are as following:

For A: as shown in FIGS. 1 to 14, the clutch control reversible transmission wheel system with bidirectional input and one-way output is constituted by the planetary gear train, including:

FIG. 1 is a structural schematic view showing the 1st embodiment of the clutch control reversible transmission wheel system with bidirectional input and one-way output constituted by the planetary gear train, according to the present invention.

As shown in FIG. 1, the clutch control reversible transmission wheel system with bidirectional input and one-way output of the present invention is constituted by the planetary gear train with the input shaft and the output shaft coaxially installed in series, the main components including:

one end of an input shaft (2000) is through installed at one side of a shell of the transmission gear train (500) via a bearing structure, the other end of the input shaft (2000) and the output shaft (3000) are coaxially installed in series via the connectable or releasable clutch device (700), and a bearing is installed between the output shaft (3000) and the shell of the transmission gear train (500);

connectable or releasable clutch device (700): related to a mechanism driven to be connected or released by human power, or machine power, or aerodynamic force, or fluid power, or electromagnetic force;

shell of the transmission gear train (500): machine parts installed for constituting the clutch control reversible transmission wheel system with bidirectional input and one-way output;

machine body (600): a relatively static mechanism structure;

the input shaft (2000) is integrated with the sun wheel (202);

a planetary wheel (203) is installed between the outer wheel (204) and the sun wheel (202); the center of the planetary wheel (203) rotates at a planetary wheel shaft (201), and one end of the planetary wheel shaft (201) is fixed at the shell of the transmission gear train (500);

the shell of the transmission gear train (500) is fixed at the machine body (600);

an one-way transmission (301) is installed between the ring structure of the outer wheel (204) and the output shaft (3000);

the sun wheel (202), the planetary wheel (203), and the outer wheel (204) are constituted by gears or friction wheels;

the relation of the transmission ratio of the sun wheel (202) to drive the planetary wheel (203) includes acceleration, deceleration, or constant velocity;

the relation of the transmission ratio of the planetary wheel (203) to drive the outer wheel (204) includes acceleration, deceleration, or constant velocity;

by way of the above structures, the input shaft (2000) is driven at the first rotary direction, and is further through the connectable or releasable clutch device (700) for driving the output shaft (3000) to produce the first rotary direction output to constitute the first transmission gear train;

by way of the above structures, if the connectable or releasable clutch device (700) is locked, the input shaft (2000) is driven at the second rotary direction, and is through the sun wheel (202) for further driving the planetary wheel (203) and the outer wheel (204), and through the ring structure of the outer wheel (204) and the one-way transmission (301) for driving the output shaft (3000) to produce the first rotary direction output to constitute the second transmission gear train; and when reverse drive caused by back move occurs at the output shaft (3000), through releasing the connectable or releasable clutch device (700), the first transmission gear train and the second transmission gear train are prevented from lock status.

Figure 2:
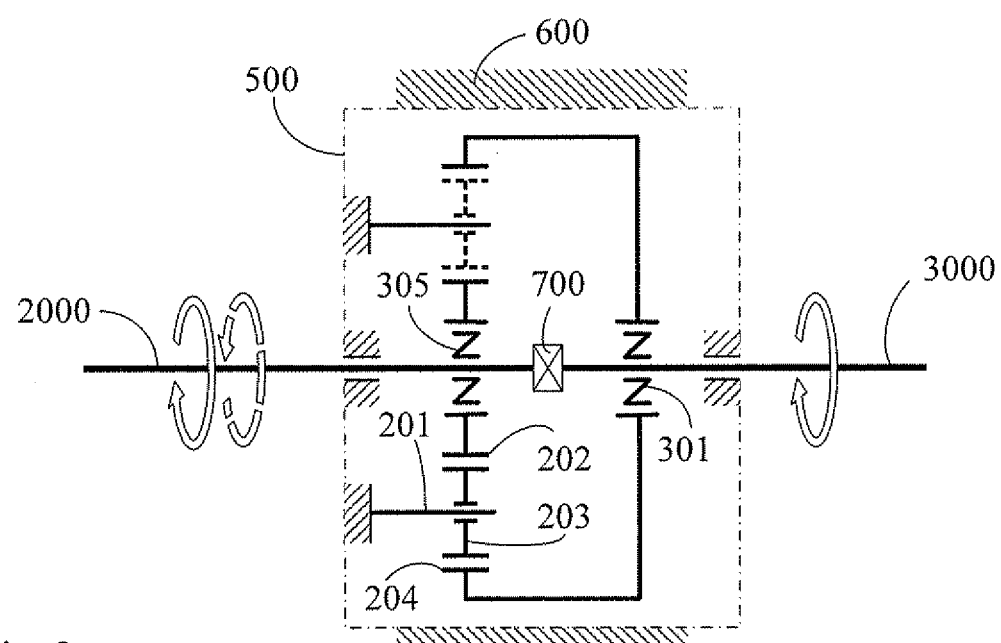
FIG. 2 is a structural schematic view showing the 2nd embodiment of the clutch control reversible transmission wheel system with bidirectional input and one-way output constituted by the planetary gear train, according to the present invention.

FIG. 2 is a structural schematic view showing the 2nd embodiment of the clutch control reversible transmission wheel system with bidirectional input and one-way output constituted by the planetary gear train, according to the present invention.

As shown in FIG. 2, the clutch control reversible transmission wheel system with bidirectional input and one-way output of the present invention is constituted by the planetary gear train with the input shaft and the output shaft coaxially installed in series, the main components including:

one end of an input shaft (2000) is through installed at one side of a shell of the transmission gear train (500) via a bearing structure, the other end of the input shaft (2000) and the output shaft (3000) are coaxially installed in series via the connectable or releasable clutch device (700), and a bearing is installed between the output shaft (3000) and the shell of the transmission gear train (500);

connectable or releasable clutch device (700): related to a mechanism driven to be connected or released by human power, or machine power, or aerodynamic force, or fluid power, or electromagnetic force;

shell of the transmission gear train (500): machine parts installed for constituting the clutch control reversible transmission wheel system with bidirectional input and one-way output;

machine body (600): a relatively static mechanism structure;

the input shaft (2000) is installed perforating through the sun wheel (202), and the one-way transmission (305) is installed between the above both;

a planetary wheel (203) is installed between the outer wheel (204) and the sun wheel (202); the center of the planetary wheel (203) rotates at a planetary wheel shaft (201), and one end of the planetary wheel shaft (201) is fixed at the shell of the transmission gear train (500);

the shell of the transmission gear train (500) is fixed at the machine body (600);

an one-way transmission (301) is installed between the ring structure of the outer wheel (204) and the output shaft (3000);

the sun wheel (202), the planetary wheel (203), and the outer wheel (204) are constituted by gears or friction wheels;

the relation of the transmission ratio of the sun wheel (202) to drive the planetary wheel (203) includes acceleration, deceleration, or constant velocity;

the relation of the transmission ratio of the planetary wheel (203) to drive the outer wheel (204) includes acceleration, deceleration, or constant velocity;

by way of the above structures, the input shaft (2000) is driven at the first rotary direction, and is further through the connectable or releasable clutch device (700) for driving the output shaft (3000) to produce the first rotary direction output to constitute the first transmission gear train;

by way of the above structures, if the connectable or releasable clutch device (700) is locked, the input shaft (2000) is driven at the second rotary direction, and is through the one-way transmission (305) for driving the sun wheel (202) and for further driving the planetary wheel (203) and the outer wheel (204), and through the ring structure of the outer wheel (204) and the one-way transmission (301) for driving the output shaft (3000) to produce the first rotary direction output to constitute the second transmission gear train; and when reverse drive caused by back move occurs at the output shaft (3000), through releasing the connectable or releasable clutch device (700), the first transmission gear train and the second transmission gear train are prevented from lock status.

Figure 3:
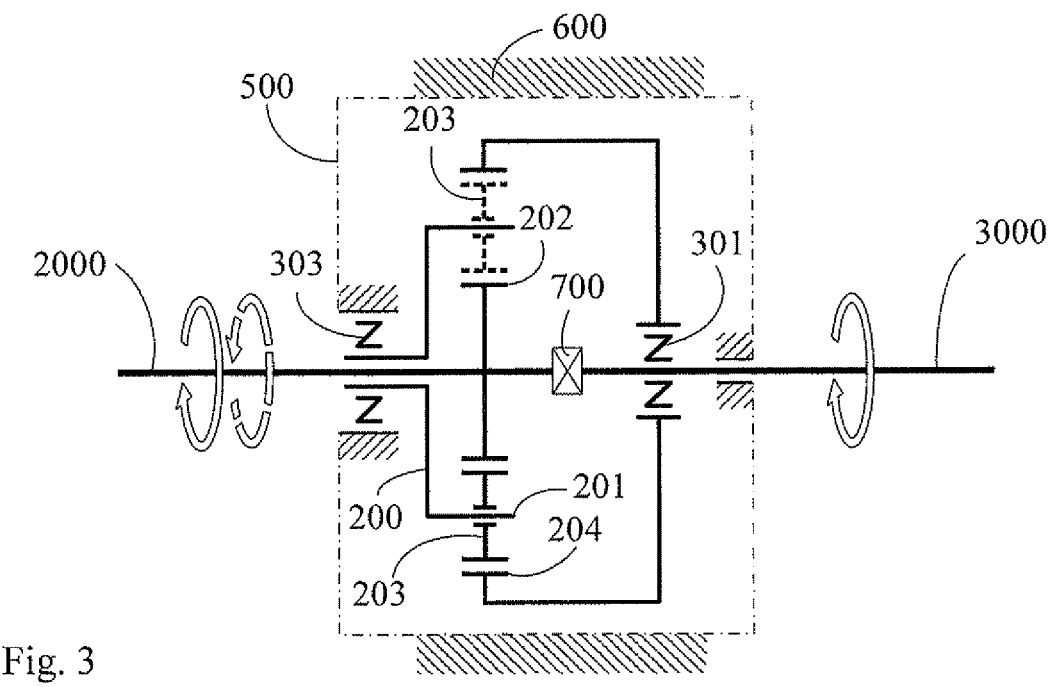
FIG. 3 is a structural schematic view showing the 3rd embodiment of the clutch control reversible transmission wheel system with bidirectional input and one-way output constituted by the planetary gear train, according to the present invention.

FIG. 3 is a structural schematic view showing the 3rd embodiment of the clutch control reversible transmission wheel system with bidirectional input and one-way output constituted by the planetary gear train, according to the present invention.

As shown in FIG. 3, the clutch control reversible transmission wheel system with bidirectional input and one-way output of the present invention is constituted by the planetary gear train with the input shaft and the output shaft coaxially installed in series, the main components including:

one end of the input shaft (2000) is through installed at one side of the shell of the transmission gear train (500) via the rotational structure of the planetary wheel support arm annular shelf (200) and the one-way transmission (303), the other end of the input shaft (2000) and the output shaft (3000) are coaxially installed in series via the connectable or releasable clutch device (700), and a bearing is installed between the output shaft (3000) and the shell of the transmission gear train (500);

connectable or releasable clutch device (700): related to a mechanism driven to be connected or released by human power, or machine power, or aerodynamic force, or fluid power, or electromagnetic force;

shell of the transmission gear train (500): machine parts installed for constituting the clutch control reversible transmission wheel system with bidirectional input and one-way output;

machine body (600): a relatively static mechanism structure;

the input shaft (2000) is integrated with the sun wheel (202);

the planetary wheel (203) is installed between the outer wheel (204) and the sun wheel (202); the center of the planetary wheel (203) rotates at the planetary wheel shaft (201), one end of the planetary wheel shaft (201) is integrated with the planetary wheel support arm annular shelf (200), and the planetary wheel support arm annular shelf (200) rotates between the input shaft (2000) and the one-way transmission (303);

the shell of the transmission gear train (500) is fixed at the machine body (600);

an one-way transmission (301) is installed between the ring structure of the outer wheel (204) and the output shaft (3000);

the sun wheel (202), the planetary wheel (203), and the outer wheel (204) are constituted by gears or friction wheels;

the relation of the transmission ratio of the sun wheel (202) to drive the planetary wheel (203) includes acceleration, deceleration, or constant velocity;

the relation of the transmission ratio of the planetary wheel (203) to drive the outer wheel (204) includes acceleration, deceleration, or constant velocity;

by way of the above structures, the input shaft (2000) is driven at the first rotary direction, and is further through the connectable or releasable clutch device (700) for driving the output shaft (3000) to produce the first rotary direction output to constitute the first transmission gear train;

by way of the above structures, if the connectable or releasable clutch device (700) is locked, the input shaft (2000) is driven at the second rotary direction, and is through the sun wheel (202) for further driving the planetary wheel (203) and the outer wheel (204), and through the ring structure of the outer wheel (204) and the one-way transmission (301) for driving the output shaft (3000) to produce the first rotary direction output to constitute the second transmission gear train; and when reverse drive caused by back move occurs at the output shaft (3000), through releasing the connectable or releasable clutch device (700), the first transmission gear train and the second transmission gear train are prevented from lock status.

Figure 4:
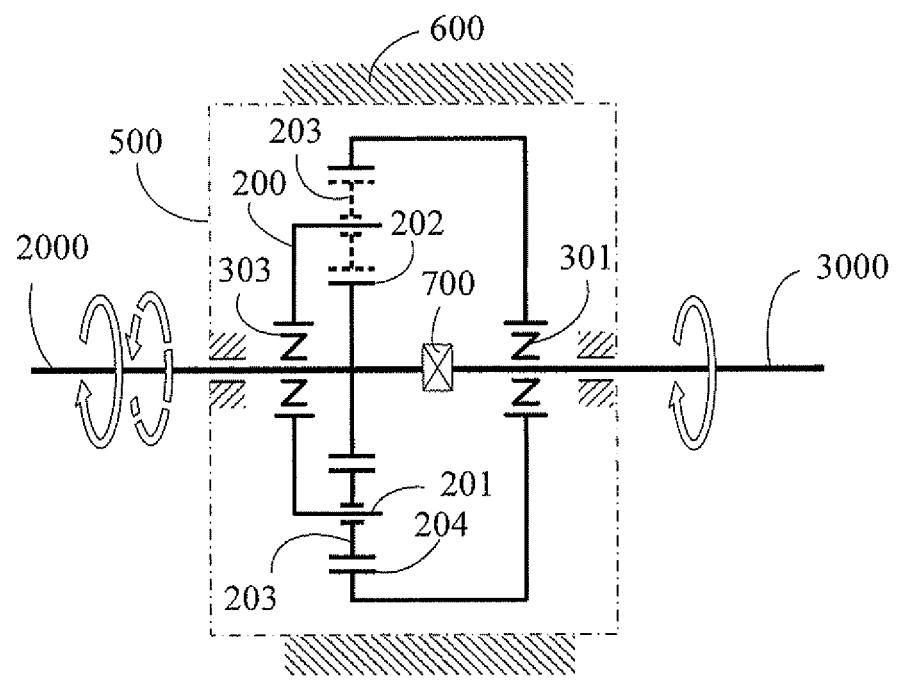
FIG. 4 is a structural schematic view showing the 4th embodiment of the clutch control reversible transmission wheel system with bidirectional input and one-way output constituted by the planetary gear train, according to the present invention.

FIG. 4 is a structural schematic view showing the 4th embodiment of the clutch control reversible transmission wheel system with bidirectional input and one-way output constituted by the planetary gear train, according to the present invention.

As shown in FIG. 4, the clutch control reversible transmission wheel system with bidirectional input and one-way output of the present invention is constituted by the planetary gear train with the input shaft and the output shaft coaxially installed in series, the main components including:

one end of an input shaft (2000) is through installed at one side of a shell of the transmission gear train (500) via a bearing structure, the other end of the input shaft (2000) and the output shaft (3000) are coaxially installed in series via the connectable or releasable clutch device (700), and a bearing is installed between the output shaft (3000) and the shell of the transmission gear train (500);

connectable or releasable clutch device (700): related to a mechanism driven to be connected or released by human power, or machine power, or aerodynamic force, or fluid power, or electromagnetic force;

shell of the transmission gear train (500): machine parts installed for constituting the clutch control reversible transmission wheel system with bidirectional input and one-way output;

machine body (600): a relatively static mechanism structure;

the input shaft (2000) is integrated with the sun wheel (202);

the planetary wheel (203) is installed between the outer wheel (204) and the sun wheel (202); the center of the planetary wheel (203) rotates at the planetary wheel shaft (201), one end of the planetary wheel shaft (201) is integrated with the planetary wheel support arm annular shelf (200), and the planetary wheel support arm annular shelf (200) rotates at the input shaft (2000) between the shell of the transmission gear train (500) and the sun wheel (202) via the one-way transmission (303);

the shell of the transmission gear train (500) is fixed at the machine body (600);

an one-way transmission (301) is installed between the ring structure of the outer wheel (204) and the output shaft (3000);

the sun wheel (202), the planetary wheel (203), and the outer wheel (204) are constituted by gears or friction wheels;

the relation of the transmission ratio of the sun wheel (202) to drive the planetary wheel (203) includes acceleration, deceleration, or constant velocity;

the relation of the transmission ratio of the planetary wheel (203) to drive the outer wheel (204) includes acceleration, deceleration, or constant velocity;

by way of the above structures, the input shaft (2000) is driven at the first rotary direction, and is further through the connectable or releasable clutch device (700) for driving the output shaft (3000) to produce the first rotary direction output to constitute the first transmission gear train;

by way of the above structures, if the connectable or releasable clutch device (700) is locked, the input shaft (2000) is driven at the second rotary direction, and is through driving the sun wheel (202) for further driving the planetary wheel (203) and the outer wheel (204), and through the ring structure of the outer wheel (204) and the one-way transmission (301) for driving the output shaft (3000) to produce the first rotary direction output to constitute the second transmission gear train; and when reverse drive caused by back move occurs at the output shaft (3000), through releasing the connectable or releasable clutch device (700), the first transmission gear train and the second transmission gear train are prevented from lock status.

Figure 5:
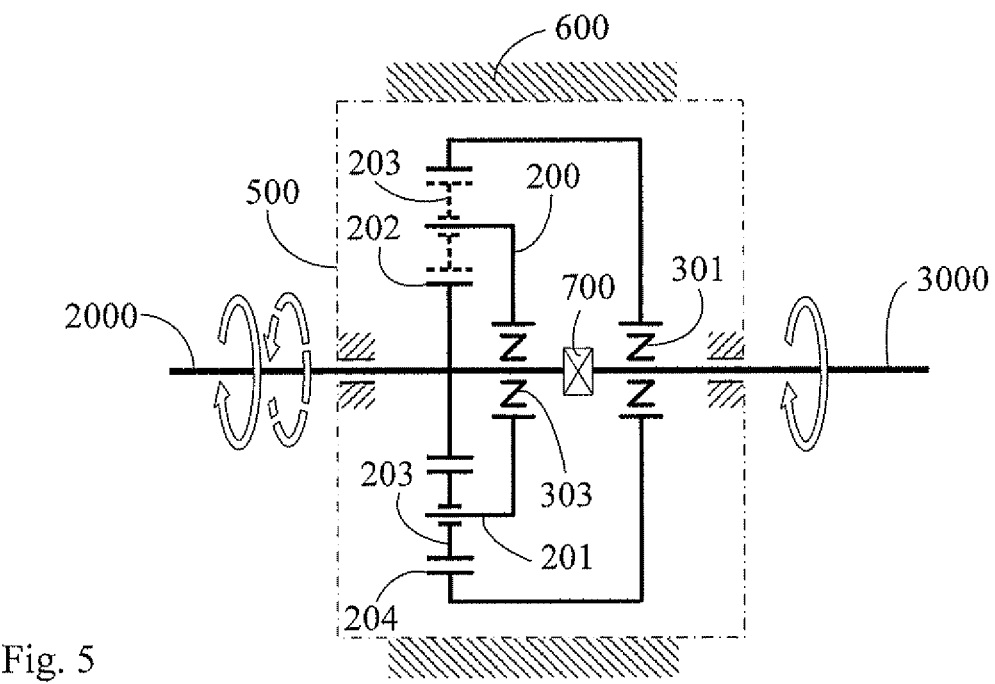
FIG. 5 is a structural schematic view showing the 5th embodiment of the clutch control reversible transmission wheel system with bidirectional input and one-way output constituted by the planetary gear train, according to the present invention.

FIG. 5 is a structural schematic view showing the 5th embodiment of the clutch control reversible transmission wheel system with bidirectional input and one-way output constituted by the planetary gear train, according to the present invention.

As shown in FIG. 5, the clutch control reversible transmission wheel system with bidirectional input and one-way output of the present invention is constituted by the planetary gear train with the input shaft and the output shaft coaxially installed in series, the main components including:

one end of an input shaft (2000) is through installed at one side of a shell of the transmission gear train (500) via a bearing structure, the other end of the input shaft (2000) and the output shaft (3000) are coaxially installed in series via the connectable or releasable clutch device (700), and a bearing is installed between the output shaft (3000) and the shell of the transmission gear train (500);

connectable or releasable clutch device (700): related to a mechanism driven to be connected or released by human power, or machine power, or aerodynamic force, or fluid power, or electromagnetic force;

shell of the transmission gear train (500): machine parts installed for constituting the clutch control reversible transmission wheel system with bidirectional input and one-way output;

machine body (600): a relatively static mechanism structure;

the input shaft (2000) is integrated with the sun wheel (202);

the planetary wheel (203) is installed between the outer wheel (204) and the sun wheel (202); the center of the planetary wheel (203) rotates at the planetary wheel shaft (201), the planetary wheel shaft (201) is integrated with the planetary wheel support arm annular shelf (200), and the planetary wheel support arm annular shelf (200) rotates at the input shaft (2000) between the connectable or releasable clutch device (700) and the sun wheel (202) via the one-way transmission (303);

the shell of the transmission gear train (500) is fixed at the machine body (600);

an one-way transmission (301) is installed between the ring structure of the outer wheel (204) and the output shaft (3000);

the sun wheel (202), the planetary wheel (203), and the outer wheel (204) are constituted by gears or friction wheels;

the relation of the transmission ratio of the sun wheel (202) to drive the planetary wheel (203) includes acceleration, deceleration, or constant velocity;

the relation of the transmission ratio of the planetary wheel (203) to drive the outer wheel (204) includes acceleration, deceleration, or constant velocity;

by way of the above structures, the input shaft (2000) is driven at the first rotary direction, and is further through the connectable or releasable clutch device (700) for driving the output shaft (3000) to produce the first rotary direction output to constitute the first transmission gear train;

by way of the above structures, if the connectable or releasable clutch device (700) is locked, the input shaft (2000) is driven at the second rotary direction, and is through the sun wheel (202) for further driving the planetary wheel (203) and the outer wheel (204), and through the ring structure of the outer wheel (204) and the one-way transmission (301) for driving the output shaft (3000) to produce the first rotary direction output to constitute the second transmission gear train; and when reverse drive caused by back move occurs at the output shaft (3000), through releasing the connectable or releasable clutch device (700), the first transmission gear train and the second transmission gear train are prevented from lock status.

Figure 6:
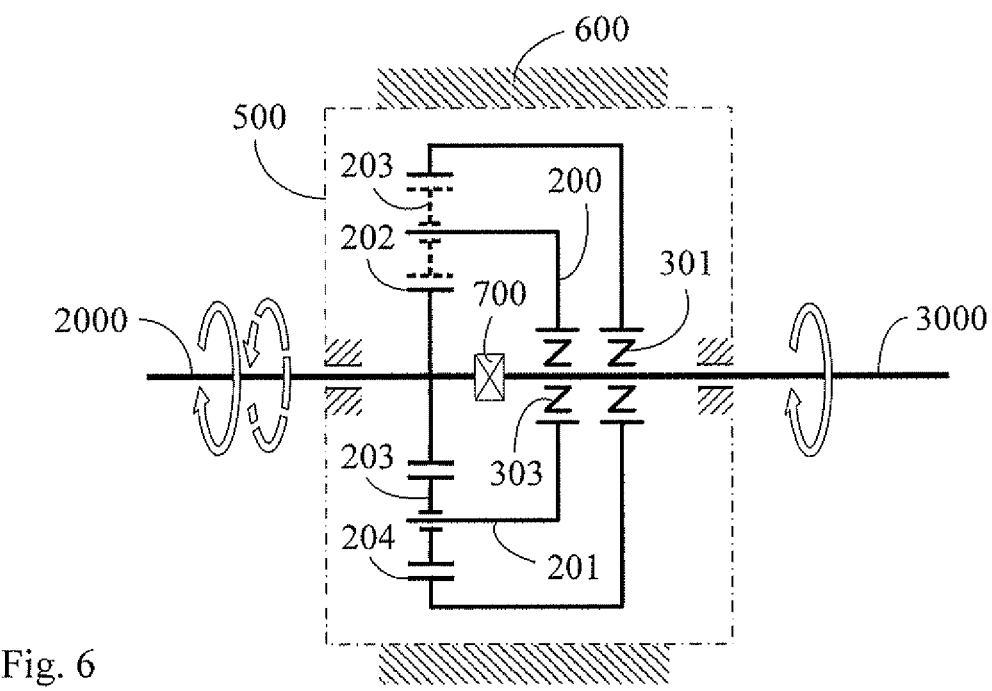
FIG. 6 is a structural schematic view showing the 6th embodiment of the clutch control reversible transmission wheel system with bidirectional input and one-way output constituted by the planetary gear train, according to the present invention.

FIG. 6 is a structural schematic view showing the 6th embodiment of the clutch control reversible transmission wheel system with bidirectional input and one-way output constituted by the planetary gear train, according to the present invention.

As shown in FIG. 6, the clutch control reversible transmission wheel system with bidirectional input and one-way output of the present invention is constituted by the planetary gear train with the input shaft and the output shaft coaxially installed in series, the main components including:

one end of an input shaft (2000) is through installed at one side of a shell of the transmission gear train (500) via a bearing structure, the other end of the input shaft (2000) and the output shaft (3000) are coaxially installed in series via the connectable or releasable clutch device (700), and a bearing is installed between the output shaft (3000) and the shell of the transmission gear train (500);

connectable or releasable clutch device (700): related to a mechanism driven to be connected or released by human power, or machine power, or aerodynamic force, or fluid power, or electromagnetic force;

shell of the transmission gear train (500): machine parts installed for constituting the clutch control reversible transmission wheel system with bidirectional input and one-way output;

machine body (600): a relatively static mechanism structure;

the input shaft (2000) is integrated with the sun wheel (202);

the planetary wheel (203) is installed between the outer wheel (204) and the sun wheel (202); the center of the planetary wheel (203) rotates at the planetary wheel shaft (201), one end of the planetary wheel shaft (201) is integrated with the planetary wheel support arm annular shelf (200), and the planetary wheel support arm annular shelf (200) rotates at the input shaft (2000) between the one-way transmission (301) and the connectable or releasable clutch device (700) via the one-way transmission (303);

the shell of the transmission gear train (500) is fixed at the machine body (600);

an one-way transmission (301) is installed between the ring structure of the outer wheel (204) and the output shaft (3000);

the sun wheel (202), the planetary wheel (203), and the outer wheel (204) are constituted by gears or friction wheels;

the relation of the transmission ratio of the sun wheel (202) to drive the planetary wheel (203) includes acceleration, deceleration, or constant velocity;

the relation of the transmission ratio of the planetary wheel (203) to drive the outer wheel (204) includes for acceleration, deceleration, or constant velocity;

by way of the above structures, the input shaft (2000) is driven at the first rotary direction, and is further through the connectable or releasable clutch device (700) for driving the output shaft (3000) to produce the first rotary direction output to constitute the first transmission gear train;

by way of the above structures, if the connectable or releasable clutch device (700) is locked, the input shaft (2000) is driven at the second rotary direction, and is through driving the sun wheel (202) for further driving the planetary wheel (203) and the outer wheel (204), and through the ring structure of the outer wheel (204) and the one-way transmission (301) for driving the output shaft (3000) to produce the first rotary direction output to constitute the second transmission gear train; and when reverse drive caused by back move occurs at the output shaft (3000), through releasing the connectable or releasable clutch device (700), the first transmission gear train and the second transmission gear train are prevented from lock status.

Figure 7:
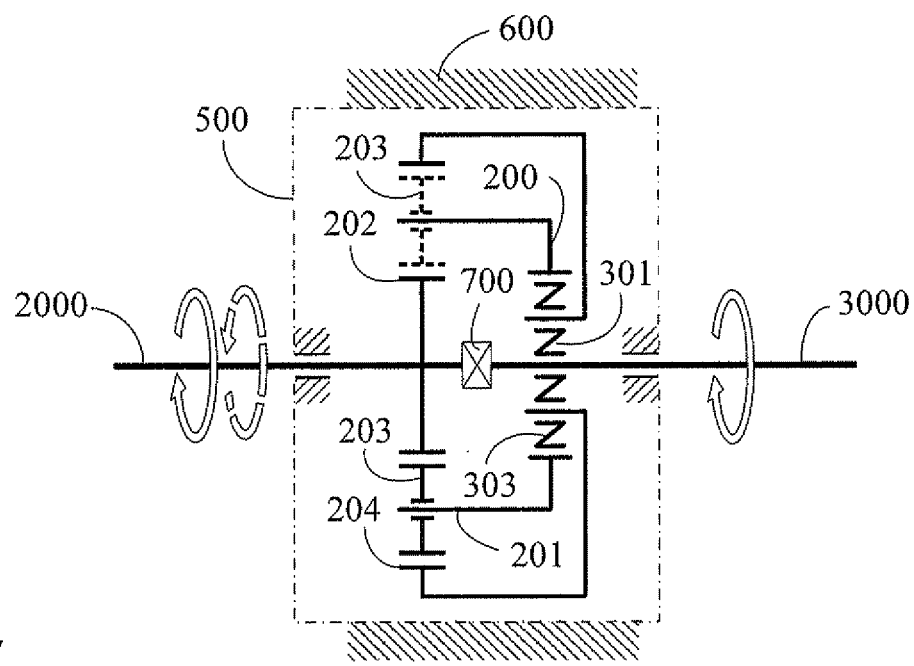
FIG. 7 is a structural schematic view showing the 7th embodiment of the clutch control reversible transmission wheel system with bidirectional input and one-way output constituted by the planetary gear train, according to the present invention.

FIG. 7 is a structural schematic view showing the 7th embodiment of the clutch control reversible transmission wheel system with bidirectional input and one-way output constituted by the planetary gear train, according to the present invention.

As shown in FIG. 7, the clutch control reversible transmission wheel system with bidirectional input and one-way output of the present invention is constituted by the planetary gear train with the input shaft and the output shaft coaxially installed in series, the main components including:

one end of an input shaft (2000) is through installed at one side of a shell of the transmission gear train (500) via a bearing structure, the other end of the input shaft (2000) and the output shaft (3000) are coaxially installed in series via the connectable or releasable clutch device (700), and a bearing is installed between the output shaft (3000) and the shell of the transmission gear train (500);

connectable or releasable clutch device (700): related to a mechanism driven to be connected or released by human power, or machine power, or aerodynamic force, or fluid power, or electromagnetic force;

shell of the transmission gear train (500): machine parts installed for constituting the clutch control reversible transmission wheel system with bidirectional input and one-way output;

machine body (600): a relatively static mechanism structure;

the input shaft (2000) is integrated with the sun wheel (202);

the planetary wheel (203) is installed between the outer wheel (204) and the sun wheel (202); the center of the planetary wheel (203) rotates at the planetary wheel shaft (201), one end of the planetary wheel shaft (201) is integrated with the planetary wheel support arm annular shelf (200), the planetary wheel support arm annular shelf (200) via the one-way transmission (303) rotates at the ring structure of the outer wheel (204), surrounded installed to the one-way transmission (301), and the one-way transmission (301) rotates at the output shaft (3000);

the shell of the transmission gear train (500) is fixed at the machine body (600);

an one-way transmission (301) is installed between the ring structure of the outer wheel (204) and the output shaft (3000);

the sun wheel (202), the planetary wheel (203), and the outer wheel (204) are constituted by gears or friction wheels;

the relation of the transmission ratio of the sun wheel (202) to drive the planetary wheel (203) includes acceleration, deceleration, or constant velocity;

the relation of the transmission ratio of the planetary wheel (203) to drive the outer wheel (204) includes acceleration, deceleration, or constant velocity;

by way of the above structures, the input shaft (2000) is driven at the first rotary direction, and is further through the connectable or releasable clutch device (700) for driving the output shaft (3000) to produce the first rotary direction output to constitute the first transmission gear train;

by way of the above structures, if the connectable or releasable clutch device (700) is locked, the input shaft (2000) is driven at the second rotary direction, and is through the sun wheel (202) for further driving the planetary wheel (203) and the outer wheel (204), and through the ring structure of the outer wheel (204) and the one-way transmission (301) for driving the output shaft (3000) to produce the first rotary direction output to constitute the second transmission gear train; and when reverse drive caused by back move occurs at the output shaft (3000), through releasing the connectable or releasable clutch device (700), the first transmission gear train and the second transmission gear train are prevented from lock status.

Figure 8:
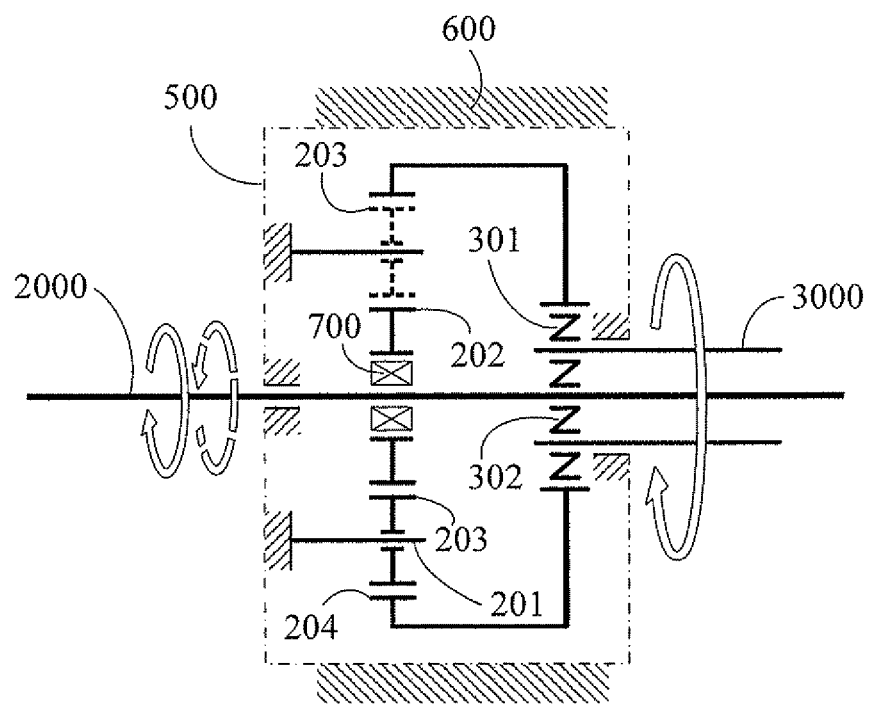
FIG. 8 is a structural schematic view showing the 8th embodiment of the clutch control reversible transmission wheel system with bidirectional input and one-way output constituted by the planetary gear train, according to the present invention.

FIG. 8 is a structural schematic view showing the 8th embodiment of the clutch control reversible transmission wheel system with bidirectional input and one-way output constituted by the planetary gear train, according to the present invention.

As shown in FIG. 8, the clutch control reversible transmission wheel system with bidirectional input and one-way output of the present invention is constituted by the planetary gear train with the input shaft and the output shaft coaxial fitting, the main components including:

one end of the input shaft (2000) is through installed at one side of the shell of the transmission gear train (500) via a bearing structure, the other end of the input shaft (2000) is perforating through the output shaft (3000) via the one-way transmission (302), and a bearing is installed between the output shaft (3000) and the shell of the transmission gear train (500);

connectable or releasable clutch device (700): related to a mechanism driven to be connected or released by human power, or machine power, or aerodynamic force, or fluid power, or electromagnetic force;

shell of the transmission gear train (500): machine parts installed for constituting the clutch control reversible transmission wheel system with bidirectional input and one-way output;

machine body (600): a relatively static mechanism structure;

the input shaft (2000) is integrated with the sun wheel (202) via the connectable or releasable clutch device (700);

the planetary wheel (203) is installed between the outer wheel (204) and the sun wheel (202); the center of the planetary wheel (203) rotates at the planetary wheel shaft (201), and one end of the planetary wheel shaft (201) is fixed at the shell of the transmission gear train (500);

the shell of the transmission gear train (500) is fixed at the machine body (600);

an one-way transmission (301) is installed between the ring structure of the outer wheel (204) and the output shaft (3000);

the sun wheel (202), the planetary wheel (203), and the outer wheel (204) are constituted by gears or friction wheels;

the relation of the transmission ratio of the sun wheel (202) to drive the planetary wheel (203) includes acceleration, deceleration, or constant velocity;

the relation of the transmission ratio of the planetary wheel (203) to drive the outer wheel (204) includes acceleration, deceleration, or constant velocity;

by way of the above structures, the input shaft (2000) is driven at the first rotary direction, and is further through the one-way transmission (302) for driving the output shaft (3000) to produce the first rotary direction output to constitute the first transmission gear train;

by way of the above structures, if the connectable or releasable clutch device (700) is locked, the input shaft (2000) is driven at the second rotary direction, and is through the sun wheel (202) for further driving the planetary wheel (203) and the outer wheel (204), and through the ring structure of the outer wheel (204) and the one-way transmission (301) for driving the output shaft (3000) to produce the first rotary direction output to constitute the second transmission gear train; and when reverse drive caused by back move occurs at the output shaft (3000), through releasing the connectable or releasable clutch device (700), the first transmission gear train and the second transmission gear train are prevented from lock status.

Figure 9:
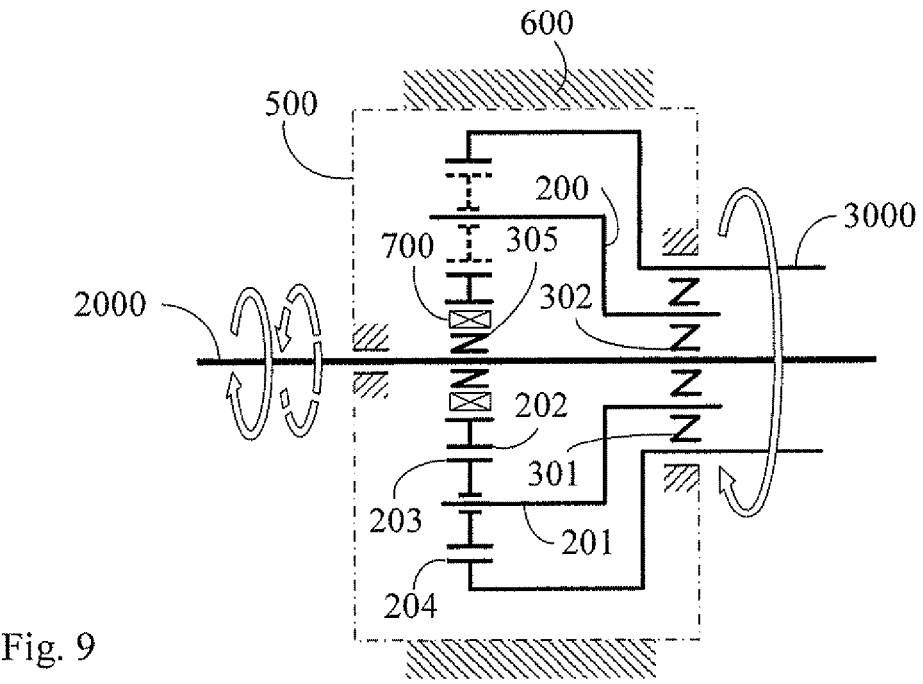
FIG. 9 is a structural schematic view showing the 9th embodiment of the clutch control reversible transmission wheel system with bidirectional input and one-way output constituted by the planetary gear train, according to the present invention.

FIG. 9 is a structural schematic view showing the 9th embodiment of the clutch control reversible transmission wheel system with bidirectional input and one-way output constituted by the planetary gear train, according to the present invention.

As shown in FIG. 9, the clutch control reversible transmission wheel system with bidirectional input and one-way output of the present invention is constituted by the planetary gear train with the input shaft and the output shaft coaxial fitting, the main components including:

one end of the input shaft (2000) is through installed at one side of the shell of the transmission gear train (500) via a bearing structure, the other end of the input shaft (2000) is via the one-way transmission (302) and the planetary wheel support arm annular shelf (200), which are coaxial fitting, and the one-way transmission (301) perforating through the output shaft (3000), and a bearing is installed between the output shaft (3000) and the shell of the transmission gear train (500);

connectable or releasable clutch device (700): related to a mechanism driven to be connected or released by human power, or machine power, or aerodynamic force, or fluid power, or electromagnetic force;

shell of the transmission gear train (500): machine parts installed for constituting the clutch control reversible transmission wheel system with bidirectional input and one-way output;

machine body (600): a relatively static mechanism structure;

the input shaft (2000) perforates through the one-way transmission (305), and the connectable or releasable clutch device (700) is installed between the sun wheel (202) and the one-way transmission (305);

the planetary wheel (203) is installed between the outer wheel (204) and the sun wheel (202); the center of the planetary wheel (203) rotates at the planetary wheel shaft (201), one end of the planetary wheel shaft (201) is integrated with the planetary wheel support arm annular shelf (200), and the planetary wheel support arm annular shelf (200) is arranged for rotating between the one-way transmission (301) and the one-way transmission (302);

the shell of the transmission gear train (500) is fixed at the machine body (600);

an one-way transmission (301) is installed between the ring structure of the outer wheel (204) and the output shaft (3000);

the sun wheel (202), the planetary wheel (203), and the outer wheel (204) are constituted by gears or friction wheels;

the relation of the transmission ratio of the sun wheel (202) to drive the planetary wheel (203) includes acceleration, deceleration, or constant velocity;

the relation of the transmission ratio of the planetary wheel (203) to drive includes acceleration, deceleration, or constant velocity;

by way of the above structures, the input shaft (2000) is driven at the first rotary direction, and is through the coaxial fitting one-way transmission (302), the planetary wheel support arm annular shelf (200) and the one-way transmission (301) driving the output shaft (3000) to produce the first rotary direction output to constitute the first transmission gear train;

by way of the above structures, if the connectable or releasable clutch device (700) is locked, the input shaft (2000) is driven at the second rotary direction, and is through the one-way transmission (305) and the sun wheel (202) for further driving the planetary wheel (203) and the outer wheel (204), and through the ring structure of the outer wheel (204) for driving the output shaft (3000) to produce the first rotary direction output to constitute the second transmission gear train; and when reverse drive caused by back move occurs at the output shaft (3000), through releasing the connectable or releasable clutch device (700), the first transmission gear train and the second transmission gear train are prevented from lock status.

Figure 10:
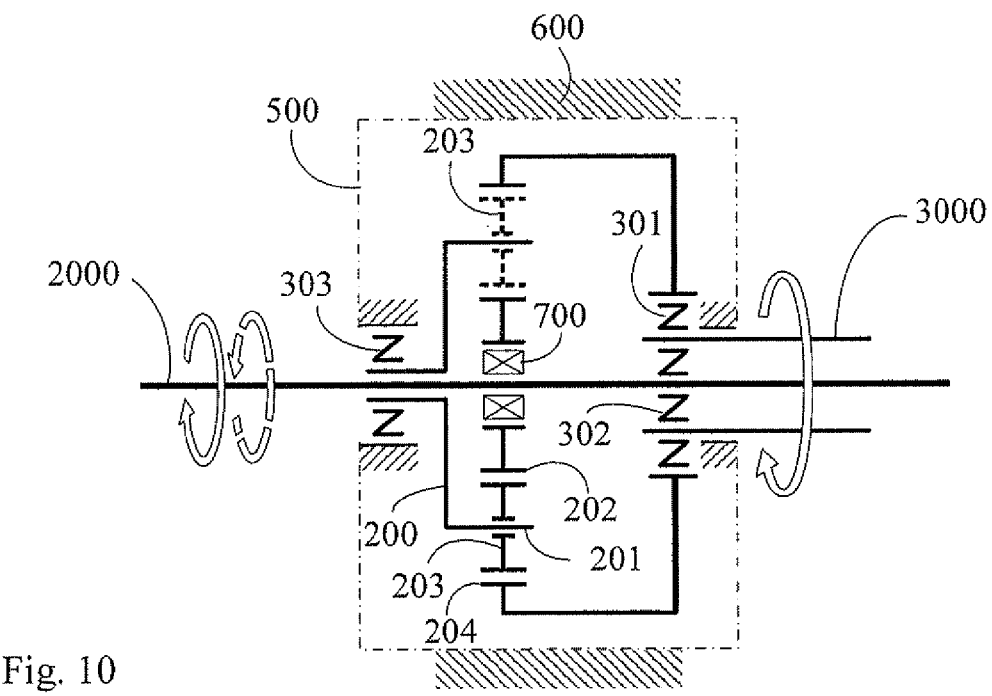
FIG. 10 is a structural schematic view showing the 10th embodiment of the clutch control reversible transmission wheel system with bidirectional input and one-way output constituted by the planetary gear train, according to the present invention.

FIG. 10 is a structural schematic view showing the 10th embodiment of the clutch control reversible transmission wheel system with bidirectional input and one-way output constituted by the planetary gear train, according to the present invention.

As shown in FIG. 10, the clutch control reversible transmission wheel system with bidirectional input and one-way output of the present invention is constituted by the planetary gear train with the input shaft and the output shaft coaxial fitting, the main components including:

one end of the input shaft (2000) is through installed at one side of the shell of the transmission gear train (500) via the rotational structure of the planetary wheel support arm annular shelf (200) and the one-way transmission (303), the other end of the input shaft (2000) is perforating through the output shaft (3000) via the one-way transmission (302), and a bearing is installed between the output shaft (3000) and the shell of the transmission gear train (500);

connectable or releasable clutch device (700): related to a mechanism driven to be connected or released by human power, or machine power, or aerodynamic force, or fluid power, or electromagnetic force;

shell of the transmission gear train (500): machine parts installed for constituting the clutch control reversible transmission wheel system with bidirectional input and one-way output;

machine body (600): a relatively static mechanism structure;

the input shaft (2000) is integrated with the sun wheel (202) via the connectable or releasable clutch device (700);

the planetary wheel (203) is installed between the outer wheel (204) and the sun wheel (202); the center of the planetary wheel (203) rotates at the planetary wheel shaft (201), one end of the planetary wheel shaft (201) is integrated with the planetary wheel support arm annular shelf (200), and the planetary wheel support arm annular shelf (200) is arranged to rotate between the input shaft (2000) and the one-way transmission (303);

the shell of the transmission gear train (500) is fixed at the machine body (600);

an one-way transmission (301) is installed between the ring structure of the outer wheel (204) and the output shaft (3000);

the sun wheel (202), the planetary wheel (203), and the outer wheel (204) are constituted by gears or friction wheels;

the relation of the transmission ratio of the sun wheel (202) to drive the planetary wheel (203) includes acceleration, deceleration, or constant velocity;

the relation of the transmission ratio of the planetary wheel (203) to drive the outer wheel (204) includes acceleration, deceleration, or constant velocity;

by way of the above structures, the input shaft (2000) is driven at the first rotary direction, and is further through the one-way transmission (302) for driving the output shaft (3000) to produce the first rotary direction output to constitute the first transmission gear train;

by way of the above structures, if the connectable or releasable clutch device (700) is locked, the input shaft (2000) is driven at the second rotary direction, and is through the sun wheel (202) for further driving the planetary wheel (203) and the outer wheel (204), and through the ring structure of the outer wheel (204) and the one-way transmission (301) for driving the output shaft (3000) to produce the first rotary direction output to constitute the second transmission gear train; and when reverse drive caused by back move occurs at the output shaft (3000), through releasing the connectable or releasable clutch device (700), the first transmission gear train and the second transmission gear train are prevented from lock status.

Figure 11:
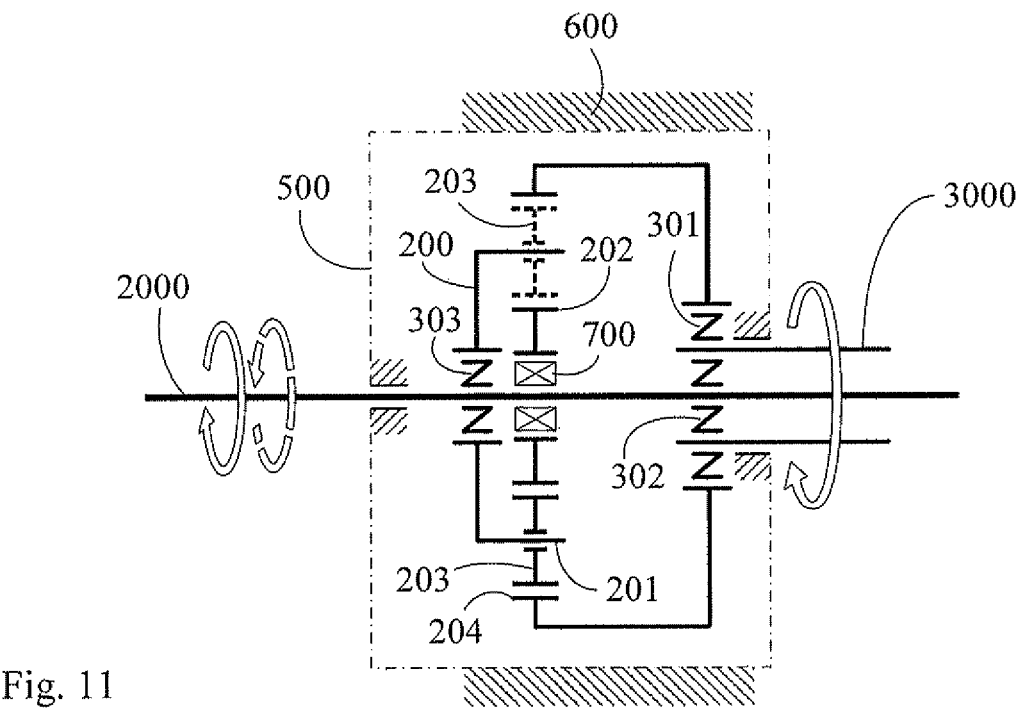
FIG. 11 is a structural schematic view showing the 11th embodiment of the clutch control reversible transmission wheel system with bidirectional input and one-way output constituted by the planetary gear train, according to the present invention.

FIG. 11 is a structural schematic view showing the 11th embodiment of the clutch control reversible transmission wheel system with bidirectional input and one-way output constituted by the planetary gear train, according to the present invention.

As shown in FIG. 11, the clutch control reversible transmission wheel system with bidirectional input and one-way output of the present invention is constituted by the planetary gear train with the input shaft and the output shaft coaxial fitting, the main components including:

one end of the input shaft (2000) is through installed at one side of the shell of the transmission gear train (500) via a bearing structure, the other end of the input shaft (2000) is perforating through the output shaft (3000) via the one-way transmission (302), and a bearing is installed between the output shaft (3000) and the shell of the transmission gear train (500);

connectable or releasable clutch device (700): related to a mechanism driven to be connectable or released by human power, or machine power, or aerodynamic force, or fluid power, or electromagnetic force;

shell of the transmission gear train (500): machine parts installed for constituting the clutch control reversible transmission wheel system with bidirectional input and one-way output;

machine body (600): a relatively static mechanism structure;

the input shaft (2000) is integrated with the sun wheel (202) via the connectable or releasable clutch device (700);

the planetary wheel (203) is installed between the outer wheel (204) and the sun wheel (202); the center of the planetary wheel (203) rotates at the planetary wheel shaft (201), one end of the planetary wheel shaft (201) is integrated with the planetary wheel support arm annular shelf (200), and the planetary wheel support arm annular shelf (200) is arranged to rotate at the input shaft (2000) between the sun wheel (202) and the shell of the transmission gear train (500) via the one-way transmission (303);

the shell of the transmission gear train (500) is fixed at the machine body (600);

an one-way transmission (301) is installed between the ring structure of the outer wheel (204) and the output shaft (3000);

the sun wheel (202), the planetary wheel (203), and the outer wheel (204) are constituted by gears or friction wheels;

the relation of the transmission ratio of the sun wheel (202) to drive the planetary wheel (203) includes acceleration, deceleration, or constant velocity;

the relation of the transmission ratio of the planetary wheel (203) to drive the outer wheel (204) includes acceleration, deceleration, or constant velocity;

by way of the above structures, the input shaft (2000) is driven at the first rotary direction, and is further through the one-way transmission (302) for driving the output shaft (3000) to produce the first rotary direction output to constitute the first transmission gear train;

by way of the above structures, if the connectable or releasable clutch device (700) is locked, the input shaft (2000) is driven at the second rotary direction, and is through the sun wheel (202) for further driving the planetary wheel (203) and the outer wheel (204), and through the ring structure of the outer wheel (204) and the one-way transmission (301) for driving the output shaft (3000) to produce the first rotary direction output to constitute the second transmission gear train; and when reverse drive caused by back move occurs at the output shaft (3000), through releasing the connectable or releasable clutch device (700), the first transmission gear train and the second transmission gear train are prevented from lock status.

Figure 12:
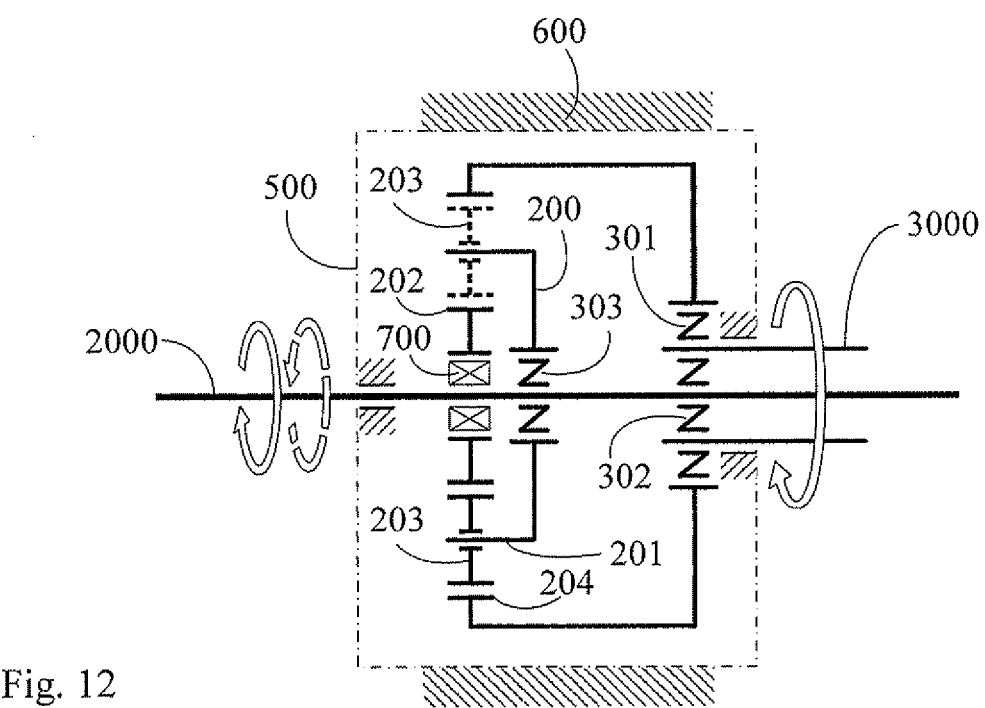
FIG. 12 is a structural schematic view showing the 12th embodiment of the clutch control reversible transmission wheel system with bidirectional input and one-way output constituted by the planetary gear train, according to the present invention.

FIG. 12 is a structural schematic view showing the 12th embodiment of the clutch control reversible transmission wheel system with bidirectional input and one-way output constituted by the planetary gear train, according to the present invention.

As shown in FIG. 12, the clutch control reversible transmission wheel system with bidirectional input and one-way output of the present invention is constituted by the planetary gear train with the input shaft and the output shaft coaxial fitting, the main components including:

one end of the input shaft (2000) is through installed at one side of the shell of the transmission gear train (500) via a bearing structure, the other end of the input shaft (2000) is perforating through the output shaft (3000) via the one-way transmission (302), and a bearing is installed between the output shaft (3000) and the shell of the transmission gear train (500);

connectable or releasable clutch device (700): related to a mechanism driven to be connected or released by human power, or machine power, or aerodynamic force, or fluid power, or electromagnetic force;

shell of the transmission gear train (500): machine parts installed for constituting the clutch control reversible transmission wheel system with bidirectional input and one-way output;

machine body (600): a relatively static mechanism structure;

the input shaft (2000) is integrated with the sun wheel (202) via the connectable or releasable clutch device (700);

the planetary wheel (203) is installed between the outer wheel (204) and the sun wheel (202); the center of the planetary wheel (203) rotates at the planetary wheel shaft (201), one end of the planetary wheel shaft (201) is integrated with the planetary wheel support arm annular shelf (200), and the planetary wheel support arm annular shelf (200) is arranged to rotate at the input shaft (2000) between the sun wheel (202) and the shell of the transmission gear train (500) via the one-way transmission (303);

the shell of the transmission gear train (500) is fixed at the machine body (600);

an one-way transmission (301) is installed between the ring structure of the outer wheel (204) and the output shaft (3000);

the sun wheel (202), the planetary wheel (203), and the outer wheel (204) are constituted by gears or friction wheels;

the relation of the transmission ratio of the sun wheel (202) to drive the planetary wheel (203) includes acceleration, deceleration, or constant velocity;

the relation of the transmission ratio of the planetary wheel (203) to drive the outer wheel (204) includes acceleration, deceleration, or constant velocity;

by way of the above structures, the input shaft (2000) is driven at the first rotary direction, and is further through the one-way transmission (302) for driving the output shaft (3000) to produce the first rotary direction output to constitute the first transmission gear train;

by way of the above structures, if the connectable or releasable clutch device (700) is locked, the input shaft (2000) is driven at the second rotary direction, and is through the sun wheel (202) for further driving the planetary wheel (203) and the outer wheel (204), and through the ring structure of the outer wheel (204) and the one-way transmission (301) for driving the output shaft (3000) to produce the first rotary direction output to constitute the second transmission gear train; and when reverse drive caused by back move occurs at the output shaft (3000), through releasing the connectable or releasable clutch device (700), the first transmission gear train and the second transmission gear train are prevented from lock status.

Figure 13:
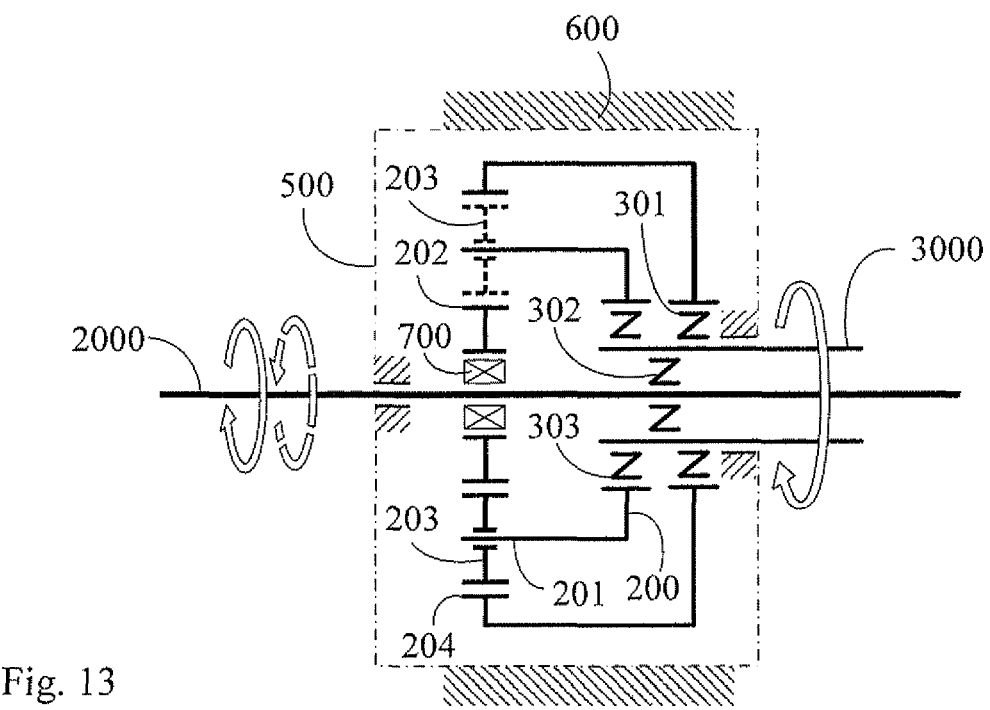
FIG. 13 is a structural schematic view showing the 13th embodiment of the clutch control reversible transmission wheel system with bidirectional input and one-way output constituted by the planetary gear train, according to the present invention.

FIG. 13 is a structural schematic view showing the 13th embodiment of the clutch control reversible transmission wheel system with bidirectional input and one-way output constituted by the planetary gear train, according to the present invention.

As shown in FIG. 13, the clutch control reversible transmission wheel system with bidirectional input and one-way output of the present invention is constituted by the planetary gear train with the input shaft and the output shaft coaxial fitting, the main components including:

one end of the input shaft (2000) is through installed at one side of the shell of the transmission gear train (500) via a bearing structure, the other end of the input shaft (2000) is perforating through the output shaft (3000) via the one-way transmission (302), and a bearing is installed between the output shaft (3000) and the shell of the transmission gear train (500);

connectable or releasable clutch device (700): related to a mechanism driven to be connected or released by human power, or machine power, or aerodynamic force, or fluid power, or electromagnetic force;

shell of the transmission gear train (500): machine parts installed for constituting the clutch control reversible transmission wheel system with bidirectional input and one-way output;

machine body (600): a relatively static mechanism structure;

the input shaft (2000) is integrated with the sun wheel (202) via the connectable or releasable clutch device (700);

the planetary wheel (203) is installed between the outer wheel (204) and the sun wheel (202); the center of the planetary wheel (203) rotates at the planetary wheel shaft (201), one end of the planetary wheel shaft (201) is integrated with the planetary wheel support arm annular shelf (200), and the planetary wheel support arm annular shelf (200) is arranged to rotate at the output shaft (3000) via the one-way transmission (303);

the shell of the transmission gear train (500) is fixed at the machine body (600);

an one-way transmission (301) is installed between the ring structure of the outer wheel (204) and the output shaft (3000);

the sun wheel (202), the planetary wheel (203), and the outer wheel (204) are constituted by gears or friction wheels;

the relation of the transmission ratio of the sun wheel (202) to drive the planetary wheel (203) includes acceleration, deceleration, or constant velocity;

the relation of the transmission ratio of the planetary wheel (203) to drive the outer wheel (204) includes acceleration, deceleration, or constant velocity;

by way of the above structures, the input shaft (2000) is driven at the first rotary direction, and is further through the one-way transmission (302) for driving the output shaft (3000) to produce the first rotary direction output to constitute the first transmission gear train;

by way of the above structures, if the connectable or releasable clutch device (700) is locked, the input shaft (2000) is driven at the second rotary direction, and is through the sun wheel (202) for further driving the planetary wheel (203) and the outer wheel (204), and through the ring structure of the outer wheel (204) and the one-way transmission (301) for driving the output shaft (3000) to produce the first rotary direction output to constitute the second transmission gear train; and when reverse drive caused by back move occurs at the output shaft (3000), through releasing the connectable or releasable clutch device (700), the first transmission gear train and the second transmission gear train are prevented from lock status.

Figure 14:
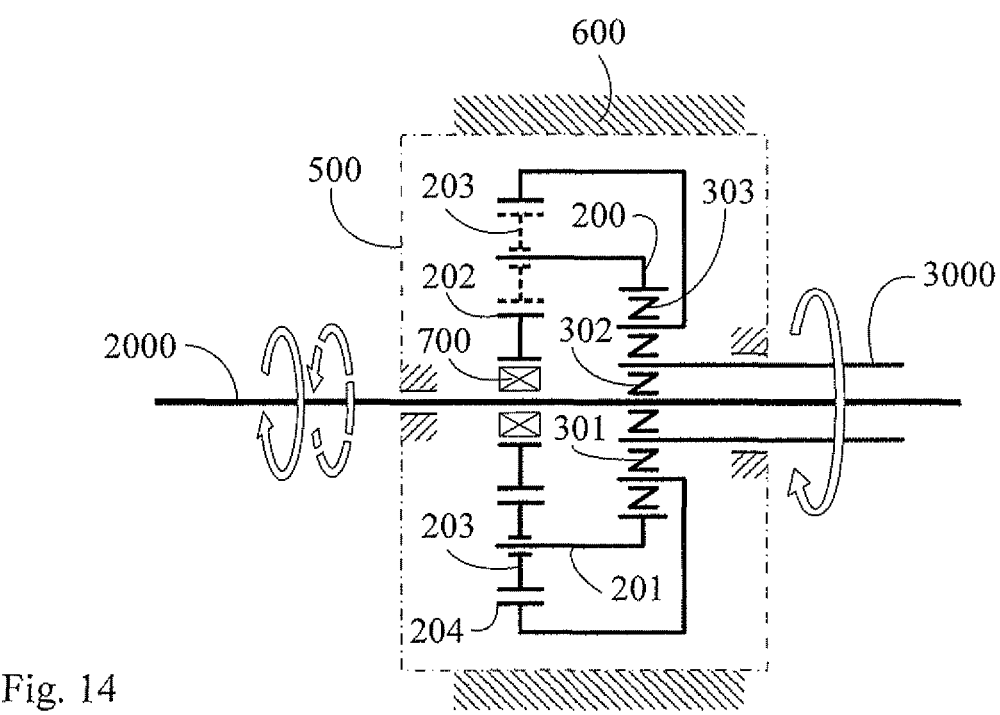
FIG. 14 is a structural schematic view showing the 14th embodiment of the clutch control reversible transmission wheel system with bidirectional input and one-way output constituted by the planetary gear train, according to the present invention.

FIG. 14 is a structural schematic view showing the 14th embodiment of the clutch control reversible transmission wheel system with bidirectional input and one-way output constituted by the planetary gear train, according to the present invention.

As shown in FIG. 14, the clutch control reversible transmission wheel system with bidirectional input and one-way output of the present invention is constituted by the planetary gear train with the input shaft and the output shaft coaxial fitting, the main components including:

one end of the input shaft (2000) is through installed at one side of the shell of the transmission gear train (500) via a bearing structure, the other end of the input shaft (2000) is perforating through the output shaft (3000) via the one-way transmission (302), and a bearing is installed between the output shaft (3000) and the shell of the transmission gear train (500);

connectable or releasable clutch device (700): related to a mechanism driven to be connected or released by human power, or machine power, or aerodynamic force, or fluid power, or electromagnetic force;

shell of the transmission gear train (500): machine parts installed for constituting the clutch control reversible transmission wheel system with bidirectional input and one-way output;

machine body (600): a relatively static mechanism structure;

the input shaft (2000) is integrated with the sun wheel (202) via the connectable or releasable clutch device (700);

the planetary wheel (203) is installed between the outer wheel (204) and the sun wheel (202); the center of the planetary wheel (203) rotates at the planetary wheel shaft (201), one end of the planetary wheel shaft (201) is integrated with the planetary wheel support arm annular shelf (200), and the planetary wheel support arm annular shelf (200) is arranged to rotate at the ring structure of the outer wheel (204) via the one-way transmission (303);

the shell of the transmission gear train (500) is fixed at the machine body (600);

an one-way transmission (301) is installed between the ring structure of the outer wheel (204) and the output shaft (3000);

the sun wheel (202), the planetary wheel (203), and the outer wheel (204) are constituted by gears or friction wheels;

the relation of the transmission ratio of the sun wheel (202) to drive the planetary wheel (203) includes acceleration, deceleration, or constant velocity;

the relation of the transmission ratio of the planetary wheel (203) to drive the outer wheel (204) includes acceleration, deceleration, or constant velocity;

by way of the above structures, the input shaft (2000) is driven at the first rotary direction, and is further through the one-way transmission (302) for driving the output shaft (3000) to produce the first rotary direction output to constitute the first transmission gear train;

by way of the above structures, if the connectable or releasable clutch device (700) is locked, the input shaft (2000) is driven at the second rotary direction, and is through the sun wheel (202) for further driving the planetary wheel (203) and the outer wheel (204), and through the ring structure of the outer wheel (204) and the one-way transmission (301), for driving the output shaft (3000) to produce the first rotary direction output to constitute the second transmission gear train; and when reverse drive caused by back move occurs at the output shaft (3000), through releasing the connectable or releasable clutch device (700), the first transmission gear train and the second transmission gear train are prevented from lock status.

Figure 15:
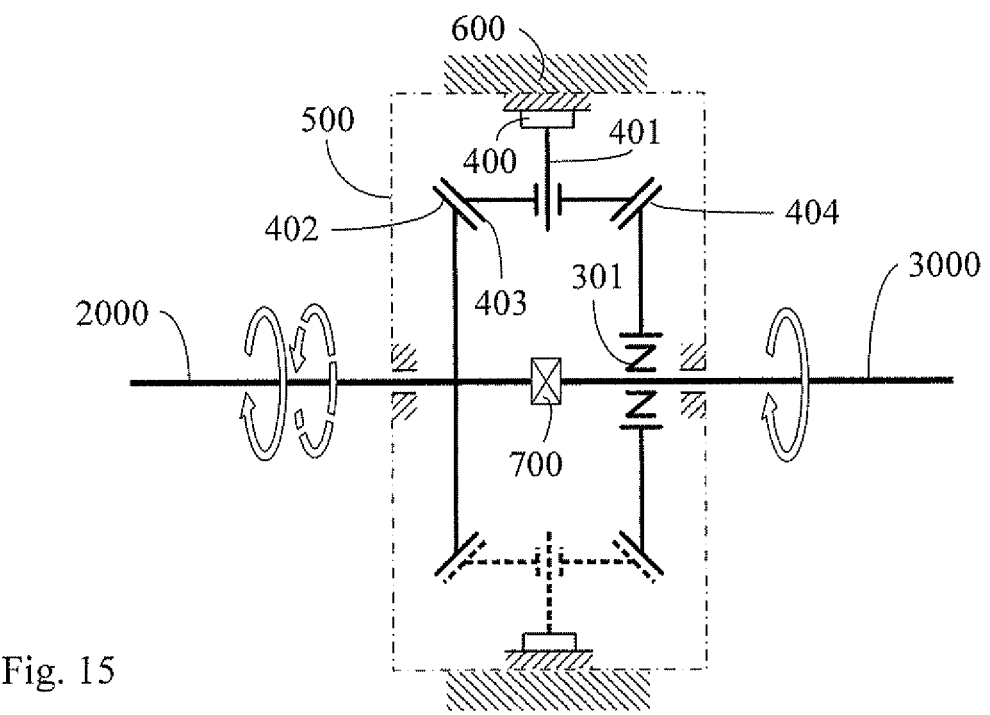
FIG. 15 is a structural schematic view showing the 1st embodiment of the clutch control reversible transmission wheel system with bidirectional input and one-way output constituted by the epicyclic gear train, according to the present invention.

For B: as shown in FIGS. 15 to 28, the clutch control reversible transmission wheel system with bidirectional input and one-way output of present invention is constituted by the epicyclic gear train, and the input shaft and the output shaft are coaxially installed in series, including:

FIG. 15 is a structural schematic view showing the 1st embodiment of the clutch control reversible transmission wheel system with bidirectional input and one-way output constituted by the epicyclic gear train, according to the present invention.

As shown in FIG. 15, the clutch control reversible transmission wheel system with bidirectional input and one-way output of the present invention is constituted by the epicyclic gear train with the input shaft and the output shaft coaxially installed in series, the main components including:

one end of the input shaft (2000) is through installed at one side of the shell of the transmission gear train (500) via a bearing structure, the other end of the input shaft (2000) and the output shaft (3000) are coaxially installed in series via the connectable or releasable clutch device (700), and a bearing is installed between the output shaft (3000) and the shell of the transmission gear train (500);

connectable or releasable clutch device (700): related to a mechanism driven to be connected or released by human power, or machine power, or aerodynamic force, or fluid power, or electromagnetic force;

shell of the transmission gear train (500): machine parts installed for constituting the clutch control reversible transmission wheel system with bidirectional input and one-way output;

machine body (600): a relatively static mechanism structure;

the input shaft (2000) is integrated with the inner bevel wheel (402);

an epicyclic gear (403) is installed between an outer bevel wheel (404) and an inner bevel wheel (402); the center of the epicyclic gear (403) rotates at an epicyclic gear shaft (401); and one end of the epicyclic gear shaft (401) is fixed at the shell of the transmission gear train (500);

the shell of the transmission gear train (500) is fixed at the machine body (600);

the one-way transmission (301) is installed between the outer bevel wheel (404) and the output shaft (3000);

the inner bevel wheel (402), the epicyclic gear (403), and the outer bevel wheel (404) are constituted by gears or friction wheels;

the relation of the transmission ratio of the inner bevel wheel (402) to drive the epicyclic gear (403) includes acceleration, deceleration, or constant velocity;

the relation of the transmission ratio of the epicyclic gear (403) to drive the outer bevel wheel (404) includes acceleration, deceleration, or constant velocity;

by way of the above structures, the input shaft (2000) is driven at the first rotary direction, and is through the connectable or releasable clutch device (700) for driving the output shaft (3000) to produce the first rotary direction output to constitute the first transmission gear train;

by way of the above structures, if the connectable or releasable clutch device (700) is locked, the input shaft (2000) is driven at the second rotary direction, and is through the inner bevel wheel (402) for further driving the epicyclic gear (403) and the outer bevel wheel (404), and through the outer bevel wheel (404) and the one-way transmission (301) for driving the output shaft (3000) to produce the first rotary direction output to constitute the second transmission gear train; and when reverse drive caused by back move occurs at the output shaft (3000), through releasing the connectable or releasable clutch device (700), the first transmission gear train and the second transmission gear train are prevented from lock status.

Figure 16:
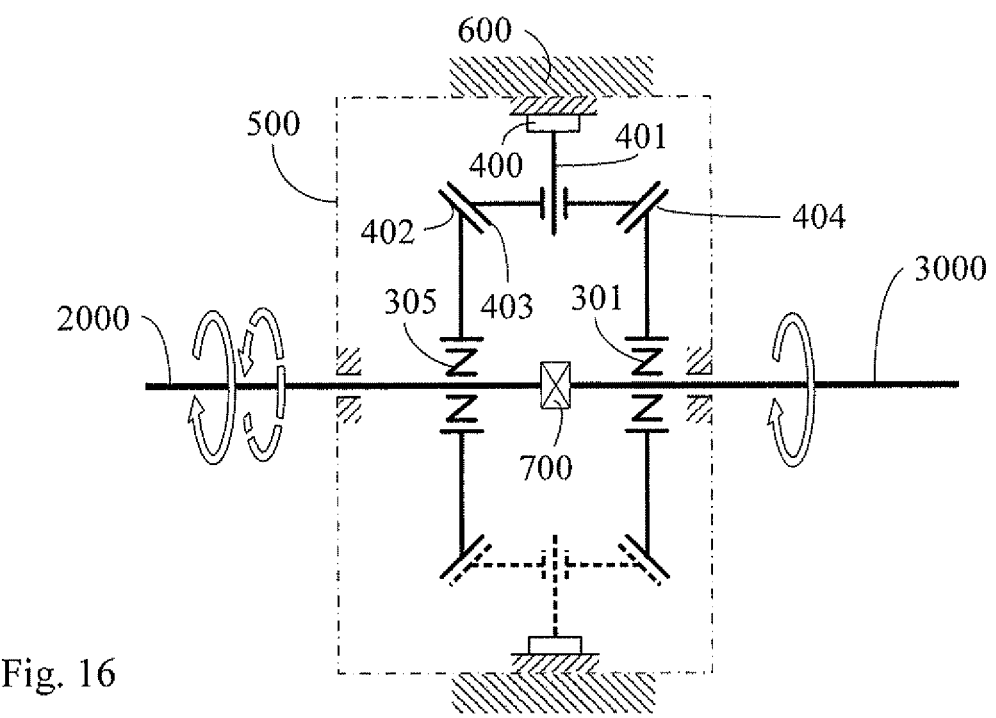
FIG. 16 is a structural schematic view showing the 2nd embodiment of the clutch control reversible transmission wheel system with bidirectional input and one-way output constituted by the epicyclic gear train, according to the present invention.

FIG. 16 is a structural schematic view showing the 2nd embodiment of the clutch control reversible transmission wheel system with bidirectional input and one-way output constituted by the epicyclic gear train, according to the present invention.

As shown in FIG. 16, the clutch control reversible transmission wheel system with bidirectional input and one-way output of the present invention is constituted by the epicyclic gear train with the input shaft and the output shaft coaxially installed in series, the main components including:

one end of the input shaft (2000) is through installed at one side of the shell of the transmission gear train (500) via a bearing structure, the other end of the input shaft (2000) and the output shaft (3000) are coaxially installed in series via the connectable or releasable clutch device (700), and a bearing is installed between the output shaft (3000) and the shell of the transmission gear train (500);

connectable or releasable clutch device (700): related to a mechanism driven to be connected or released by human power, or machine power, or aerodynamic force, or fluid power, or electromagnetic force;

shell of the transmission gear train (500): machine parts installed for constituting the clutch control reversible transmission wheel system with bidirectional input and one-way output;

machine body (600): a relatively static mechanism structure;

the input shaft (2000) perforates through the inner bevel wheel (402), and an one-way transmission (305) is installed between the above both;

an epicyclic gear (403) is installed between an outer bevel wheel (404) and an inner bevel wheel (402); the center of the epicyclic gear (403) rotates at an epicyclic gear shaft (401); and one end of the epicyclic gear shaft (401) is fixed at the shell of the transmission gear train (500);

the shell of the transmission gear train (500) is fixed at the machine body (600);

the one-way transmission (301) is installed between the outer bevel wheel (404) and the output shaft (3000);

the inner bevel wheel (402), the epicyclic gear (403), and the outer bevel wheel (404) are constituted by gears or friction wheels;

the relation of the transmission ratio of the inner bevel wheel (402) to drive the epicyclic gear (403) includes acceleration, deceleration, or constant velocity;

the relation of the transmission ratio of the epicyclic gear (403) to drive the outer bevel wheel (404) includes acceleration, deceleration, or constant velocity;

by way of the above structures, the input shaft (2000) is driven at the first rotary direction, and is further through the connectable or releasable clutch device (700) for driving the output shaft (3000) to produce the first rotary direction output to constitute the first transmission gear train;

by way of the above structures, if the connectable or releasable clutch device (700) is locked, the input shaft (2000) is driven at the second rotary direction, and is through the one-way transmission (305) for driving the inner bevel wheel (402) and for further driving the epicyclic gear (403) and the outer bevel wheel (404), and through the outer bevel wheel (404) and the one-way transmission (301), for driving the output shaft (3000) to produce the first rotary direction output to constitute the second transmission gear train; and when reverse drive caused by back move occurs at the output shaft (3000), through releasing the connectable or releasable clutch device (700), the first transmission gear train and the second transmission gear train are prevented from lock status.

Figure 17:
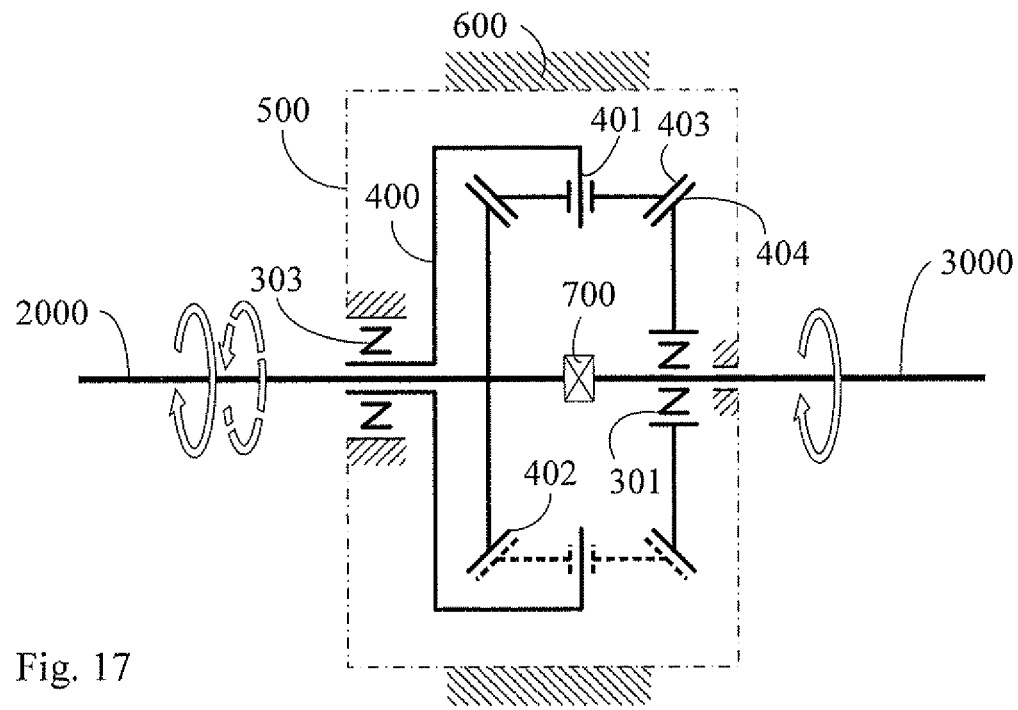
FIG. 17 is a structural schematic view showing the 3rd embodiment of the clutch control reversible transmission wheel system with bidirectional input and one-way output constituted by the epicyclic gear train, according to the present invention.

FIG. 17 is a structural schematic view showing the 3rd embodiment of the clutch control reversible transmission wheel system with bidirectional input and one-way output constituted by the epicyclic gear train, according to the present invention.

As shown in FIG. 17, the clutch control reversible transmission wheel system with bidirectional input and one-way output of the present invention is constituted by the epicyclic gear train with the input shaft and the output shaft coaxially installed in series, the main components including:

one end of the input shaft (2000) is through installed at an epicyclic gear support arm annular shelf (400) via a bearing structure, the epicyclic gear support arm annular shelf (400) is integrated with one side of the shell of the transmission gear train (500) via the one-way transmission (303), and the other end of the input shaft (2000) and the output shaft (3000) are coaxially installed in series via the connectable or releasable clutch device (700), and a bearing is installed between the output shaft (3000) and the shell of the transmission gear train (500);

connectable or releasable clutch device (700): related to a mechanism driven to be connected or released by human power, or machine power, or aerodynamic force, or fluid power, or electromagnetic force;

shell of the transmission gear train (500): machine parts installed for constituting the clutch control reversible transmission wheel system with bidirectional input and one-way output;

machine body (600): a relatively static mechanism structure;

the input shaft (2000) is integrated with the inner bevel wheel (402);

the epicyclic gear (403) is installed between the outer bevel wheel (404) and the inner bevel wheel (402); the center of the epicyclic gear (403) rotates at the epicyclic gear shaft (401), one end of the epicyclic gear shaft (401) is integrated with the epicyclic gear support arm annular shelf (400) to rotate between the input shaft (2000) and the one-way transmission (303);

the shell of the transmission gear train (500) is fixed at the machine body (600);

the outer bevel wheel (404) is via the one-way transmission (301) surrounded installed to the output shaft (3000);

the inner bevel wheel (402), the epicyclic gear (403), and the outer bevel wheel (404) are constituted by gears or friction wheels;

the relation of the transmission ratio of the inner bevel wheel (402) to drive the epicyclic gear (403) includes acceleration, deceleration, or constant velocity;

the relation of the transmission ratio of the epicyclic gear (403) to drive the outer bevel wheel (404) includes acceleration, deceleration, or constant velocity;

by way of the above structures, the input shaft (2000) is driven at the first rotary direction, and is through the connectable or releasable clutch device (700) for driving the output shaft (3000) to produce the first rotary direction output to constitute the first transmission gear train;

by way of the above structures, if the connectable or releasable clutch device (700) is locked, the input shaft (2000) is driven at the second rotary direction, and is through the inner bevel wheel (402), the epicyclic gear (403), and the outer bevel wheel (404), and through the one-way transmission (301) for driving the output shaft (3000) to produce the first rotary direction output to constitute the second transmission gear train; and when reverse drive caused by back move occurs at the output shaft (3000), through releasing the connectable or releasable clutch device (700), the first transmission gear train and the second transmission gear train are prevented from lock status.

Figure 18:
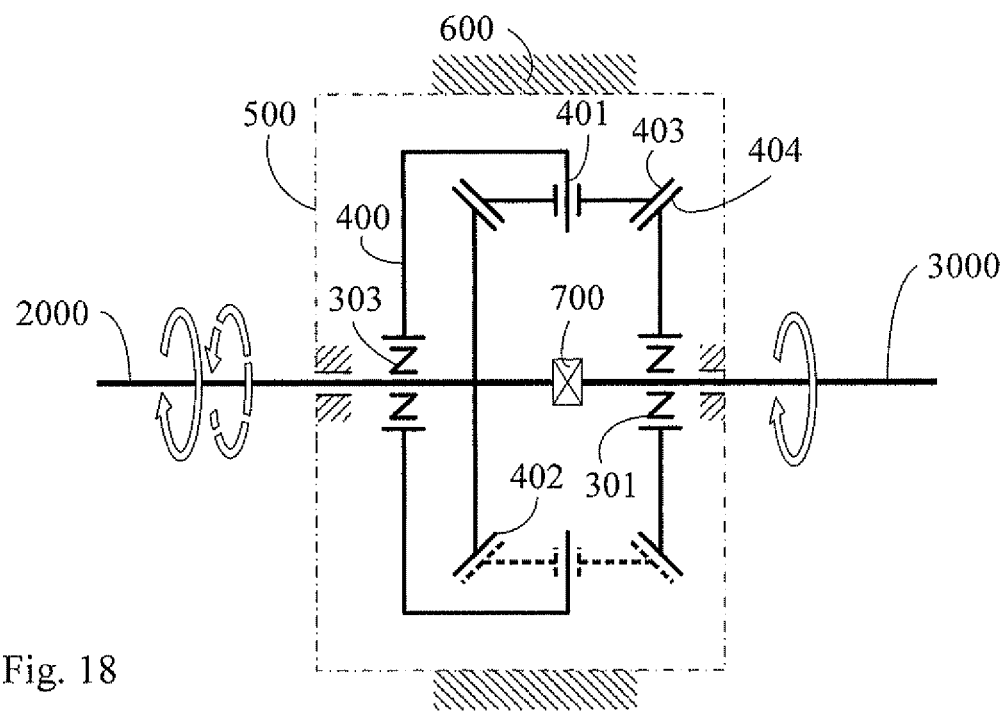
FIG. 18 is a structural schematic view showing the 4th embodiment of the clutch control reversible transmission wheel system with bidirectional input and one-way output constituted by the epicyclic gear train, according to the present invention.

FIG. 18 is a structural schematic view showing the 4th embodiment of the clutch control reversible transmission wheel system with bidirectional input and one-way output constituted by the epicyclic gear train, according to the present invention.

As shown in FIG. 18, the clutch control reversible transmission wheel system with bidirectional input and one-way output of the present invention is constituted by the epicyclic gear train with the input shaft and the output shaft coaxially installed in series, the main components including:

- one end of the input shaft (2000) is through installed at one side of the shell of the transmission gear train (500) via a bearing structure, the other end of the input shaft (2000) and the output shaft (3000) are coaxially installed in series via the connectable or releasable clutch device (700), and a bearing is installed between the output shaft (3000) and the shell of the transmission gear train (500);
- connectable or releasable clutch device (700): related to a mechanism driven to be connected or released by human power, or machine power, or aerodynamic force, or fluid power, or electromagnetic force;
- shell of the transmission gear train (500): machine parts installed for constituting the clutch control reversible transmission wheel system with bidirectional input and one-way output;
- machine body (600): a relatively static mechanism structure;
- the input shaft (2000) is integrated with the inner bevel wheel (402);
- the epicyclic gear (403) is installed between the outer bevel wheel (404) and the inner bevel wheel (402); the center of the epicyclic gear (403) rotates at the epicyclic gear shaft (401), one end of the epicyclic gear shaft (401) is integrated with the epicyclic gear support arm annular shelf (400), and the epicyclic gear support arm annular shelf (400) is arranged to rotate at the input shaft (2000) between the shell of the transmission gear train (500) and the inner bevel wheel (402) via the one-way transmission (303);
- the shell of the transmission gear train (500) is fixed at the machine body (600);
- the outer bevel wheel (404) is via the one-way transmission (301) surrounded installed to the output shaft (3000);
- the inner bevel wheel (402), the epicyclic gear (403), and the outer bevel wheel (404) are constituted by gears or friction wheels;
- the relation of the transmission ratio of the inner bevel wheel (402) to drive the epicyclic gear (403) includes acceleration, deceleration, or constant velocity;
- the relation of the transmission ratio of the epicyclic gear (403) to drive the outer bevel wheel (404) includes acceleration, deceleration, or constant velocity;

by way of the above structures, the input shaft (2000) is driven at the first rotary direction, and is through the connectable or releasable clutch device (700) for driving the output shaft (3000) to produce the first rotary direction output to constitute the first transmission gear train;

by way of the above structures, if the connectable or releasable clutch device (700) is locked, the input shaft (2000) is driven at the second rotary direction, and is through the inner bevel wheel (402), the epicyclic gear (403), and the outer bevel wheel (404), and through the one-way transmission (301) for driving the output shaft (3000) to produce the first rotary direction output to constitute the second transmission gear train; and when reverse drive caused by back move occurs at the output shaft (3000), through releasing the connectable or releasable clutch device (700), the first transmission gear train and the second transmission gear train are prevented from lock status.

Figure 19:
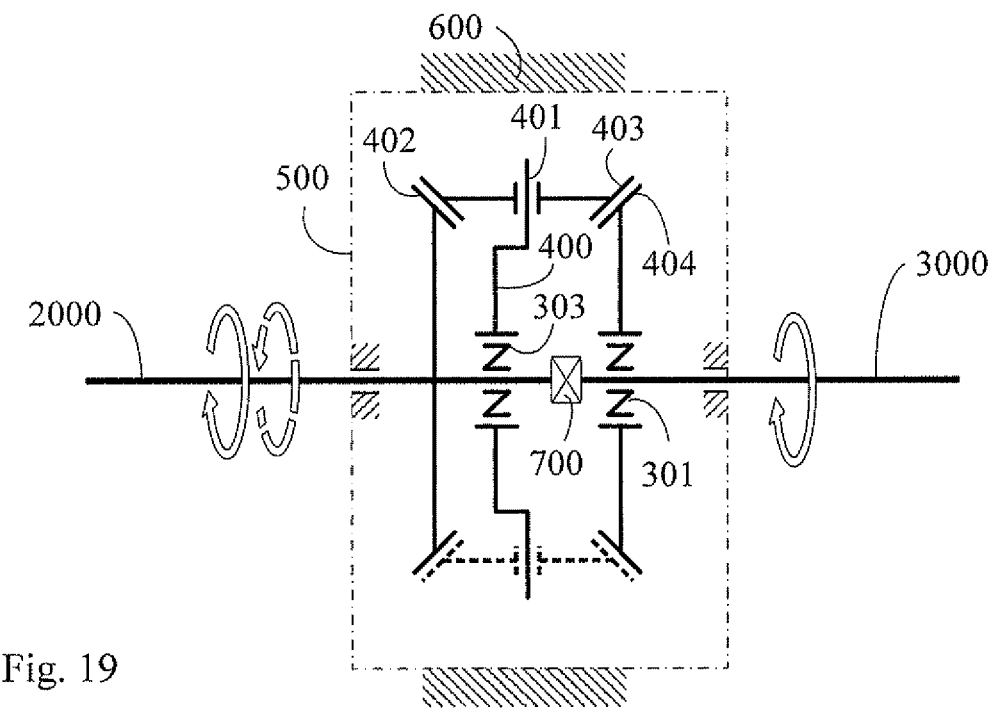
FIG. 19 is a structural schematic view showing the 5th embodiment of the clutch control reversible transmission wheel system with bidirectional input and one-way output constituted by the epicyclic gear train, according to the present invention.

FIG. 19 is a structural schematic view showing the 5th embodiment of the clutch control reversible transmission wheel system with bidirectional input and one-way output constituted by the epicyclic gear train, according to the present invention.

As shown in FIG. 19, the clutch control reversible transmission wheel system with bidirectional input and one-way output of the present invention is constituted by the epicyclic gear train with the input shaft and the output shaft coaxially installed in series, the main components including:

- one end of the input shaft (2000) is through installed at one side of the shell of the transmission gear train (500) via a bearing structure, the other end of the input shaft (2000) and the output shaft (3000) are coaxially installed in series via the connectable or releasable clutch device (700), and a bearing is installed between the output shaft (3000) and the shell of the transmission gear train (500);
- connectable or releasable clutch device (700): related to a mechanism driven to be connected or released by human power, or machine power, or aerodynamic force, or fluid power, or electromagnetic force;
- shell of the transmission gear train (500): machine parts installed for constituting the clutch control reversible transmission wheel system with bidirectional input and one-way output;
- machine body (600): a relatively static mechanism structure;
- the input shaft (2000) is integrated with the inner bevel wheel (402);
- the epicyclic gear (403) is installed between the outer bevel wheel (404) and the inner bevel wheel (402); the center of the epicyclic gear (403) rotates at the epicyclic gear shaft (401), the epicyclic gear shaft (401) is integrated with the epicyclic gear support arm annular shelf (400) installed between the inner bevel wheel (402) and the connectable or releasable clutch device (700), and the one-way transmission (303) is installed between the epicyclic gear support arm annular shelf (400) and the input shaft (2000);
- the shell of the transmission gear train (500) is fixed at the machine body (600);
- the outer bevel wheel (404) is via the one-way transmission (301) surrounded installed to the output shaft (3000);
- the inner bevel wheel (402), the epicyclic gear (403), and the outer bevel wheel (404) are constituted by gears or friction wheels;
- the relation of the transmission ratio of the inner bevel wheel (402) to drive the epicyclic gear (403) includes acceleration, deceleration, or constant velocity;

the relation of the transmission ratio of the epicyclic gear (403) to drive the outer bevel wheel (404) includes acceleration, deceleration, or constant velocity;

by way of the above structures, the input shaft (2000) is driven at the first rotary direction, and is through the connectable or releasable clutch device (700) for driving the output shaft (3000) to produce the first rotary direction output to constitute the first transmission gear train;

by way of the above structures, if the connectable or releasable clutch device (700) is locked, the input shaft (2000) is driven at the second rotary direction, and is through the inner bevel wheel (402), the epicyclic gear (403), and the outer bevel wheel (404), and then through the one-way transmission (301) for driving the output shaft (3000) to produce the first rotary direction output to constitute the second transmission gear train; and when reverse drive caused by back move occurs at the output shaft (3000), through releasing the connectable or releasable clutch device (700), the first transmission gear train and the second transmission gear train are prevented from lock status.

Figure 20:
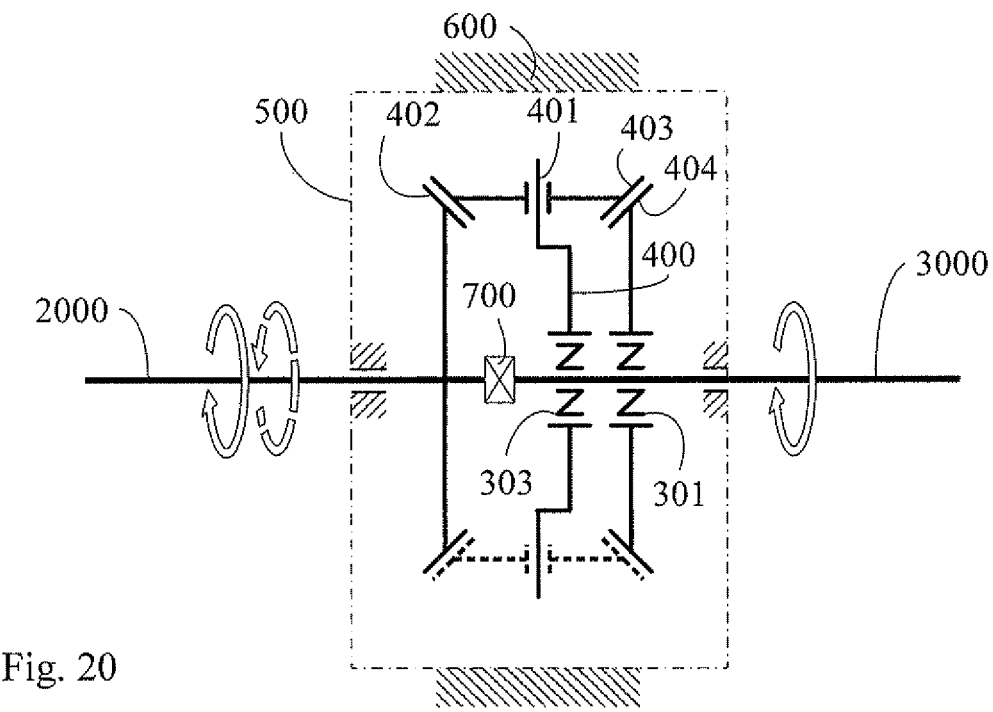
FIG. 20 is a structural schematic view showing the 6th embodiment of the clutch control reversible transmission wheel system with bidirectional input and one-way output constituted by the epicyclic gear train, according to the present invention.

FIG. 20 is a structural schematic view showing the 6th embodiment of the clutch control reversible transmission wheel system with bidirectional input and one-way output constituted by the epicyclic gear train, according to the present invention.

As shown in FIG. 20, the clutch control reversible transmission wheel system with bidirectional input and one-way output of the present invention is constituted by the epicyclic gear train with the input shaft and the output shaft coaxially installed in series, the main components including:

one end of the input shaft (2000) is through installed at one side of the shell of the transmission gear train (500) via a bearing structure, the other end of the input shaft (2000) and the output shaft (3000) are coaxially installed in series via the connectable or releasable clutch device (700), and a bearing is installed between the output shaft (3000) and the shell of the transmission gear train (500);

connectable or releasable clutch device (700): related to a mechanism driven to be connected or released by human power, or machine power, or aerodynamic force, or fluid power, or electromagnetic force;

shell of the transmission gear train (500): machine parts installed for constituting the clutch control reversible transmission wheel system with bidirectional input and one-way output;

machine body (600): a relatively static mechanism structure;

the input shaft (2000) is integrated with the inner bevel wheel (402);

the epicyclic gear (403) is installed between the outer bevel wheel (404) and the inner bevel wheel (402); the center of the epicyclic gear (403) rotates at the epicyclic gear shaft (401), the epicyclic gear shaft (401) is integrated with the epicyclic gear support arm annular shelf (400) installed at the output shaft (3000), and the one-way transmission (303) is installed between the epicyclic gear support arm annular shelf (400) and the output shaft (3000);

the shell of the transmission gear train (500) is fixed at the machine body (600);

the outer bevel wheel (404) is surrounded installed to the output shaft (3000) via the one-way transmission (301);

the inner bevel wheel (402), the epicyclic gear (403), and the outer bevel wheel (404) are constituted by gears or friction wheels;

the relation of the transmission ratio of the inner bevel wheel (402) to drive the epicyclic gear (403) includes acceleration, deceleration, or constant velocity;

the relation of the transmission ratio of the epicyclic gear (403) to drive the outer bevel wheel (404) includes acceleration, deceleration, or constant velocity;

by way of the above structures, the input shaft (2000) is driven at the first rotary direction, and is through the connectable or releasable clutch device (700) for driving the output shaft (3000) to produce the first rotary direction output to constitute the first transmission gear train;

by way of the above structures, if the connectable or releasable clutch device (700) is locked, the input shaft (2000) is driven at the second rotary direction, and is through the inner bevel wheel (402), the epicyclic gear (403), and the outer bevel wheel (404), and then through the one-way transmission (301) for driving the output shaft (3000) to produce the first rotary direction output to constitute the second transmission gear train; and when reverse drive caused by back move occurs at the output shaft (3000), through releasing the connectable or releasable clutch device (700), the first transmission gear train and the second transmission gear train are prevented from lock status.

Figure 21:
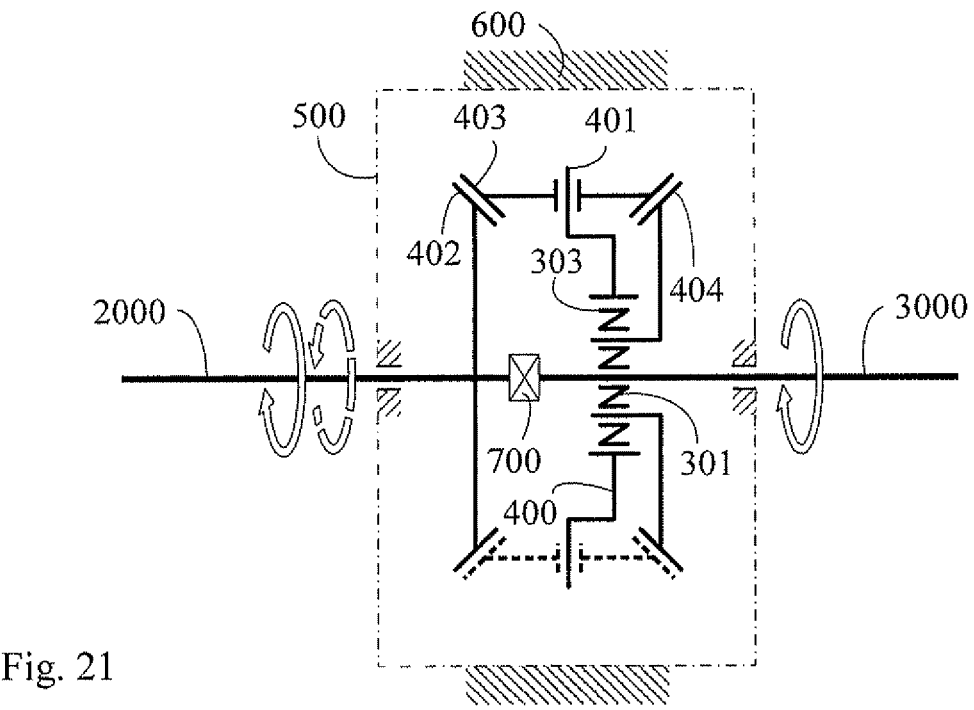
FIG. 21 is a structural schematic view showing the 7th embodiment of the clutch control reversible transmission wheel system with bidirectional input and one-way output constituted by the epicyclic gear train, according to the present invention.

FIG. 21 is a structural schematic view showing the 7th embodiment of the clutch control reversible transmission wheel system with bidirectional input and one-way output constituted by the epicyclic gear train, according to the present invention.

As shown in FIG. 21, the clutch control reversible transmission wheel system with bidirectional input and one-way output of the present invention is constituted by the epicyclic gear train with the input shaft and the output shaft coaxially installed in series, the main components including:

one end of the input shaft (2000) is through installed at one side of the shell of the transmission gear train (500) via a bearing structure, the other end of the input shaft (2000) and the output shaft (3000) are coaxially installed in series via the connectable or releasable clutch device (700), and a bearing is installed between the output shaft (3000) and the shell of the transmission gear train (500);

connectable or releasable clutch device (700): related to a mechanism driven to be connected or released by human power, or machine power, or aerodynamic force, or fluid power, or electromagnetic force;

shell of the transmission gear train (500): machine parts installed for constituting the clutch control reversible transmission wheel system with bidirectional input and one-way output;

machine body (600): a relatively static mechanism structure;

the input shaft (2000) is integrated with the inner bevel wheel (402);

the epicyclic gear (403) is installed between the outer bevel wheel (404) and the inner bevel wheel (402); the center of the epicyclic gear (403) rotates at the epicyclic gear shaft (401), the epicyclic gear shaft (401) is integrated with the epicyclic gear support arm annular shelf (400), and the one-way transmission (303) is installed between the epicyclic gear support arm annular shelf (400) and the outer bevel wheel (404);

the shell of the transmission gear train (500) is fixed at the machine body (600);

the outer bevel wheel (404) is surrounded installed to the output shaft (3000) via the one-way transmission (301);

the inner bevel wheel (402), the epicyclic gear (403), and the outer bevel wheel (404) are constituted by gears or friction wheels;

the relation of the transmission ratio of the inner bevel wheel (402) to drive the epicyclic gear (403) includes acceleration, deceleration, or constant velocity;

the relation of the transmission ratio of the epicyclic gear (403) to drive the outer bevel wheel (404) includes acceleration, deceleration, or constant velocity;

by way of the above structures, the input shaft (2000) is driven at the first rotary direction, and is through the connectable or releasable clutch device (700) for driving the output shaft (3000) to produce the first rotary direction output to constitute the first transmission gear train;

by way of the above structures, if the connectable or releasable clutch device (700) is locked, the input shaft (2000) is driven at the second rotary direction, and is through the inner bevel wheel (402), the epicyclic gear (403), and the outer bevel wheel (404), and then through the one-way transmission (301) for driving the output shaft (3000) to produce the first rotary direction output to constitute the second transmission gear train; and when reverse drive caused by back move occurs at the output shaft (3000), through releasing the connectable or releasable clutch device (700), the first transmission gear train and the second transmission gear train are prevented from lock status.

Figure 22:
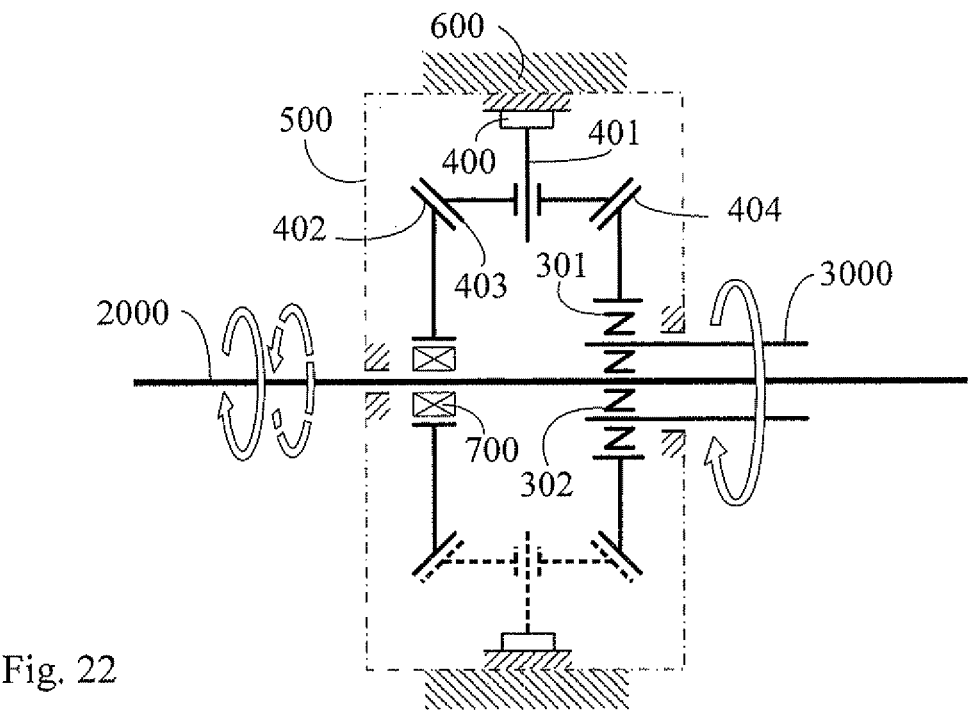
FIG. 22 is a structural schematic view showing the 8th embodiment of the clutch control reversible transmission wheel system with bidirectional input and one-way output constituted by the epicyclic gear train, according to the present invention.

FIG. 22 is a structural schematic view showing the 8th embodiment of the clutch control reversible transmission wheel system with bidirectional input and one-way output constituted by the epicyclic gear train, according to the present invention.

As shown in FIG. 22, the clutch control reversible transmission wheel system with bidirectional input and one-way output of the present invention is constituted by the epicyclic gear train with the input shaft and the output shaft coaxial fitting, the main components including:

one end of the input shaft (2000) is through installed at one side of the shell of the transmission gear train (500) via a bearing structure, the other end of the input shaft (2000) perforates through the output shaft (3000) via the one-way transmission (302), and a bearing is installed between the output shaft (3000) and the shell of the transmission gear train (500);

connectable or releasable clutch device (700): related to a mechanism driven to be connected or released by human power, or machine power, or aerodynamic force, or fluid power, or electromagnetic force;

shell of the transmission gear train (500): machine parts installed for constituting the clutch control reversible transmission wheel system with bidirectional input and one-way output;

machine body (600): a relatively static mechanism structure;

the input shaft (2000) is integrated with the inner bevel wheel (402) via the connectable or releasable clutch device (700);

the epicyclic gear (403) is installed between the outer bevel wheel (404) and the inner bevel wheel (402); the center of the epicyclic gear (403) rotates at the epicyclic gear shaft (401), one end of the epicyclic gear shaft (401) is integrated with the epicyclic gear support arm annular shelf (400), the epicyclic gear support arm annular shelf (400) is fixed at the shell of the transmission gear train (500);

the shell of the transmission gear train (500) is fixed at the machine body (600);

the one-way transmission (301) is installed between the outer bevel wheel (404) and the output shaft (3000);

the inner bevel wheel (402), the epicyclic gear (403), and the outer bevel wheel (404) are constituted by gears or friction wheels;

the relation of the transmission ratio of the inner bevel wheel (402) to drive the epicyclic gear (403) includes acceleration, deceleration, or constant velocity;

the relation of the transmission ratio of the epicyclic gear (403) to drive the outer bevel wheel (404) includes acceleration, deceleration, or constant velocity;

by way of the above structures, the input shaft (2000) is driven at the first rotary direction, and is through the one-way transmission (302) for driving the output shaft (3000) to produce the first rotary direction output to constitute the first transmission gear train;

by way of the above structures, if the connectable or releasable clutch device (700) is locked, the input shaft (2000) is driven at the second rotary direction, and is through the inner bevel wheel (402), for further driving the epicyclic gear (403) and the outer bevel wheel (404), and through the outer bevel wheel (404) and the one-way transmission (301) for driving the output shaft (3000) to produce the first rotary direction output to constitute the second transmission gear train; and when reverse drive caused by back move occurs at the output shaft (3000), through releasing the connectable or releasable clutch device (700), the first transmission gear train and the second transmission gear train are prevented from lock status.

Figure 23:
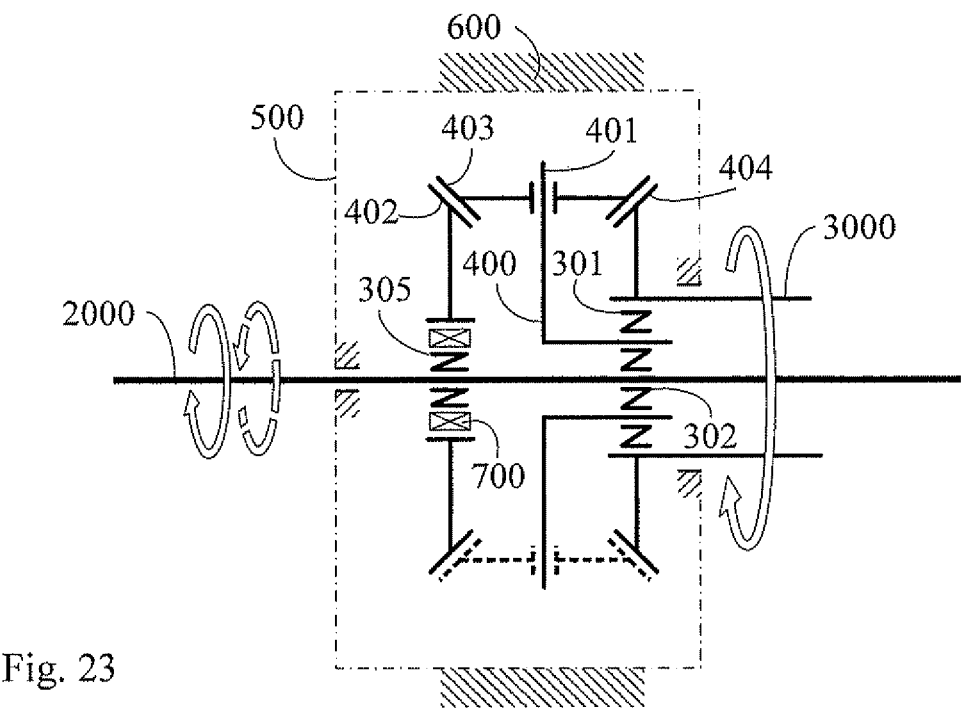
FIG. 23 is a structural schematic view showing the 9th embodiment of the clutch control reversible transmission wheel system with bidirectional input and one-way output constituted by the epicyclic gear train, according to the present invention.

FIG. 23 is a structural schematic view showing the 9th embodiment of the clutch control reversible transmission wheel system with bidirectional input and one-way output constituted by the epicyclic gear train, according to the present invention.

As shown in FIG. 23, the clutch control reversible transmission wheel system with bidirectional input and one-way output of the present invention is constituted by the epicyclic gear train with the input shaft and the output shaft coaxial fitting, the main components including:

one end of the input shaft (2000) is through installed at one side of the shell of the transmission gear train (500) via a bearing structure, the other end of the input shaft (2000) perforates through the output shaft (3000) via the one-way transmission (302), the epicyclic gear support arm annular shelf (400) and the one-way transmission (301), and a bearing is installed between the output shaft (3000) and the shell of the transmission gear train (500);

connectable or releasable clutch device (700): related to a mechanism driven to be connected or released by human power, or machine power, or aerodynamic force, or fluid power, or electromagnetic force;

shell of the transmission gear train (500): machine parts installed for constituting the clutch control reversible transmission wheel system with bidirectional input and one-way output;

machine body (600): a relatively static mechanism structure;

the input shaft (2000) perforates through the one-way transmission (305), and the connectable or releasable clutch device (700) is installed between the inner bevel wheel (402) and the one-way transmission (305);

the epicyclic gear (403) is installed between the outer bevel wheel (404) and the inner bevel wheel (402); the epicyclic gear (403) rotates at the epicyclic gear shaft (401), the epicyclic gear shaft (401) is installed at the epicyclic gear support arm annular shelf (400), and the epicyclic gear support arm annular shelf (400) is coaxially installed between the one-way transmission (301) and the one-way transmission (302);

the shell of the transmission gear train (500) is fixed at the machine body (600);

the one-way transmission (301) is installed between the outer bevel wheel (404) and the epicyclic gear support arm annular shelf (400);

the inner bevel wheel (402), the epicyclic gear (403), and the outer bevel wheel (404) are constituted by gears or friction wheels;

the relation of the transmission ratio of the inner bevel wheel (402) to drive the epicyclic gear (403) includes acceleration, deceleration, or constant velocity;

the relation of the transmission ratio of the epicyclic gear (403) to drive the outer bevel wheel (404) includes acceleration, deceleration, or constant velocity;

by way of the above structures, the input shaft (2000) is driven at the first rotary direction, and is through the one-way transmission (302) and the one-way transmission (301) for driving the output shaft (3000) to produce the first rotary direction output to constitute the first transmission gear train;

by way of the above structures, if the connectable or releasable clutch device (700) is locked, the input shaft (2000) is driven at the second rotary direction, and is through the one-way transmission (305) for driving the epicyclic gear (403) and the outer bevel wheel (404) for driving the output shaft (3000) to produce the first rotary direction output to constitute the second transmission gear train; and when reverse drive caused by back move occurs at the output shaft (3000), through releasing the connectable or releasable clutch device (700), the first transmission gear train and the second transmission gear train are prevented from lock status.

Figure 24:
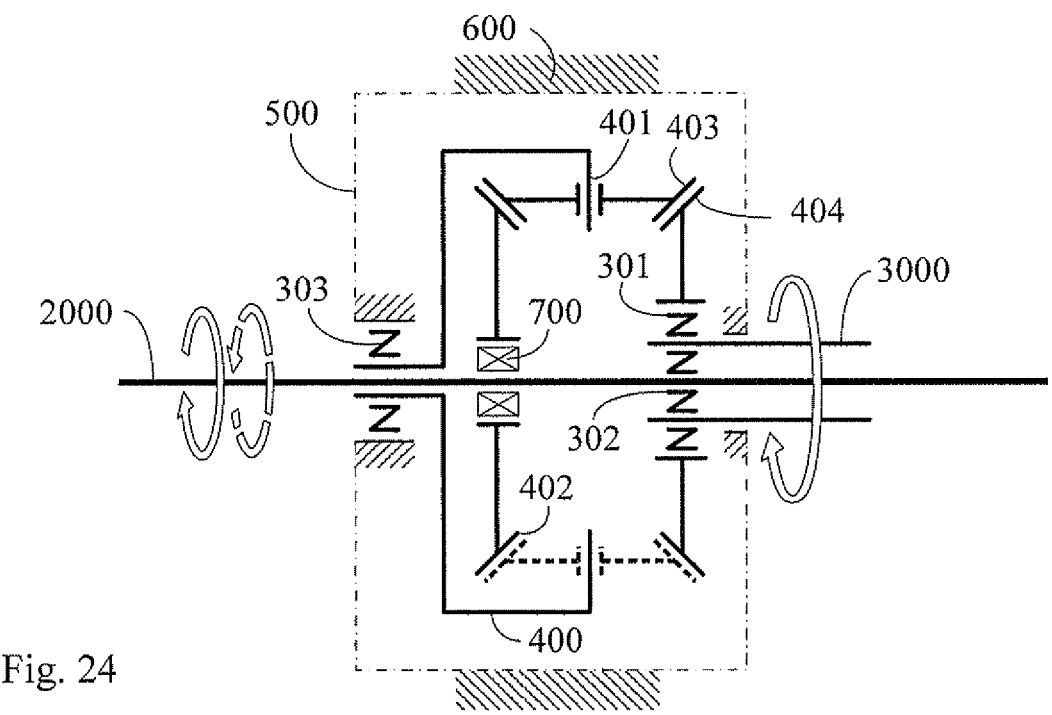
FIG. 24 is a structural schematic view showing the 10th embodiment of the clutch control reversible transmission wheel system with bidirectional input and one-way output constituted by the epicyclic gear train, according to the present invention.

FIG. 24 is a structural schematic view showing the 10th embodiment of the clutch control reversible transmission wheel system with bidirectional input and one-way output constituted by the epicyclic gear train, according to the present invention.

As shown in FIG. 24, the clutch control reversible transmission wheel system with bidirectional input and one-way output of the present invention is constituted by the epicyclic gear train with the input shaft and the output shaft coaxial fitting, the main components including:

one end of the input shaft (2000) is through installed at the epicyclic gear support arm annular shelf (400) via a bearing structure, the epicyclic gear support arm annular shelf (400) is integrated with one side of the shell of the transmission gear train (500) via the one-way transmission (303), the other end of the input shaft (2000) perforates through the output shaft (3000) via the one-way transmission (302), and a bearing is installed between the output shaft (3000) and the shell of the transmission gear train (500);

connectable or releasable clutch device (700): related to a mechanism driven to be connected or released by human power, or machine power, or aerodynamic force, or fluid power, or electromagnetic force;

shell of the transmission gear train (500): machine parts installed for constituting the clutch control reversible transmission wheel system with bidirectional input and one-way output;

machine body (600): a relatively static mechanism structure;

the input shaft (2000) is integrated with the inner bevel wheel (402) via the connectable or releasable clutch device (700);

the epicyclic gear (403) is installed between the outer bevel wheel (404) and the inner bevel wheel (402); the center of the epicyclic gear (403) rotates at the epicyclic gear shaft (401), the epicyclic gear shaft (401) is integrated with the epicyclic gear support arm annular shelf (400), and the epicyclic gear support arm annular shelf (400) is arranged to rotate between the input shaft (2000) and the one-way transmission (303);

the shell of the transmission gear train (500) is fixed at the machine body (600);

the outer bevel wheel (404) is surrounded installed to the output shaft (3000) via the one-way transmission (301);

the inner bevel wheel (402), the epicyclic gear (403), and the outer bevel wheel (404) are constituted by gears or friction wheels; the relation of the transmission ratio of the inner bevel wheel (402) to drive the epicyclic gear (403) includes acceleration, deceleration, or constant velocity;

the relation of the transmission ratio of the epicyclic gear (403) to drive the outer bevel wheel (404) includes acceleration, deceleration, or constant velocity;

by way of the above structures, the input shaft (2000) driven at the first rotary direction, and is through the one-way transmission (302) for driving the output shaft (3000) to produce the first rotary direction output to constitute the first transmission gear train;

by way of the above structures, if the connectable or releasable clutch device (700) is locked, the input shaft (2000) is driven at the second rotary direction, and is through the inner bevel wheel (402), the epicyclic gear (403), and the outer bevel wheel (404), and then through the one-way transmission (301) for driving the output shaft (3000) to produce the first rotary direction output to constitute the second transmission gear train; and when reverse drive caused by back move occurs at the output shaft (3000), through releasing the connectable or releasable clutch device (700), the first transmission gear train and the second transmission gear train are prevented from lock status.

Figure 25:
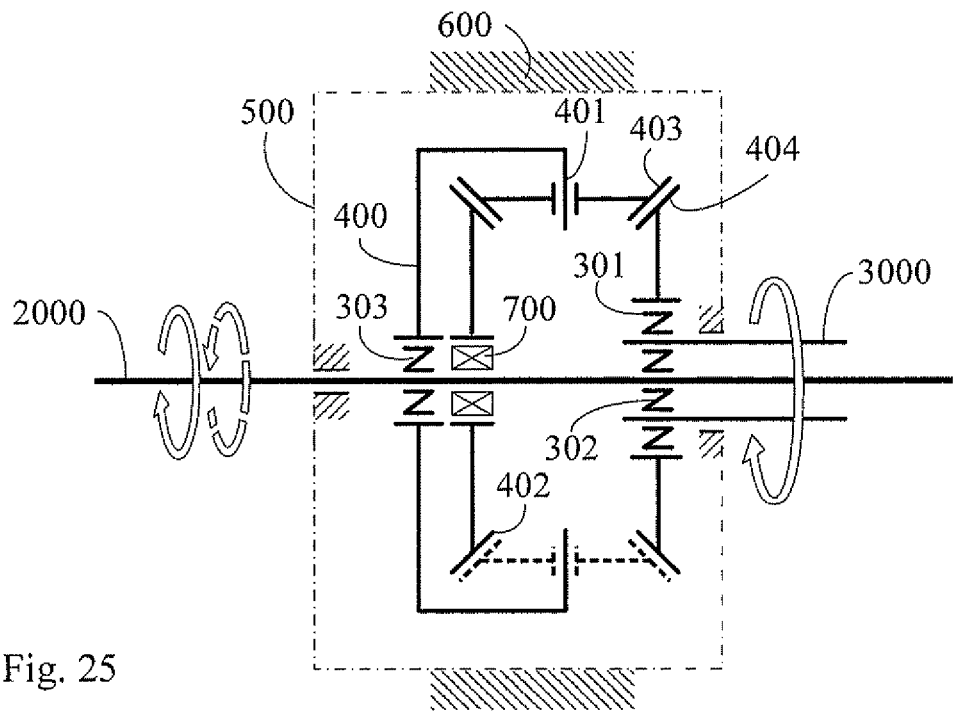
FIG. 25 is a structural schematic view showing the 11th embodiment of the clutch control reversible transmission wheel system with bidirectional input and one-way output constituted by the epicyclic gear train, according to the present invention.

FIG. 25 is a structural schematic view showing the 11th embodiment of the clutch control reversible transmission wheel system with bidirectional input and one-way output constituted by the epicyclic gear train, according to the present invention.

As shown in FIG. 25, the clutch control reversible transmission wheel system with bidirectional input and one-way output of the present invention is constituted by the epicyclic gear train with the input shaft and the output shaft coaxial fitting, the main components including:

one end of the input shaft (2000) is through installed at one side of the shell of the transmission gear train (500) via a bearing structure, the other end of the input shaft (2000) perforates through the output shaft (3000) via the one-way transmission (302), and a bearing is installed between the output shaft (3000) and the shell of the transmission gear train (500);

connectable or releasable clutch device (700): related to a mechanism driven to be connected or released by human power, or machine power, or aerodynamic force, or fluid power, or electromagnetic force;

shell of the transmission gear train (500): machine parts installed for constituting the clutch control reversible transmission wheel system with bidirectional input and one-way output;

machine body (600): a relatively static mechanism structure;

the input shaft (2000) is integrated with the inner bevel wheel (402) via the connectable or releasable clutch device (700);

the epicyclic gear (403) is installed between the outer bevel wheel (404) and the inner bevel wheel (402); the center of the epicyclic gear (403) rotates at the epicyclic gear shaft (401), the epicyclic gear shaft (401) is integrated with the epicyclic gear support arm annular shelf (400) neighboring the shell of the transmission gear train (500), and the one-way transmission (303) is installed between the epicyclic gear support arm annular shelf (400) and the input shaft (2000);

the shell of the transmission gear train (500) is fixed at the machine body (600);

the outer bevel wheel (404) is surrounded installed to the output shaft (3000) via the one-way transmission (301);

the inner bevel wheel (402), the epicyclic gear (403), and the outer bevel wheel (404) are constituted by gears or friction wheels;

the relation of the transmission ratio of the inner bevel wheel (402) to drive the epicyclic gear (403) includes acceleration, deceleration, or constant velocity;

the relation of the transmission ratio of the epicyclic gear (403) to drive the outer bevel wheel (404) includes acceleration, deceleration, or constant velocity;

by way of the above structures, the input shaft (2000) is driven at the first rotary direction, and is through the one-way transmission (302) for driving the output shaft (3000) to produce the first rotary direction output to constitute the first transmission gear train;

by way of the above structures, if the connectable or releasable clutch device (700) is locked, the input shaft (2000) is driven at the second rotary direction, and is through the inner bevel wheel (402), the epicyclic gear (403), and the outer bevel wheel (404), and then through the one-way transmission (301) for driving the output shaft (3000) to produce the first rotary direction output to constitute the second transmission gear train; and when reverse drive caused by back move occurs at the output shaft (3000), through releasing the connectable or releasable clutch device (700), the first transmission gear train and the second transmission gear train are prevented from lock status.

Figure 26:
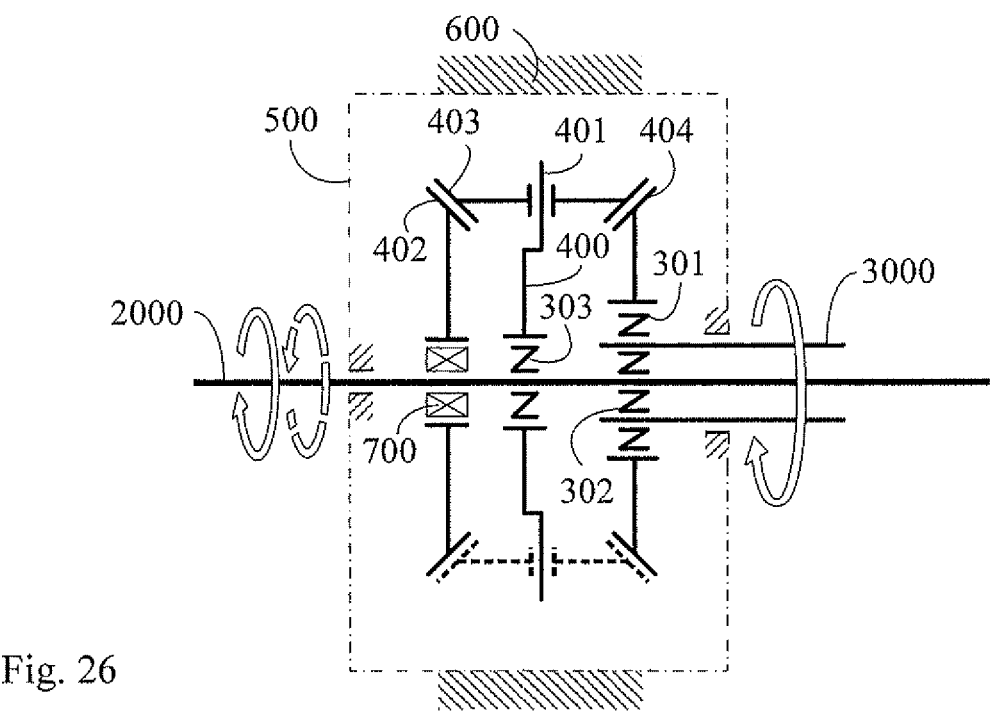
FIG. 26 is a structural schematic view showing the 12th embodiment of the clutch control reversible transmission wheel system with bidirectional input and one-way output constituted by the epicyclic gear train, according to the present invention.

FIG. 26 is a structural schematic view showing the 12th embodiment of the clutch control reversible transmission wheel system with bidirectional input and one-way output constituted by the epicyclic gear train, according to the present invention.

As shown in FIG. 26, the clutch control reversible transmission wheel system with bidirectional input and one-way output of the present invention is constituted by the epicyclic gear train with the input shaft and the output shaft coaxial fitting, the main components including:

one end of the input shaft (2000) is through installed at one side of the shell of the transmission gear train (500) via a bearing structure, the other end of the input shaft (2000) perforates through the output shaft (3000) via the one-way transmission (302), and a bearing is installed between the output shaft (3000) and the shell of the transmission gear train (500);

connectable or releasable clutch device (700): related to a mechanism driven to be connected or released by human power, or machine power, or aerodynamic force, or fluid power, or electromagnetic force;

shell of the transmission gear train (500): machine parts installed for constituting the clutch control reversible transmission wheel system with bidirectional input and one-way output;

machine body (600): a relatively static mechanism structure;

the input shaft (2000) is integrated with the inner bevel wheel (402) via the connectable or releasable clutch device (700);

the epicyclic gear (403) is installed between the outer bevel wheel (404) and the inner bevel wheel (402); the center of the epicyclic gear (403) rotates at the epicyclic gear shaft (401), the epicyclic gear shaft (401) is integrated with the epicyclic gear support arm annular shelf (400) installed between the inner bevel wheel (402) and the one-way transmission (302), and the one-way transmission (303) is installed between the epicyclic gear support arm annular shelf (400) and the input shaft (2000);

the shell of the transmission gear train (500) is fixed at the machine body (600);

the outer bevel wheel (404) is surrounded installed to the output shaft (3000) via the one-way transmission (301);

the inner bevel wheel (402), the epicyclic gear (403), and the outer bevel wheel (404) are constituted by gears or friction wheels;

the relation of the transmission ratio of the inner bevel wheel (402) to drive the epicyclic gear (403) includes acceleration, deceleration, or constant velocity;

the relation of the transmission ratio of the epicyclic gear (403) to drive the outer bevel wheel (404) includes acceleration, deceleration, or constant velocity;

by way of the above structures, the input shaft (2000) is driven at the first rotary direction, and is through the one-way transmission (302) for driving the output shaft (3000) to produce the first rotary direction output to constitute the first transmission gear train;

by way of the above structures, if the connectable or releasable clutch device (700) is locked, the input shaft (2000) is driven at the second rotary direction, and is through the inner bevel wheel (402), the epicyclic gear (403), and the outer bevel wheel (404), and then through the one-way transmission (301) for driving the output shaft (3000) to produce the first rotary direction output to constitute the second transmission gear train; and when reverse drive caused by back move occurs at the output shaft (3000), through releasing the connectable or releasable clutch device (700), the first transmission gear train and the second transmission gear train are prevented from lock status.

Figure 27:
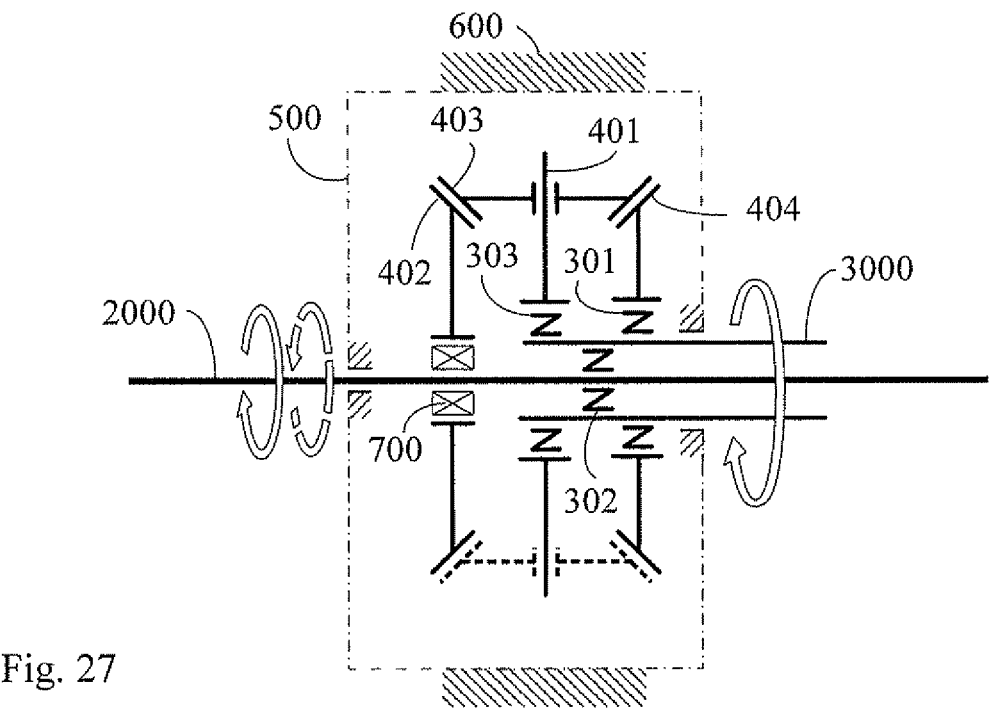
FIG. 27 is a structural schematic view showing the 13th embodiment of the clutch control reversible transmission wheel system with bidirectional input and one-way output constituted by the epicyclic gear train, according to the present invention.

FIG. 27 is a structural schematic view showing the 13th embodiment of the clutch control reversible transmission wheel system with bidirectional input and one-way output constituted by the epicyclic gear train, according to the present invention.

As shown in FIG. 27, the clutch control reversible transmission wheel system with bidirectional input and one-way output of the present invention is constituted by the epicyclic gear train with the input shaft and the output shaft coaxial fitting, the main components including:

one end of the input shaft (2000) is through installed at one side of the shell of the transmission gear train (500) via a bearing structure, the other end of the input shaft (2000) perforates through the output shaft (3000) via the one-way transmission (302), and a bearing is installed between the output shaft (3000) and the shell of the transmission gear train (500);

connectable or releasable clutch device (700): related to a mechanism driven to be connected or released by human power, or machine power, or aerodynamic force, or fluid power, or electromagnetic force;

shell of the transmission gear train (500): machine parts installed for constituting the clutch control reversible transmission wheel system with bidirectional input and one-way output;

machine body (600): a relatively static mechanism structure;

the input shaft (2000) is integrated with the inner bevel wheel (402) via the connectable or releasable clutch device (700);

the epicyclic gear (403) is installed between the outer bevel wheel (404) and the inner bevel wheel (402); the center of the epicyclic gear (403) rotates at the epicyclic gear shaft (401), the epicyclic gear shaft (401) is integrated with the epicyclic gear support arm annular shelf (400) installed at the output shaft (3000), and the one-way transmission (303) is installed between the epicyclic gear support arm annular shelf (400) and the output shaft (3000);

the shell of the transmission gear train (500) is fixed at the machine body (600);

the outer bevel wheel (404) is surrounded installed to the output shaft (3000) via the one-way transmission (301);

the inner bevel wheel (402), the epicyclic gear (403), and the outer bevel wheel (404) are constituted by gears or friction wheels;

the relation of the transmission ratio of the inner bevel wheel (402) to drive the epicyclic gear (403) includes acceleration, deceleration, or constant velocity;

the relation of the transmission ratio of the epicyclic gear (403) to drive the outer bevel wheel (404) includes acceleration, deceleration, or constant velocity;

by way of the above structures, the input shaft (2000) is driven at the first rotary direction, and is through the one-way transmission (302) for driving the output shaft (3000) to produce the first rotary direction output to constitute the first transmission gear train;

by way of the above structures, if the connectable or releasable clutch device (700) is locked, the input shaft (2000) is driven at the second rotary direction, and is through the inner bevel wheel (402), the epicyclic gear (403), and the outer bevel wheel (404), and then through the one-way transmission (301) for driving the output shaft (3000) to produce the first rotary direction output to constitute the second transmission gear train; and when reverse drive caused by back move occurs at the output shaft (3000), through releasing the connectable or releasable clutch device (700), the first transmission gear train and the second transmission gear train are prevented from lock status.

Figure 28:
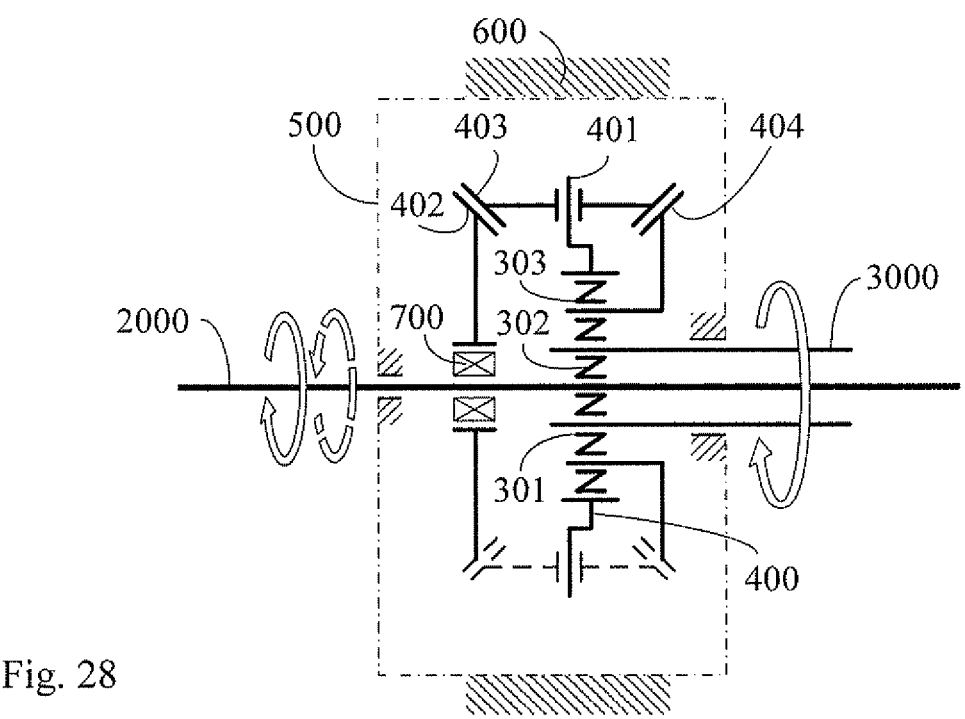
FIG. 28 is a structural schematic view showing the 14th embodiment of the clutch control reversible transmission wheel system with bidirectional input and one-way output constituted by the epicyclic gear train, according to the present invention.

FIG. 28 is a structural schematic view showing the 14th embodiment of the clutch control reversible transmission wheel system with bidirectional input and one-way output constituted by the epicyclic gear train, according to the present invention.

As shown in FIG. 28, the clutch control reversible transmission wheel system with bidirectional input and one-way output of the present invention is constituted by the epicyclic gear train with the input shaft and the output shaft coaxial fitting, the main components including:

one end of the input shaft (2000) is through installed at one side of the shell of the transmission gear train (500) via a bearing structure, the other end of the input shaft (2000) perforates through the output shaft (3000) via the one-way transmission (302), and a bearing is installed between the output shaft (3000) and the shell of the transmission gear train (500);

connectable or releasable clutch device (700): related to a mechanism driven to be connected or released by human power, or machine power, or aerodynamic force, or fluid power, or electromagnetic force;

shell of the transmission gear train (500): machine parts installed for constituting the clutch control reversible transmission wheel system with bidirectional input and one-way output;

machine body (600): a relatively static mechanism structure;

the input shaft (2000) is integrated with the inner bevel wheel (402) via the connectable or releasable clutch device (700);

the epicyclic gear (403) is installed between the outer bevel wheel (404) and the inner bevel wheel (402); the center of the epicyclic gear (403) rotates at the epicyclic gear shaft (401), the epicyclic gear shaft (401) is integrated with the epicyclic gear support arm annular shelf (400), and the one-way transmission (303) is installed between the epicyclic gear support arm annular shelf (400) and the outer bevel wheel (404);

the shell of the transmission gear train (500) is fixed at the machine body (600);

the outer bevel wheel (404) is surrounded installed to the output shaft (3000) via the one-way transmission (301);

the inner bevel wheel (402), the epicyclic gear (403), and the outer bevel wheel (404) are constituted by gears or friction wheels;

the relation of the transmission ratio of the inner bevel wheel (402) to drive the epicyclic gear (403) includes acceleration, deceleration, or constant velocity;

the relation of the transmission ratio of the epicyclic gear (403) to drive the outer bevel wheel (404) includes acceleration, deceleration, or constant velocity;

by way of the above structures, the input shaft (2000) is driven at the first rotary direction, and is through the one-way transmission (302) for driving the output shaft (3000) to produce the first rotary direction output to constitute the first transmission gear train;

by way of the above structures, if the connectable or releasable clutch device (700) is locked, the input shaft (2000) is driven at the second rotary direction, and is through the inner bevel wheel (402), the epicyclic gear (403), and the outer bevel wheel (404), and then through the one-way transmission (301) for driving the output shaft (3000) to produce the first rotary direction output to constitute the second transmission gear train; and when reverse drive caused by back move occurs at the output shaft (3000), through releasing the connectable or releasable clutch device (700), the first transmission gear train and the second transmission gear train are prevented from lock status.

Figure 29:
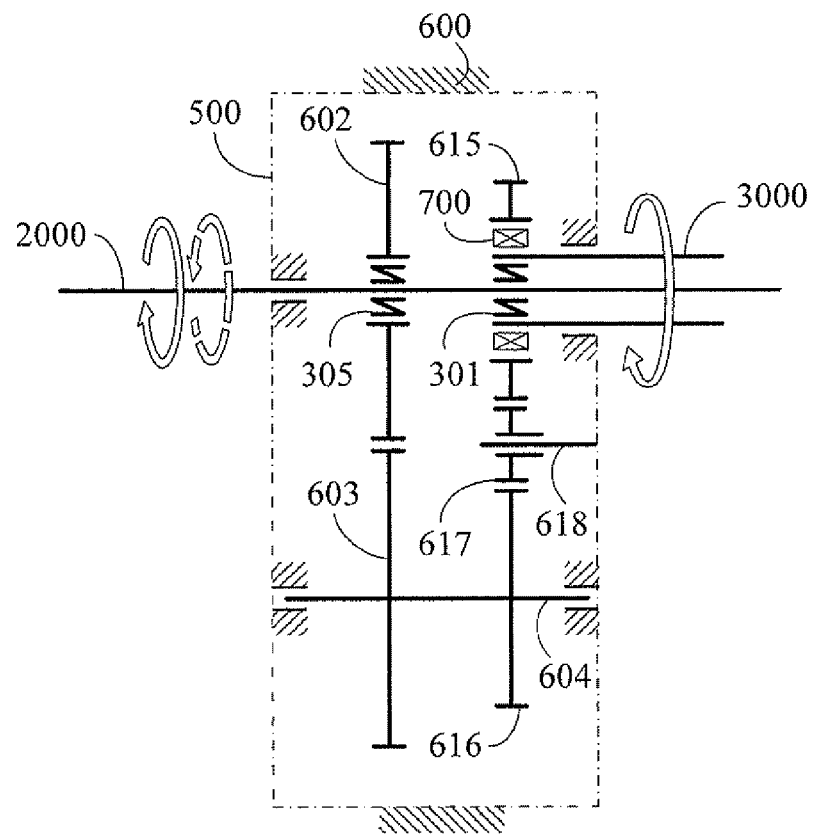
FIG. 29 is a structural schematic view showing the 1st embodiment of the clutch control reversible transmission wheel system with bidirectional input and one-way output constituted by integrating with the transmissions with different drive rotary directions, according to the present invention.

For C: as shown in FIGS. 29 to 40, the clutch control reversible transmission wheel system with bidirectional input and one-way output of the present invention is constituted by integrating with the transmissions with different drive rotary directions, including:

FIG. 29 is a structural schematic view showing the 1st embodiment of the clutch control reversible transmission wheel system with bidirectional input and one-way output constituted by integrating with the transmissions with different drive rotary directions, according to the present invention.

As shown in FIG. 29, the clutch control reversible transmission wheel system with bidirectional input and one-way output of the present invention is constituted by integrating with the transmissions with different drive rotating directions with the input shaft and the output shaft coaxial fitting, the main components including:

one end of the input shaft (2000) is through installed at one side of the shell of the transmission gear train (500) via a bearing structure, the other end of the input shaft (2000) perforates through the output shaft (3000) via the one-way transmission (301), a bearing is installed between the output shaft (3000) and the shell of the transmission gear train (500);

connectable or releasable clutch device (700): related to a mechanism driven to be connected or released by human power, or machine power, or aerodynamic force, or fluid power, or electromagnetic force;

shell of the transmission gear train (500): machine parts installed for constituting the clutch control reversible transmission wheel system with bidirectional input and one-way output;

machine body (600): a relatively static mechanism structure;

the input shaft (2000) is perforating through the one-way transmission (305), and then integrated with the transmission wheel (602);

the transmission wheel (602) and the transmission wheel (603) are transmitted in different rotary directions, the transmission wheel (603) and the transmission wheel (616) are co-integrated with the revolving shaft (604), and a bearing is installed between the revolving shaft (604) and the shell of the transmission gear train (500);

the transmission wheel (616) is via the transmission wheel (617) rotating at the revolving shaft (618) to drive the transmission wheel (615) for constituting a transmission wheel set with the same rotary direction;

the revolving shaft (618) is integrated with the shell of the transmission gear train (500);

the connectable or releasable clutch device (700) is installed between the transmission wheel (615) and the output shaft (3000);

the shell of the transmission gear train (500) is fixed at the machine body (600);

the transmission wheels (602), (603), (615), (616), and (617) are constituted by gears or friction wheels;

the relation of the transmission ratio between the transmission wheel set with different rotary directions includes acceleration, deceleration, or constant velocity;

the relation of the transmission ratio between the transmission wheel set with the same rotary direction includes acceleration, deceleration, or constant velocity;

the transmission wheel set with the same rotary direction are constituted by the gear set including an idler wheel or by the internal gear set;

by way of the above structures, the input shaft (2000) is driven at the first rotary direction, and is through the one-way transmission (301) for driving the output shaft (3000) to produce the first rotary direction output to constitute the first transmission gear train;

by way of the above structures, if the connectable or releasable clutch device (700) is locked, the input shaft (2000) is driven at the second rotary direction, and is through the one-way transmission (305) driving the transmission wheel (602), and through the transmission wheel (602) driving the transmission wheel (603) and the transmission wheel (616), and then through the transmission wheel (616) via the transmission wheel (617) for further driving the transmission wheel (615), and then through the transmission wheel (615) via the connectable or releasable clutch device (700) for driving the output shaft (3000) to produce the first rotary direction output to constitute the second transmission gear train; and when reverse drive caused by back move occurs at the output shaft (3000), through releasing the connectable or releasable clutch device (700), the first transmission gear train and the second transmission gear train are prevented from lock status.

Figure 30:
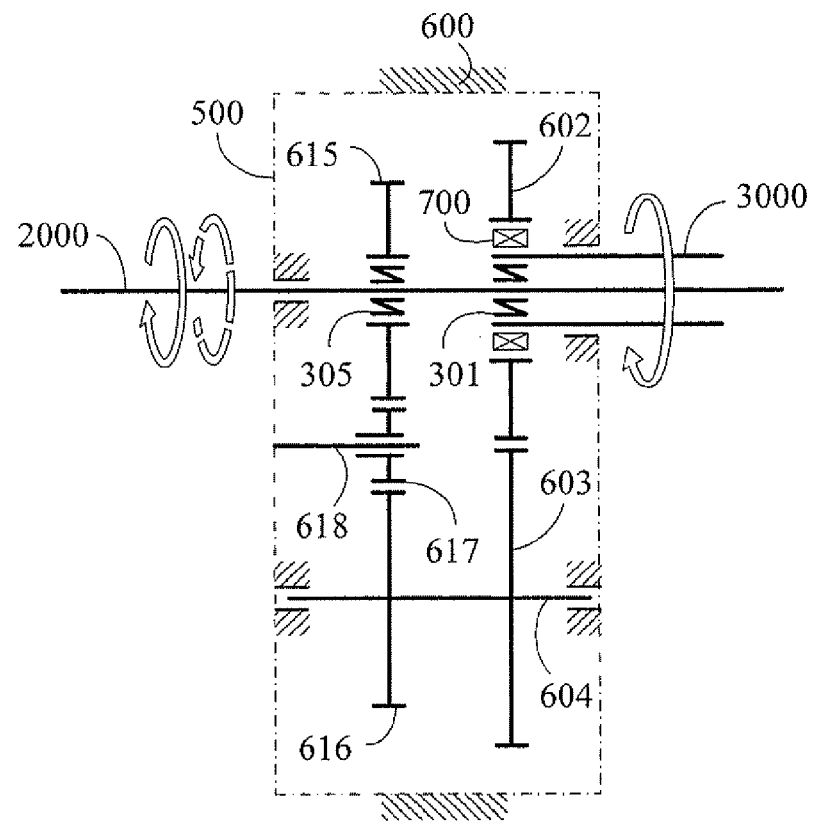
FIG. 30 is a structural schematic view showing the 2nd embodiment of the clutch control reversible transmission wheel system with bidirectional input and one-way output constituted by integrating with the transmissions with different drive rotary directions, according to the present invention.

FIG. 30 is a structural schematic view showing the 2nd embodiment of the clutch control reversible transmission wheel system with bidirectional input and one-way output constituted by integrating with the transmissions with different drive rotary directions, according to the present invention.

As shown in FIG. 30, the clutch control reversible transmission wheel system with bidirectional input and one-way output of the present invention is constituted by integrating with the transmissions with different drive rotating directions with the input shaft and the output shaft coaxial fitting, the main components including:

one end of the input shaft (2000) is through installed at one side of the shell of the transmission gear train (500) via a bearing structure, the other end of the input shaft (2000) perforates through the output shaft (3000) via the one-way transmission (301), a bearing is installed between the output shaft (3000) and the shell of the transmission gear train (500);

connectable or releasable clutch device (700): related to a mechanism driven to be connected or released by human power, or machine power, or aerodynamic force, or fluid power, or electromagnetic force;

shell of the transmission gear train (500): machine parts installed for constituting the clutch control reversible transmission wheel system with bidirectional input and one-way output;

machine body (600): a relatively static mechanism structure;

the input shaft (2000) is perforating through the one-way transmission (305), and then integrated with the transmission wheel (615);

the transmission wheel (615) is via the transmission wheel (617) rotating at the revolving shaft (618) to drive the transmission wheel (616), the transmission wheel (616) and the transmission wheel (603) are co-integrated with the revolving shaft (604), and a bearing is installed between the revolving shaft (604) and the shell of the transmission gear train (500);

the revolving shaft (618) is integrated with the shell of the transmission gear train (500);

the transmission wheel (603) and the transmission wheel (602) are integrated for a transmission wheel set with different rotary directions;

the connectable or releasable clutch device (700) is installed between the transmission wheel (602) and the output shaft (3000);

the shell of the transmission gear train (500) is fixed at the machine body (600);

the transmission wheels (602), (603), (615), (616), and (617) are constituted by gears or friction wheels;

the relation of the transmission ratio between the transmission wheel set with different rotary directions includes acceleration, deceleration, or constant velocity;

the relation of the transmission ratio between the transmission wheel set with the same rotary direction includes acceleration, deceleration, or constant velocity;

the transmission wheel set with the same rotary direction are constituted by the gear set including an idler wheel or by the internal gear set;

by way of the above structures, the input shaft (2000) is driven at the first rotary direction, and is through the one-way transmission (301) for driving the output shaft (3000) to produce the first rotary direction output to constitute the first transmission gear train;

by way of the above structures, if the connectable or releasable clutch device (700) is locked, the input shaft (2000) is driven at the second rotary direction, and is through the one-way transmission (305) driving the transmission wheel (615), and through the transmission wheel (615) driving the transmission wheel (616) and the transmission wheel (603) via the transmission wheel (617), and then through the transmission wheel (603) driving the transmission wheel (602), and then through the transmission wheel (602) via the connectable or releasable clutch device (700) for driving the output shaft (3000) to produce the first rotary direction output to constitute the second transmission gear train; and when reverse drive caused by back move occurs at the output shaft (3000), through releasing the connectable or releasable clutch device (700), the first transmission gear train and the second transmission gear train are prevented from lock status.

Figure 31:
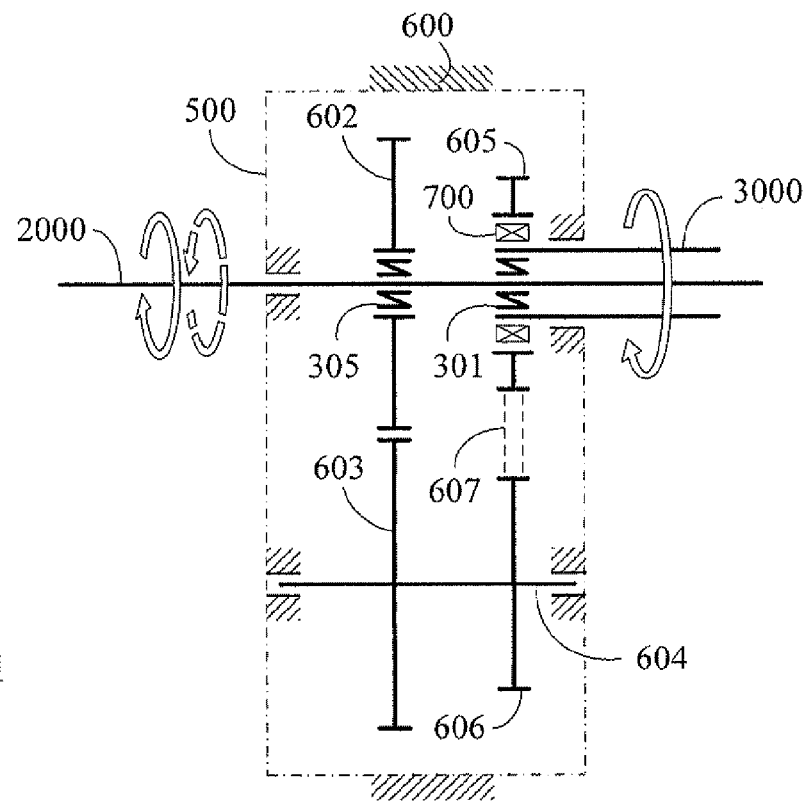
FIG. 31 is a structural schematic view showing the 3rd embodiment of the clutch control reversible transmission wheel system with bidirectional input and one-way output constituted by integrating with the transmissions with different drive rotary directions, according to the present invention.

FIG. 31 is a structural schematic view showing the 3rd embodiment of the clutch control reversible transmission wheel system with bidirectional input and one-way output constituted by integrating with the transmissions with different drive rotary directions, according to the present invention.

As shown in FIG. 31, the clutch control reversible transmission wheel system with bidirectional input and one-way output of the present invention is constituted by integrating with the transmissions with different drive rotating directions with the input shaft and the output shaft coaxial fitting, the main components including:

one end of the input shaft (2000) is through installed at one side of the shell of the transmission gear train (500) via a bearing structure, the other end of the input shaft (2000) perforates through the output shaft (3000) via the one-way transmission (301), a bearing is installed between the output shaft (3000) and the shell of the transmission gear train (500);

connectable or releasable clutch device (700): related to a mechanism driven to be connected or released by human power, or machine power, or aerodynamic force, or fluid power, or electromagnetic force;

shell of the transmission gear train (500): machine parts installed for constituting the clutch control reversible transmission wheel system with bidirectional input and one-way output;

machine body (600): a relatively static mechanism structure;

the input shaft (2000) is perforating through the one-way transmission (305), and then integrated with the transmission wheel (602);

the driving wheel (602) and the driving wheel (603) are transmitted in different rotary directions, the transmission wheel (603) and the transmission wheel (606) are co-integrated with the revolving shaft (604), and a bearing is installed between the revolving shaft (604) and the shell of the transmission gear train (500);

the transmission wheel (606) and the transmission wheel (605) are constituted by the pulley or the sprocket that are transmitted by the transmission belt (607) to constituted a transmission wheel set with the same rotary direction;

the connectable or releasable clutch device (700) is installed between the transmission wheel (605) and the output shaft (3000);

the shell of the transmission gear train (500) is fixed at the machine body (600);

the transmission wheels (602) and (603) are constituted by gears or friction wheels;

the relation of the transmission ratio between the transmission wheel set with different rotary directions includes acceleration, deceleration, or constant velocity;

the relation of the transmission ratio between the transmission wheel set with the same rotary direction includes acceleration, deceleration, or constant velocity;

the transmission wheel set with the same rotary direction are constituted by transmission belt, pulley (such as toothed belt or steel belt), or sprocket with chain;

by way of the above structures, the input shaft (2000) is driven at the first rotary direction, and is through the one-way transmission (301) for driving the output shaft (3000) to produce the first rotary direction output to constitute the first transmission gear train;

by way of the above structures, if the connectable or releasable clutch device (700) is locked, the input shaft (2000) is driven at the second rotary direction, and is through the one-way transmission (305) driving the transmission wheel (602), and through the transmission wheel (602) driving the transmission wheel (603) and the transmission wheel (606), and then through the transmission wheel (606) driving the transmission wheel (605), and then via the connectable or releasable clutch device (700) for driving the output shaft (3000) to produce the first rotary direction output to constitute the second transmission gear train; and when reverse drive caused by back move occurs at the output shaft (3000), through releasing the connectable or releasable clutch device (700), the first transmission gear train and the second transmission gear train are prevented from lock status.

Figure 32:
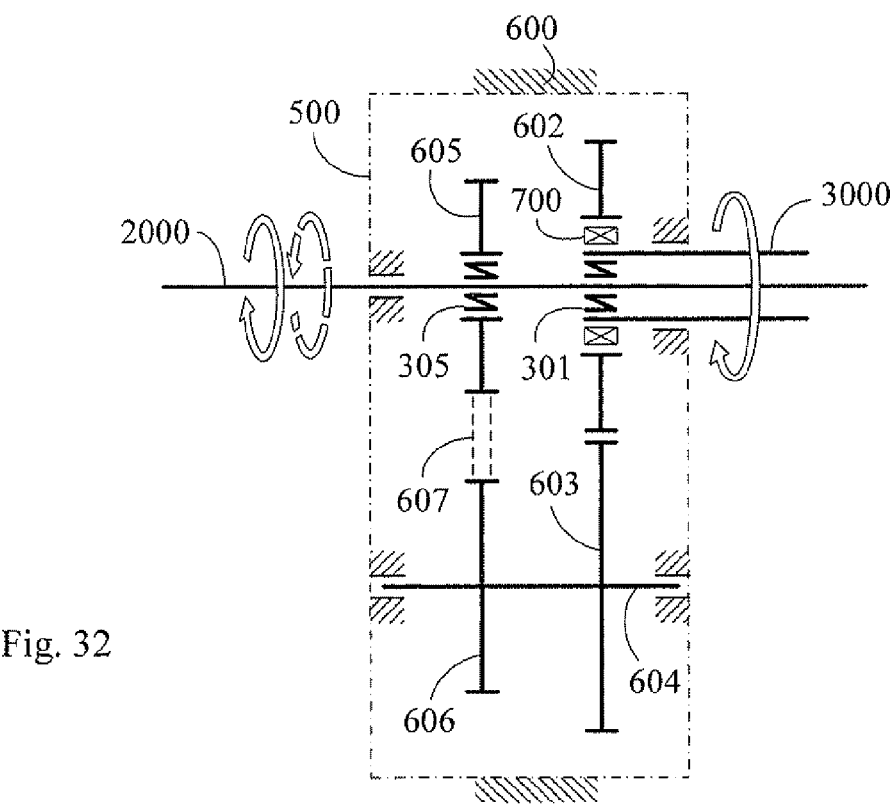
FIG. 32 is a structural schematic view showing the 4th embodiment of the clutch control reversible transmission wheel system with bidirectional input and one-way output constituted by integrating with the transmissions with different drive rotary directions, according to the present invention.

FIG. 32 is a structural schematic view showing the 4th embodiment of the clutch control reversible transmission wheel system with bidirectional input and one-way output constituted by integrating with the transmissions with different drive rotary directions, according to the present invention.

As shown in FIG. 32, the clutch control reversible transmission wheel system with bidirectional input and one-way output of the present invention is constituted by integrating with the transmissions with different drive rotating directions with the input shaft and the output shaft coaxial fitting, the main components including:

one end of the input shaft (2000) is through installed at one side of the shell of the transmission gear train (500) via a bearing structure, the other end of the input shaft (2000) is perforating through the output shaft (3000) via the one-way transmission (301), a bearing is installed between the output shaft (3000) and the shell of the transmission gear train (500);

connectable or releasable clutch device (700): related to a mechanism driven to be connected or released by human power, or machine power, or aerodynamic force, or fluid power, or electromagnetic force;

shell of the transmission gear train (500): machine parts installed for constituting the clutch control reversible transmission wheel system with bidirectional input and one-way output;

machine body (600): a relatively static mechanism structure;

the input shaft (2000) is perforating through the one-way transmission (305), and then integrated with the transmission wheel (605);

the transmission wheel (606) and the transmission wheel (605) are constituted by the pulley or the sprocket that are transmitted by the transmission belt (607) to constituted a transmission wheel set with the same rotary direction, the transmission wheel (603) and the transmission wheel (606) are co-integrated with the revolving shaft (604), and a bearing is installed between the revolving shaft (604) and the shell of the transmission gear train (500);

the transmission wheel (603) and the transmission wheel (602) are transmitted indifferent rotary directions;

the connectable or releasable clutch device (700) is installed between the transmission wheel (602) and the output shaft (3000);

the shell of the transmission gear train (500) is fixed at the machine body (600);

the transmission wheels (602) and (603) are constituted by gears or friction wheels;

the relation of the transmission ratio between the transmission wheel set with different rotary directions includes acceleration, deceleration, or constant velocity;

the relation of the transmission ratio between the transmission wheel set with the same rotary direction includes acceleration, deceleration, or constant velocity;

the transmission wheel set with the same rotary direction are constituted by transmission belt, pulley (such as toothed belt or steel belt), or sprocket with chain;

by way of the above structures, the input shaft (2000) is driven at the first rotary direction, and is through the one-way transmission (301) for driving the output shaft (3000) to produce the first rotary direction output to constitute the first transmission gear train;

by way of the above structures, if the connectable or releasable clutch device (700) is locked, the input shaft (2000) is driven at the second rotary direction, and is through the one-way transmission (305) driving the transmission wheel (605), and through the transmission wheel (605) driving the transmission wheel (606) and the transmission wheel (603), and then through the transmission wheel (603) driving the transmission wheel (602), and then via the connectable or releasable clutch device (700) for driving the output shaft (3000) to produce the first rotary direction output to constitute the second transmission gear train; and when reverse drive caused by back move occurs at the output shaft (3000), through releasing the connectable or releasable clutch device (700), the first transmission gear train and the second transmission gear train are prevented from lock status.

Figure 33:
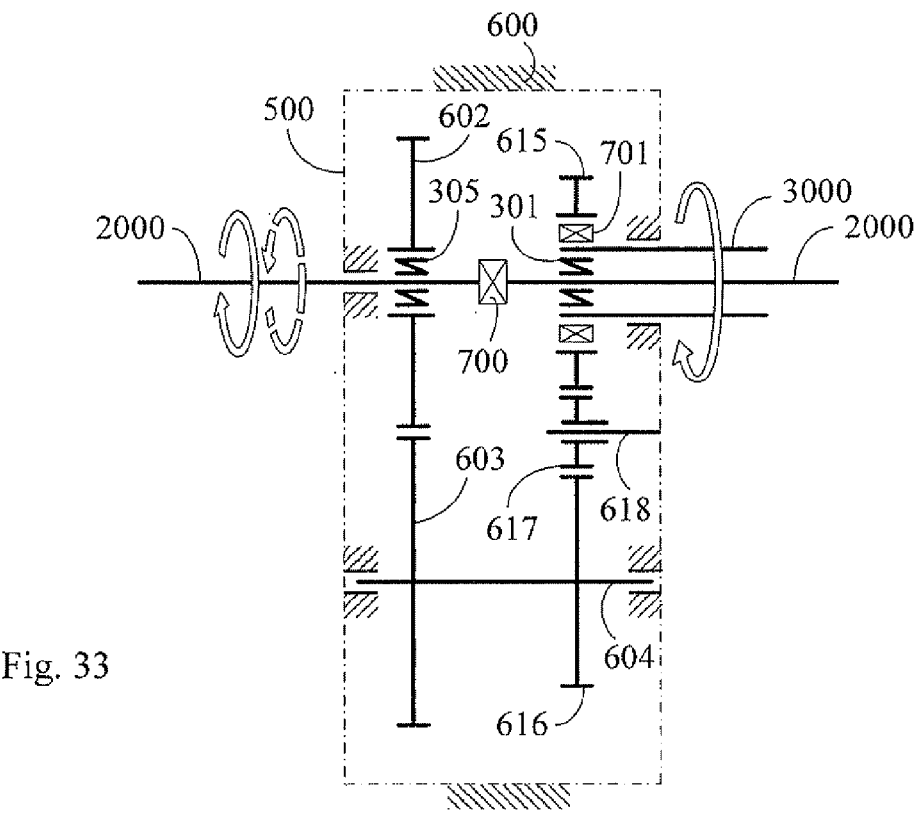
FIG. 33 is a structural schematic view showing the 5th embodiment of the clutch control reversible transmission wheel system with bidirectional input and one-way output constituted by integrating with the transmissions with different drive rotary directions, according to the present invention.

FIG. 33 is a structural schematic view showing the 5th embodiment of the clutch control reversible transmission wheel system with bidirectional input and one-way output constituted by integrating with the transmissions with different drive rotary directions, according to the present invention.

As shown in FIG. 33, the clutch control reversible transmission wheel system with bidirectional input and one-way output of the present invention is constituted by integrating with the transmissions with different drive rotating directions with the input shaft and the output shaft coaxial fitting, the main components including:

one end of the input shaft (2000) is through installed at one side of the shell of the transmission gear train (500) via a bearing structure, the other end of the input shaft (2000) is perforating through the output shaft (3000) via the connectable or releasable clutch device (700) and the one-way transmission (301), a bearing is installed between the output shaft (3000) and the shell of the transmission gear train (500);

connectable or releasable clutch devices (700), (701): related to mechanisms driven to be connected or released by human power, or machine power, or aerodynamic force, or fluid power, or electromagnetic force;

shell of the transmission gear train (500): machine parts installed for constituting the clutch control reversible transmission wheel system with bidirectional input and one-way output;

machine body (600): a relatively static mechanism structure;

input shaft (2000) perforates through the transmission wheel (602), and the one-way transmission (305) is installed between the above both;

the transmission wheel (602) and the transmission wheel (603) are transmitted in different rotary directions, the transmission wheel (603) and the transmission wheel (616) are co-integrated with the revolving shaft (604), and a bearing is installed between the revolving shaft (604) and the shell of the transmission gear train (500);

the transmission wheel (616) is via the transmission wheel (617) rotating at the revolving shaft (618) to drive the transmission wheel (615) for constituting a transmission wheel set with the same rotary direction;

the revolving shaft (618) is integrated with the shell of the transmission gear train (500);

the connectable or releasable clutch device (701) is installed between the transmission wheel (615) and the output shaft (3000);

the shell of the transmission gear train (500) is fixed at the machine body (600);

the transmission wheels (602), (603), (615), (616), and (617) are constituted by gears or friction wheels;

the relation of the transmission ratio between the transmission wheel set with different rotary directions includes acceleration, deceleration, or constant velocity;

the relation of the transmission ratio between the transmission wheel set with the same rotary direction includes acceleration, deceleration, or constant velocity;

the transmission wheel set with the same rotary direction are constituted by the gear set including an idler wheel or by the internal gear set;

by way of the above structures, the input shaft (2000) is driven at the first rotary direction, and is through the connectable or releasable clutch device (700) and the one-way transmission (302) for driving the output shaft (3000) to produce the first rotary direction output to constitute the first transmission gear train;

by way of the above structures, if the connectable or releasable clutch device (701) is locked, the input shaft (2000) is driven at the second rotary direction, and is through the one-way transmission (305) driving the transmission wheel (602), and through the transmission wheel (602) driving the transmission wheel (603) and the transmission wheel (616), and then through the transmission wheel (616) via the transmission wheel (617) for further driving the transmission wheel (615), and then the transmission wheel (615) via the connectable or releasable clutch device (701) for driving the output shaft (3000) to produce the first rotary direction output to constitute the second transmission gear train;

when reverse drive caused by back move occurs at the output shaft (3000), through releasing the connectable or releasable clutch device (700) and/or the connectable or releasable clutch device (701), the first transmission gear train and the second transmission gear train are prevented from lock status; and if the connectable or releasable clutch device (700) and the connectable or releasable clutch device (701) are released, the transmission status between the input shaft (2000) and the output shaft (3000) is in disengagement.

Figure 34:
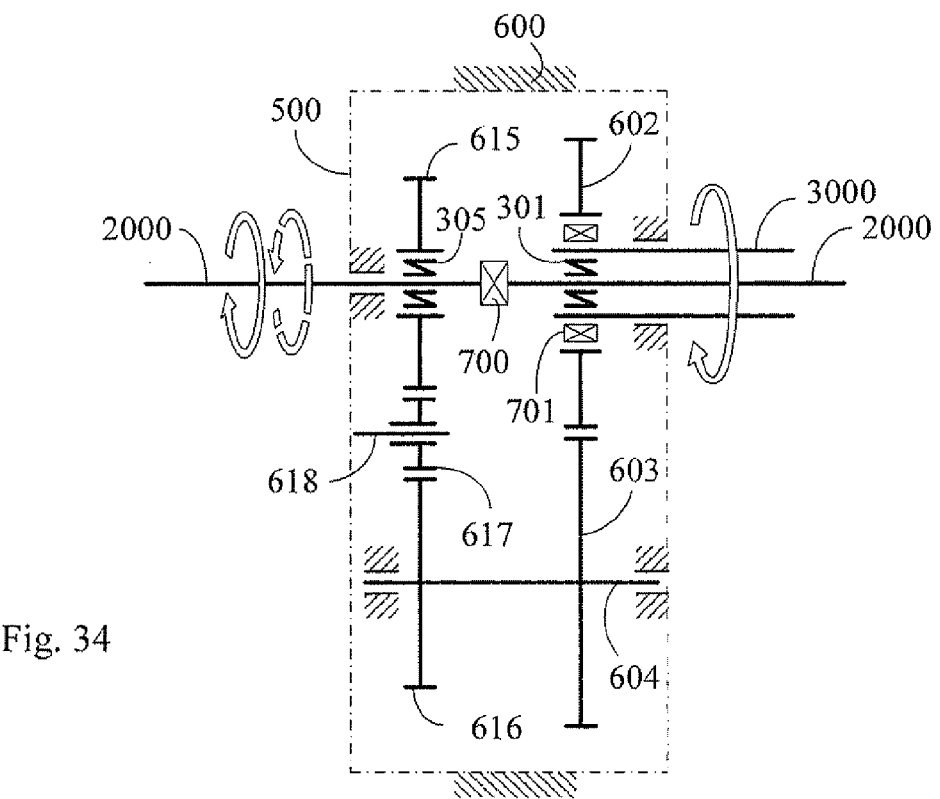
FIG. 34 is a structural schematic view showing the 6th embodiment of the clutch control reversible transmission wheel system with bidirectional input and one-way output constituted by integrating with the transmissions with different drive rotary directions, according to the present invention.

FIG. 34 is a structural schematic view showing the 6th embodiment of the clutch control reversible transmission wheel system with bidirectional input and one-way output constituted by integrating with the transmissions with different drive rotary directions, according to the present invention.

As shown in FIG. 34, the clutch control reversible transmission wheel system with bidirectional input and one-way output of the present invention is constituted by integrating with the transmissions with different drive rotating directions with the input shaft and the output shaft coaxial fitting, the main components including:

- one end of the input shaft (2000) is through installed at one side of the shell of the transmission gear train (500) via a bearing structure, the other end of the input shaft (2000) is perforating through the output shaft (3000) via the connectable or releasable clutch device (700) and the one-way transmission (301), a bearing is installed between the output shaft (3000) and the shell of the transmission gear train (500);
- connectable or releasable clutch devices (700), (701): related to mechanisms driven to be connected or released by human power, or machine power, or aerodynamic force, or fluid power, or electromagnetic force;
- shell of the transmission gear train (500): machine parts installed for constituting the clutch control reversible transmission wheel system with bidirectional input and one-way output;
- machine body (600): a relatively static mechanism structure;
- the input shaft (2000) perforates through the transmission wheel (615), and the one-way transmission (305) is installed between the above both;
- the transmission wheel (615) is via the transmission wheel (617) rotating at the revolving shaft (618) to drive the transmission wheel (616), the transmission wheel (616) and the transmission wheel (603) are co-integrated with the revolving shaft (604), and a bearing is installed between the revolving shaft (604) and the shell of the transmission gear train (500);
- the revolving shaft (618) is integrated with the shell of the transmission gear train (500);
- the transmission wheel (603) and the transmission wheel (602) are integrated for a transmission wheel set with different rotary directions;
- the connectable or releasable clutch device (701) is installed between the transmission wheel (602) and the output shaft (3000);
- the shell of the transmission gear train (500) is fixed at the machine body (600);
- the transmission wheels (602), (603), (615), (616), and (617) are constituted by gears or friction wheels;
- the relation of the transmission ratio between the transmission wheel set with different rotary directions includes acceleration, deceleration, or constant velocity;
- the relation of the transmission ratio between the transmission wheel set with the same rotary direction includes acceleration, deceleration, or constant velocity;
- the transmission wheel set with the same rotary direction are constituted by the gear set including an idler wheel or by the internal gear set;
- by way of the above structures, the input shaft (2000) is driven at the first rotary direction, and is through the connectable or releasable clutch device (700) and the one-way transmission (302) for driving the output shaft (3000) to produce the first rotary direction output to constitute the first transmission gear train;
- by way of the above structures, if the connectable or releasable clutch device (701) is locked, the input shaft (2000) is driven at the second rotary direction, and is through the one-way transmission (305) driving the transmission wheel (615), and through the transmission wheel (615) driving the transmission wheel (616) and the transmission wheel (603) via the transmission wheel (617), and then through the transmission wheel (603) driving the transmission wheel (602), and then through the transmission wheel (602) via the connectable or releasable clutch device (701) for driving the output shaft (3000) to produce the first rotary direction output to constitute the second transmission gear train;
- when reverse drive caused by back move occurs at the output shaft (3000), through releasing the connectable or releasable clutch device (700) and/or the connectable or releasable clutch device (701), the first transmission gear train and the second transmission gear train are prevented from lock status; and
- if the connectable or releasable clutch device (700) and the connectable or releasable clutch device (701) are released, the transmission status between the input shaft (2000) and the output shaft (3000) is in disengagement.

Figure 35:
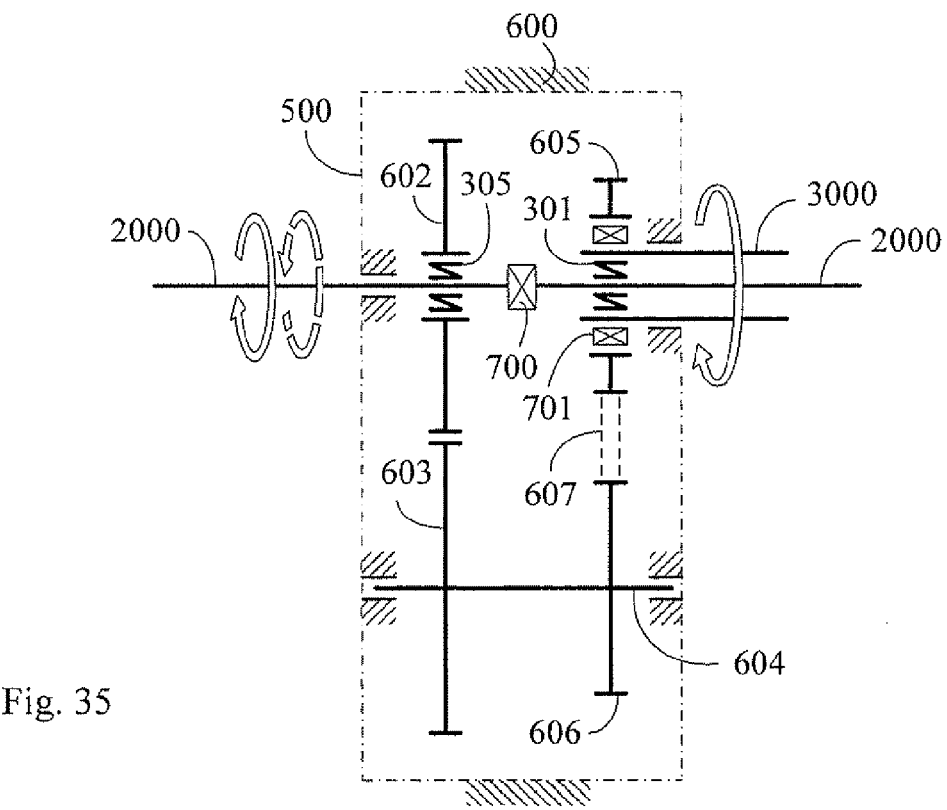
FIG. 35 is a structural schematic view showing the 7th embodiment of the clutch control reversible transmission wheel system with bidirectional input and one-way output constituted by integrating with the transmissions with different drive rotary directions, according to the present invention.

FIG. 35 is a structural schematic view showing the 7th embodiment of the clutch control reversible transmission wheel system with bidirectional input and one-way output constituted by integrating with the transmissions with different drive rotary directions, according to the present invention.

As shown in FIG. 35, the clutch control reversible transmission wheel system with bidirectional input and one-way output of the present invention is constituted by integrating with the transmissions with different drive rotating directions with the input shaft and the output shaft coaxial fitting, the main components including:

- one end of the input shaft (2000) is through installed at one side of the shell of the transmission gear train (500) via a bearing structure, the other end of the input shaft (2000) is perforating through the output shaft (3000) via the connectable or releasable clutch device (700) and the one-way transmission (301), a bearing is installed between the output shaft (3000) and the shell of the transmission gear train (500);
- connectable or releasable clutch devices (700), (701): related to mechanisms driven to be connected or released by human power, or machine power, or aerodynamic force, or fluid power, or electromagnetic force;
- shell of the transmission gear train (500): machine parts installed for constituting the clutch control reversible transmission wheel system with bidirectional input and one-way output;
- machine body (600): a relatively static mechanism structure;
- the input shaft (2000) is perforating through the one-way transmission (305), and then integrated with the transmission wheel (602);
- the transmission wheel (602) and the transmission wheel (603) are transmitted in different rotary directions, the transmission wheel (603) and the transmission wheel (606) are co-integrated with the revolving shaft (604), and a bearing is installed between the revolving shaft (604) and the shell of the transmission gear train (500);

the transmission wheel (606) and the transmission wheel (605) are constituted by the pulley or the sprocket that are transmitted by the transmission belt (607) to constituted a transmission wheel set with the same rotary direction;

the connectable or releasable clutch device (701) is installed between the transmission wheel (615) and the output shaft (3000);

the shell of the transmission gear train (500) is fixed at the machine body (600);

the transmission wheels (602) and (603) are constituted by gears or friction wheels;

the relation of the transmission ratio between the transmission wheel set with different rotary directions includes acceleration, deceleration, or constant velocity;

the relation of the transmission ratio between the transmission wheel set with the same rotary direction includes acceleration, deceleration, or constant velocity;

the transmission wheel set with the same rotary direction are constituted by transmission belt, pulley (such as toothed belt or steel belt), or sprocket with chain;

by way of the above structures, the input shaft (2000) is driven at the first rotary direction, and is through the connectable or releasable clutch device (700) and the one-way transmission (301) for driving the output shaft (3000) to produce the first rotary direction output to constitute the first transmission gear train;

by way of the above structures, if the connectable or releasable clutch device (701) is locked, the input shaft (2000) is driven at the second rotary direction, and is through the one-way transmission (305) driving the transmission wheel (602), and through the transmission wheel (602) driving the transmission wheel (603) and the transmission wheel (606), and through the transmission wheel (606) via the transmission belt (607) for further driving the transmission wheel (605), and then the transmission wheel (605) via the connectable or releasable clutch device (701) for driving the output shaft (3000) to produce the first rotary direction output to constitute the second transmission gear train;

when reverse drive caused by back move occurs at the output shaft (3000), through releasing the connectable or releasable clutch device (700) and/or the connectable or releasable clutch device (701), the first transmission gear train and the second transmission gear train are prevented from lock status; and if the connectable or releasable clutch device (700) and the connectable or releasable clutch device (701) are released, the transmission status between the input shaft (2000) and the output shaft (3000) is in disengagement.

Figure 36:
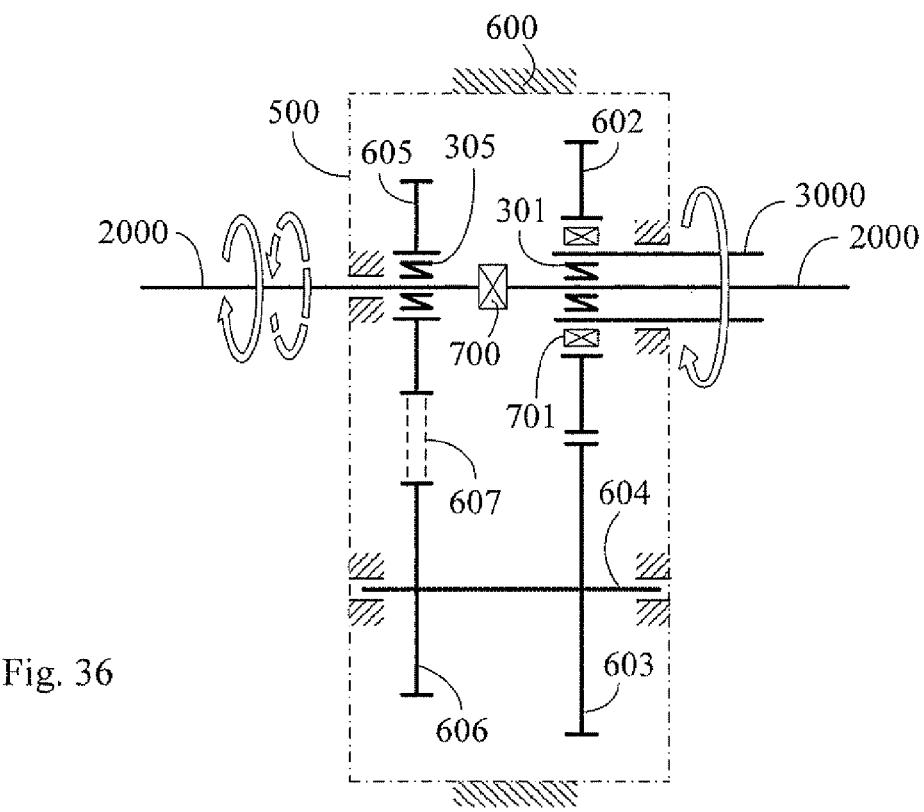
FIG. 36 is a structural schematic view showing the 8th embodiment of the clutch control reversible transmission wheel system with bidirectional input and one-way output constituted by integrating with the transmissions with different drive rotary directions, according to the present invention.

FIG. 36 is a structural schematic view showing the 8th embodiment of the clutch control reversible transmission wheel system with bidirectional input and one-way output constituted by integrating with the transmissions with different drive rotary directions, according to the present invention.

As shown in FIG. 36, the clutch control reversible transmission wheel system with bidirectional input and one-way output of the present invention is constituted by integrating with the transmissions with different drive rotating directions with the input shaft and the output shaft coaxial fitting, the main components including:

one end of the input shaft (2000) is through installed at one side of the shell of the transmission gear train (500) via a bearing structure, the other end of the input shaft (2000) is perforating through the output shaft (3000) via the connectable or releasable clutch device (700) and the one-way transmission (301), a bearing is installed between the output shaft (3000) and the shell of the transmission gear train (500);

connectable or releasable clutch devices (700), (701): related to mechanisms driven to be connected or released by human power, or machine power, or aerodynamic force, or fluid power, or electromagnetic force;

shell of the transmission gear train (500): machine parts installed for constituting the clutch control reversible transmission wheel system with bidirectional input and one-way output;

machine body (600): a relatively static mechanism structure;

the input shaft (2000) is perforating through the one-way transmission (305), and then integrated with the transmission wheel (605);

the transmission wheel (605) drives the transmission wheel (606) via the transmission belt (607), the transmission wheel (606) and the transmission wheel (603) are co-integrated with the revolving shaft (604), and a bearing is installed between the revolving shaft (604) and the shell of the transmission gear train (500);

the transmission wheel (603) and the transmission wheel (602) are integrated for a transmission wheel set with different rotary directions;

the connectable or releasable clutch device (701) is installed between the transmission wheel (602) and the output shaft (3000);

the shell of the transmission gear train (500) is fixed at the machine body (600);

the transmission wheels (602) and (603) are constituted by gears or friction wheels;

the relation of the transmission ratio between the transmission wheel set with different rotary directions includes acceleration, deceleration, or constant velocity;

the relation of the transmission ratio between the transmission wheel set with the same rotary direction includes acceleration, deceleration, or constant velocity;

the transmission wheel set with the same rotary direction is constituted by transmission belt, pulley (such as toothed belt or steel belt), or sprocket with chain;

by way of the above structures, the input shaft (2000) is driven at the first rotary direction, and is through the connectable or releasable clutch device (701) and the one-way transmission (301) for driving the output shaft (3000) to produce the first rotary direction output to constitute the first transmission gear train;

by way of the above structures, if the connectable or releasable clutch device (701) is locked, the input shaft (2000) is driven at the second rotary direction, and is through the one-way transmission (305) driving the transmission wheel (605), and through the transmission wheel (605) driving the transmission wheel (606) via the transmission belt (607), and then through the transmission wheel (606) via the revolving shaft (604) for driving the transmission wheel (603), and further through the transmission wheel (603) driving the transmission wheel (602), and the transmission wheel (602) via the connectable or releasable clutch device (701) for driving the output shaft (3000) to produce the first rotary direction output to constitute the second transmission gear train;

when reverse drive caused by back move occurs at the output shaft (3000), through releasing the connectable or releasable clutch device (700) and/or the connectable or releasable clutch device (701), the first transmission gear train and the second transmission gear train are prevented from lock status; and if the connectable or releasable clutch device (700) and the connectable or releasable clutch device (701) are released, the transmission status between the input shaft (2000) and the output shaft (3000) is in disengagement.

Figure 37:
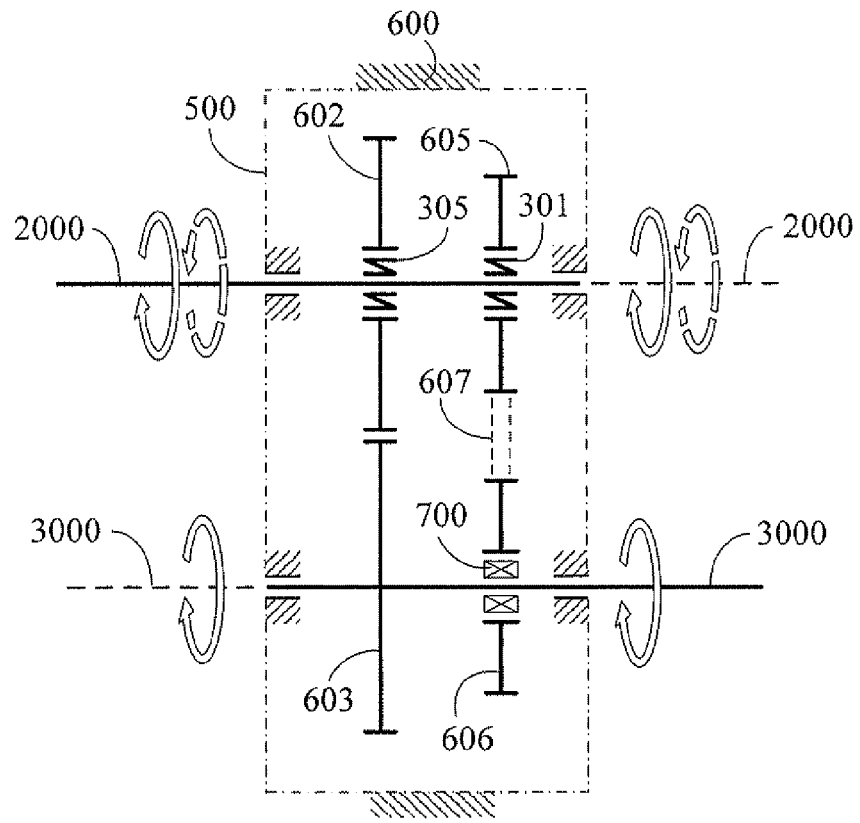
FIG. 37 is a structural schematic view showing the 9th embodiment of the clutch control reversible transmission wheel system with bidirectional input and one-way output constituted by integrating with the transmissions with different drive rotary directions, according to the present invention.

FIG. 37 is a structural schematic view showing the 9th embodiment of the clutch control reversible transmission wheel system with bidirectional input and one-way output constituted by integrating with the transmissions with different drive rotary directions, according to the present invention.

As shown in FIG. 37, the clutch control reversible transmission wheel system with bidirectional input and one-way output of the present invention is constituted by integrating with the transmissions with different drive rotating directions, in which the input shaft and the output shaft have different axes, the main components including:

- one end of the input shaft (2000) is through installed at one side of the shell of the transmission gear train (500) via a bearing structure, the other end of the input shaft (2000) is perforating through the transmission wheel (605) via the one-way transmission (301), a bearing is installed between the other end of the input shaft (2000) and the shell of the transmission gear train (500), and the rotary power source is provided through one or two ends of the input shaft (2000);
- connectable or releasable clutch device (700): related to a mechanism driven to be connected or released by human power, or machine power, or aerodynamic force, or fluid power, or electromagnetic force;
- shell of the transmission gear train (500): machine parts installed for constituting the clutch control reversible transmission wheel system with bidirectional input and one-way output;
- machine body (600): a relatively static mechanism structure;
- the input shaft (2000) is perforating through the one-way transmission (305), and then integrated with the transmission wheel (602);
- the transmission wheel (602) and the transmission wheel (603) are transmitted in different rotary directions, the transmission wheel (603) is integrated with the output shaft (3000), the transmission wheel (606) is integrated with the output shaft (3000) via the connectable or releasable clutch device (700), and a bearing is installed between the output shaft (3000) and the shell of the transmission gear train (500);
- the transmission wheel (605) and the transmission wheel (606) are constituted by the pulley or the sprocket that are transmitted by the transmission belt (607) to constituted a transmission wheel set with the same rotary direction;
- the connectable or releasable clutch device (700) is installed between the transmission wheel (606) and the output shaft (3000);
- the shell of the transmission gear train (500) is fixed at the machine body (600);
- the transmission wheels (602) and (603) are constituted by gears or friction wheels;
- the relation of the transmission ratio between the transmission wheel set with different rotary directions includes acceleration, deceleration, or constant velocity;
- the relation of the transmission ratio between the transmission wheel set with the same rotary direction includes acceleration, deceleration, or constant velocity;
- the transmission wheel set with the same rotary direction is constituted by transmission belt, pulley (such as toothed belt or steel belt), or sprocket with chain;
- by way of the above structures, if the connectable or releasable clutch device (700) is locked, the input shaft (2000) is driven at the first rotary direction, and is through the one-way transmission (301) for driving the transmission wheel (605), and through the transmission belt (607) for driving the transmission wheel (606), and then through the connectable or releasable clutch device (700) for driving the output shaft (3000) to produce the first rotary direction output to constitute the first transmission gear train;
- by way of the above structures, the input shaft (2000) is driven at the second rotary direction, and is through the one-way transmission (305) driving the transmission wheel (602), and then through the transmission wheel (602) driving the transmission wheel (603) for driving the output shaft (3000) to produce the first rotary direction output to constitute the second transmission gear train;
- when reverse drive caused by back move occurs at the output shaft (3000), through releasing the connectable or releasable clutch device (700), the first transmission gear train and the second transmission gear train are prevented from lock status; and
- one or two ends of the output shaft (3000) is arranged for executing output.

Figure 38:
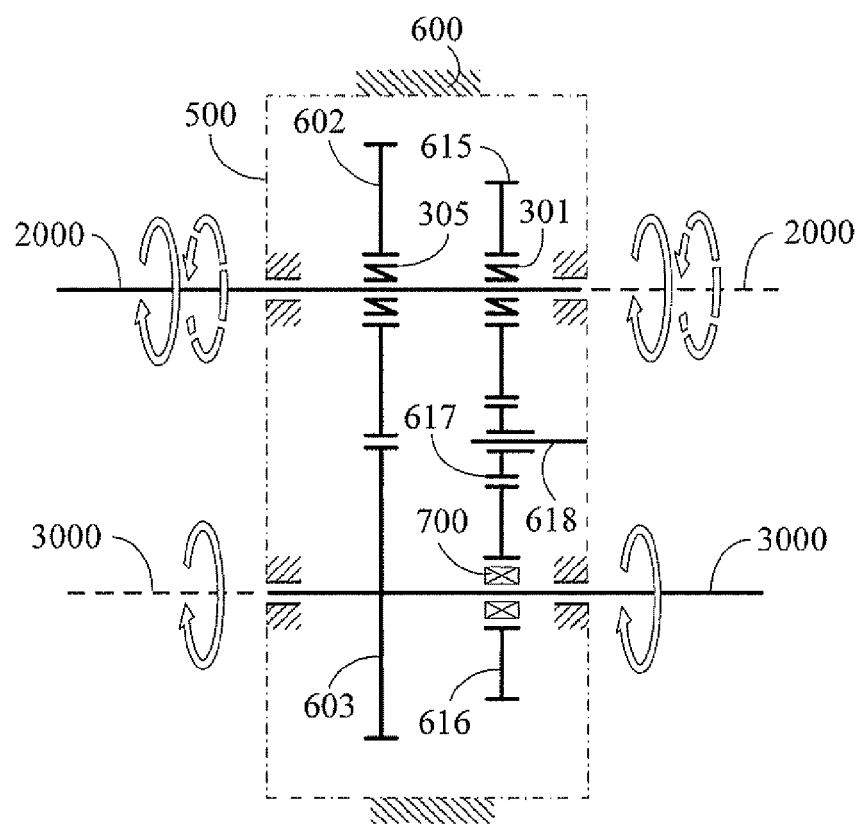
FIG. 38 is a structural schematic view showing the 10th embodiment of the clutch control reversible transmission wheel system with bidirectional input and one-way output constituted by integrating with the transmissions with different drive rotary directions, according to the present invention.

FIG. 38 is a structural schematic view showing the 10th embodiment of the clutch control reversible transmission wheel system with bidirectional input and one-way output constituted by integrating with the transmissions with different drive rotary directions, according to the present invention.

As shown in FIG. 38, the clutch control reversible transmission wheel system with bidirectional input and one-way output of the present invention is constituted by integrating with the transmissions with different drive rotating directions, in which the input shaft and the output shaft have different axes, the main components including:

- one end of the input shaft (2000) is through installed at one side of the shell of the transmission gear train (500) via a bearing structure, the other end of the input shaft (2000) is perforating through the transmission wheel (615) via the one-way transmission (301), a bearing is installed between the other end of the input shaft (2000) and the shell of the transmission gear train (500), and the rotary power source is inputted through one or two ends of the input shaft (2000);
- connectable or releasable clutch device (700): related to a mechanism driven to be connected or released by human power, or machine power, or aerodynamic force, or fluid power, or electromagnetic force;
- shell of the transmission gear train (500): machine parts installed for constituting the clutch control reversible transmission wheel system with bidirectional input and one-way output;
- machine body (600): a relatively static mechanism structure;
- the input shaft (2000) is perforating through the one-way transmission (305), and then integrated with the transmission wheel (602);
- the transmission wheel (615) drives the transmission wheel (616) via the transmission wheel (617), the transmission wheel (616) is integrated with the output shaft (3000) via the connectable or releasable clutch device (700), and a bearing is installed between the output shaft (3000) and the shell of the transmission gear train (500);
- the transmission wheel (617) rotates at the revolving shaft (618), and the revolving shaft (618) is installed at the shell of the transmission gear train (500);

the transmission wheel (602) and the transmission wheel (603) are transmitted in different rotary directions;

the transmission wheel (603) is integrated with the output shaft (3000);

the shell of the transmission gear train (500) is fixed at the machine body (600);

the transmission wheels (602), (603), (615), (616), and (617) are constituted by gears or friction wheels;

the relation of the transmission ratio between the transmission wheel set with different rotary directions includes acceleration, deceleration, or constant velocity;

the relation of the transmission ratio between the transmission wheel set with the same rotary direction includes acceleration, deceleration, or constant velocity;

the transmission wheel set with the same rotary direction is constituted by the gear set including an idler wheel or by the internal gear set;

by way of the above structures, the input shaft (2000) is driven at the first rotary direction, and is through the one-way transmission (301) for driving the transmission wheel (615), and through the transmission belt (617) for driving the transmission wheel (616), and then via the connectable or releasable clutch device (700) in connected status for driving the output shaft (3000) to produce the first rotary direction output to constitute the first transmission gear train;

by way of the above structures, the input shaft (2000) is driven at the second rotary direction, and is through the one-way transmission (305) driving the transmission wheel (602), and through the transmission wheel (602) driving the transmission wheel (603), and then through the transmission wheel (603) driving the output shaft (3000) to produce the first rotary direction output to constitute the second transmission gear train;

when reverse drive caused by back move occurs at the output shaft (3000), through releasing the connectable or releasable clutch device (700), the first transmission gear train and the second transmission gear train are prevented from lock status; and one or two ends of the output shaft (3000) is arranged for executing output.

Figure 39:
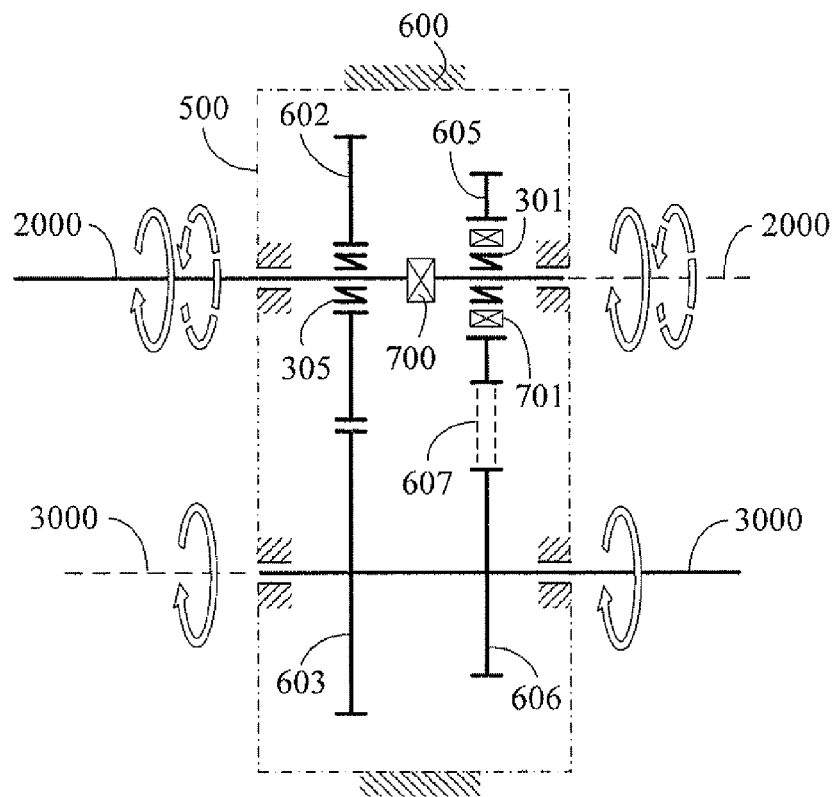
FIG. 39 is a structural schematic view showing the 11th embodiment of the clutch control reversible transmission wheel system with bidirectional input and one-way output constituted by integrating with the transmissions with different drive rotary directions, according to the present invention.

FIG. 39 is a structural schematic view showing the 11th embodiment of the clutch control reversible transmission wheel system with bidirectional input and one-way output constituted by integrating with the transmissions with different drive rotary directions, according to the present invention.

As shown in FIG. 39, the clutch control reversible transmission wheel system with bidirectional input and one-way output is constituted by integrating with the transmissions with different drive rotating directions, in which the input shaft and the output shaft have different axes, the main components including:

one end of the input shaft (2000) is through installed at one side of the shell of the transmission gear train (500) via a bearing structure, the other end of the input shaft (2000) is via the connectable or releasable clutch device (700) coaxially installed in series, a bearing is installed between the input shaft (2000) and the shell of the transmission gear train (500), and the rotary power source is inputted through one or two ends of the input shaft (2000);

connectable or releasable clutch devices (700) and (701): related to mechanisms driven to be connected or released by human power, or machine power, or aerodynamic force, or fluid power, or electromagnetic force;

shell of the transmission gear train (500): machine parts installed for constituting the clutch control reversible transmission wheel system with bidirectional input and one-way output;

machine body (600): a relatively static mechanism structure;

the input shaft (2000) is perforating through the transmission wheel (602), and the one-way transmission (305) is installed between the above both;

the transmission wheel (602) and the transmission wheel (603) are transmitted in different rotary directions, the transmission wheel (603) is integrated with the output shaft (3000), and a bearing is installed between the output shaft (3000) and the shell of the transmission gear train (500);

the one-way transmission (301) is installed between the input shaft (2000) and the transmission wheel (605);

the transmission wheel (605) drives the transmission wheel (606) via the transmission belt (607);

the connectable or releasable clutch device (701) is installed between the transmission wheel (606) and the output shaft (3000);

the shell of the transmission gear train (500) is fixed at the machine body (600);

the transmission wheels (602) and (603) are constituted by gears or friction wheels;

the relation of the transmission ratio between the transmission wheel set with different rotary directions includes acceleration, deceleration, or constant velocity;

the relation of the transmission ratio between the transmission wheel set with the same rotary direction includes acceleration, deceleration, or constant velocity;

the transmission wheel set with the same rotary direction is constituted by transmission belt, pulley (such as toothed belt or steel belt), or sprocket with chain;

by way of the above structures, the input shaft (2000) is driven at the first rotary direction, and is through the connectable or releasable clutch device (700) in connected status and the one-way transmission (301) for driving the transmission wheel (605), and through the transmission belt (607) driving the transmission wheel (606), and then through the connectable or releasable clutch device (701) in connected status for driving the output shaft (3000) to produce the first rotary direction output to constitute the first transmission gear train;

by way of the above structures, the input shaft (2000) is driven at the second rotary direction, and is through the one-way transmission (305) driving the transmission wheel (602), and through the transmission wheel (602) driving the transmission wheel (603), and then through the transmission wheel (603) driving the output shaft (3000) to produce the first rotary direction output to constitute the second transmission gear train;

when reverse drive caused by back move occurs at the output shaft (3000), through releasing the connectable or releasable clutch device (700), the first transmission gear train and the second transmission gear train are prevented from lock status;

if the connectable or releasable clutch device (700) and the connectable or releasable clutch device (701) are released, the transmission status between the input shaft (2000) and the output shaft (3000) is in disengagement; and one or two ends of the output shaft (3000) is arranged for executing output.

Figure 40:
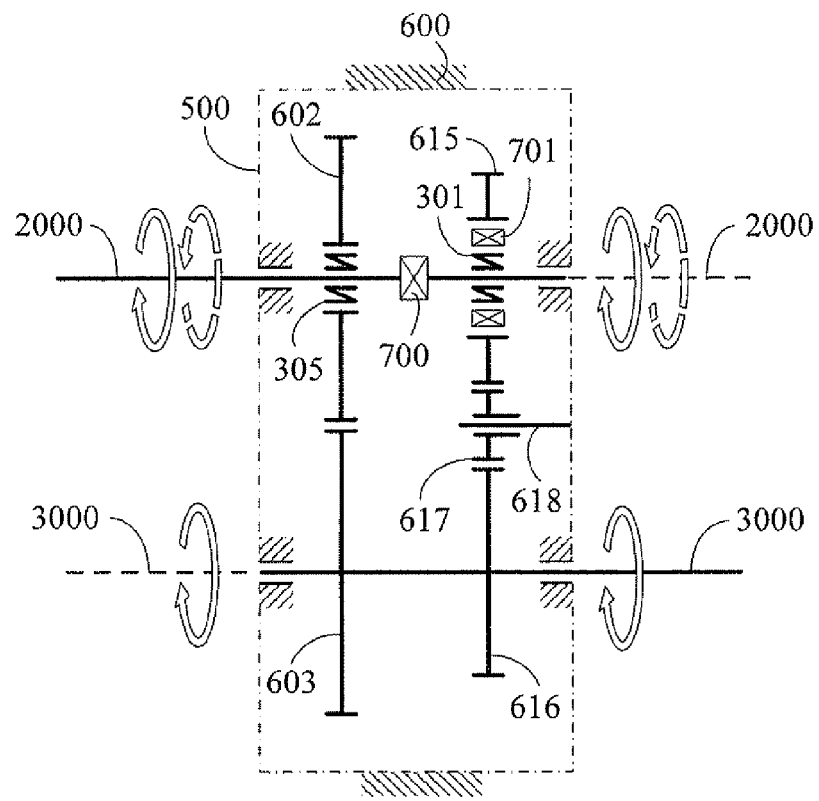
FIG. 40 is a structural schematic view showing the 12th embodiment of the clutch control reversible transmission wheel system with bidirectional input and one-way output constituted by integrating with the transmissions with different drive rotary directions, according to the present invention.

FIG. 40 is a structural schematic view showing the 12th embodiment of the clutch control reversible transmission wheel system with bidirectional input and one-way output constituted by integrating with the transmissions with different drive rotary directions, according to the present invention.

As shown in FIG. 40, the clutch control reversible transmission wheel system with bidirectional input and one-way output of the present invention is constituted by integrating with the transmissions with different drive rotating directions with the input shaft and the output shaft coaxially installed in series, the main components including:

one end of the input shaft (2000) is through installed at one side of the shell of the transmission gear train (500) via a bearing structure, the other end of the input shaft (2000) is via the connectable or releasable clutch device (700) coaxially installed in series, a bearing is installed between the input shaft (2000) and the shell of the transmission gear train (500), and the rotary power source is inputted through one or two ends of the input shaft (2000);

connectable or releasable clutch devices (700) and (701): related to mechanisms driven to be connected or released by human power, or machine power, or aerodynamic force, or fluid power, or electromagnetic force;

shell of the transmission gear train (500): machine parts installed for constituting the clutch control reversible transmission wheel system with bidirectional input and one-way output;

machine body (600): a relatively static mechanism structure;

the input shaft (2000) is perforating through the transmission wheel (615), and the one-way transmission (301) is installed between the above both;

the transmission wheel (615) is via the transmission wheel (617) rotating at the revolving shaft (618) to drive the transmission wheel (616), the connectable or releasable clutch device (701) is installed between the transmission wheel (616) and the output shaft (3000), and a bearing is installed between the output shaft (3000) and the shell of the transmission gear train (500);

the revolving shaft (618) is integrated with the shell of the transmission gear train (500);

the transmission wheel (603) and the transmission wheel (602) are integrated for a transmission wheel set with different rotary directions;

the transmission wheel (603) is integrated with the output shaft (3000);

the shell of the transmission gear train (500) is fixed at the machine body (600);

the transmission wheels (602), (603), (615), (616), (617) are constituted by gears or friction wheels;

the relation of the transmission ratio between the transmission wheel set with different rotary directions includes acceleration, deceleration, or constant velocity;

the relation of the transmission ratio between the transmission wheel set with the same rotary direction includes acceleration, deceleration, or constant velocity;

the transmission wheel set with the same rotary direction is constituted by the gear set including an idler wheel or by the internal gear set;

by way of the above structures, the input shaft (2000) is driven at the first rotary direction, and is through the connectable or releasable clutch device (700) in connected status and the one-way transmission (301) for driving the transmission wheel (615), and through the transmission belt (617) for driving the transmission wheel (616), and then through the transmission wheel (616) via the connectable or releasable clutch device (701) in connected status for driving the output shaft (3000) to produce the first rotary direction output to constitute the first transmission gear train;

by way of the above structures, the input shaft (2000) is driven at the second rotary direction, and is through the one-way transmission (305) driving the transmission wheel (602), and through the transmission wheel (602) driving the transmission wheel (603), and then through the transmission wheel (603) driving the output shaft (3000) to produce the first rotary direction output to constitute the second transmission gear train;

when reverse drive caused by back move occurs at the output shaft (3000), through releasing the connectable or releasable clutch device (700), the first transmission gear train and the second transmission gear train are prevented from lock status;

if the connectable or releasable clutch device (700) and the connectable or releasable clutch device (701) are released, the transmission status between the input shaft (2000) and the output shaft (3000) is in disengagement; and one or two ends of the output shaft (3000) is arranged for executing output.

The invention claimed is:

1. A clutch control reversible transmission wheel system with bidirectional input and one-way output, comprising:
   an input shaft (2000);
   an output shaft (3000);
   a first gear train for transmitting power from said bi-directional input to said one-way output to cause rotation of said output shaft (3000) in a one-way output direction when said bi-directional input (shaft (2000) is rotated in a first input direction;
   a second gear train for transmitting power from said bi-directional input to said one-way output to cause rotation of said output shaft (3000) in said one-way output direction when said bi-directional input shaft (2000) is rotated in a second input direction opposite the first input direction;
   at least a first one-way transmission (301) installed between said first and second gear trains for preventing interference between said first and second gear trains when one of the first and second gear trains is transmitting power from the input shaft (2000) to the output shaft (3000); and
   a connectable or releasable clutch device installed between said input shaft (2000) and said output shaft (3000) in one of said first and second gear trains for releasing said one of said first and second gear trains to prevent locking of said transmission wheel system when a reverse torque is a applied to said output shaft (3000) in a direction opposite said one-way output direction.

2. A clutch control reversible transmission wheel system with bidirectional input and one-way output as claimed in claim 1, wherein said first gear train or said second gear train includes at least one of the following transmission elements: a gear, friction wheel, pulley and belt, sprocket and chain, transmission linkage, and liquid-activated rotary transmission.

3. A clutch control reversible transmission wheel system with bidirectional input and one-way output as claimed in claim 1, wherein said input shaft is arranged to be driven by one of human powered input device, a machine power input device, a hydraulic or pneumatic driving motor, and an electric motor.

4. A clutch control reversible transmission wheel system with bidirectional input and one-way output as claimed in claim 1, wherein said connectable or releasable clutch device (700) is connected and released one of human power, machine power, aerodynamic force, fluid power, and electromagnetic force.

5. A clutch control reversible transmission wheel system with bidirectional input and one-way output as claimed in claim 1, wherein:
said output shaft (3000) is coaxial with the input shaft (2000),
said first gear train includes a planetary gear train,
said second gear train includes said connectable or releasable clutch device (700) and said connectable or releasable clutch device (700) is connected in series between said input shaft (2000) and said output shaft (3000), and
said at least one first one-way transmission (301) is connected between said planetary gear train and said output shaft (3000).

6. A clutch control reversible transmission wheel system with bidirectional input and one-way output as claimed in claim 5, wherein:
the planetary gear train includes:
a sun wheel (202) connected to the input shaft (2000);
a ring gear (204) connected to the output shaft (3000) via said first one-way transmission (301); and
at least one planetary wheel (203) having a shaft fixed to a shell (500) of the planetary gear train.

7. A clutch control reversible transmission wheel system with bidirectional input and one-way output as claimed in claim 6, further comprising a second one-way transmission (305) connected between the input shaft (2000) and the sun wheel (202).

8. A clutch control reversible transmission wheel system with bidirectional input and one-way output as claimed in claim 5, wherein:
the planetary gear train includes:
a sun wheel (202);
a ring gear (204) connected to the output shaft (3000) via the first one-way transmission (301); and
at least one planetary wheel (203) installed on a planetary wheel support arm annular shelf (200), said shelf (200) including an extension rotatably coupled between the input shaft (2000) and a third one-way transmission (303) fixed to a shell (500) of the planetary gear train.

9. A clutch control reversible transmission wheel system with bidirectional input and one-way output as claimed in claim 5, wherein:
the planetary gear train includes:
a sun wheel (202);
a ring gear (204) connected to the output shaft (3000) via the first one-way transmission (301); and
at least one planetary wheel (203) installed on a planetary wheel support arm annular shelf (200), said shelf (200) rotatably coupled to the input shaft (2000) via a second one-way transmission (303),
wherein said connectable or releasable clutch (700) is situated between said first one-way transmission (301) and one of said sun wheel (202) and said second one-way transmission (303).

10. A clutch control reversible transmission wheel system with bidirectional input and one-way output as claimed in claim 5, wherein:
the planetary gear train includes:
a sun wheel (202);
a ring gear (204) connected to the output shaft (3000) via the first one-way transmission (301); and
at least one planetary wheel (203) installed on a planetary wheel support arm annular shelf (200), said shelf (200) rotatably coupled to the input shaft (2000) via a second one-way transmission (303),
wherein said connectable or releasable clutch (700) is situated between said sun wheel (202) and said first one-way transmission (301).

11. A clutch control reversible transmission wheel system with bidirectional input and one-way output as claimed in claim 5, wherein:
the planetary gear train includes:
a sun wheel (202);
a ring gear (204); and
at least one planetary wheel (203) installed on a planetary wheel support arm annular shelf (200), said shelf (200) rotatably coupled to the output shaft (3000) via said first one-way transmission (301); and
a second one-way transmission (303) is installed between said annular shelf (200) and said ring gear (204).

12. A clutch control reversible transmission wheel system with bidirectional input and one-way output as claimed in claim 5, wherein:
said output shaft (3000) is cylindrical and coaxial with and the input shaft (2000), said input shaft (2000) extending into said output shaft (3000),
said first gear train includes a planetary gear train having a sun wheel (202),
said first gear train also includes said connectable or releasable clutch device (700), which is connected between said input shaft (2000) and said sun wheel (202),
said at least one first one-way transmission (301) is connected between said planetary gear train and said output shaft (3000), and
a second one-way transmission (302) is coupled between the input shaft (2000) and the output shaft (3000).

13. A clutch control reversible transmission wheel system with bidirectional input and one-way output as claimed in claim 12, wherein:
the planetary gear train includes:
a ring gear (204) connected to the output shaft (3000) via said first one-way transmission (301); and
at least one planetary wheel (203) coupled between the sun gear (202) and the ring gear (204) and having a shaft fixed to a shell (500) of the planetary gear train.

14. A clutch control reversible transmission wheel system with bidirectional input and one-way output as claimed in claim 12, wherein:
the planetary gear train includes:
a ring gear (204) extending from said output shaft (3000);
at least one planetary wheel (203) coupled between the sun wheel (202) and the ring gear (204) and installed on a planetary wheel support arm annular shelf (200) including an extending section that extends into the output shaft (3000); and
a third one-way transmission (305) connected between said input shaft (2000) and the connectable and releasable clutch device (700),
wherein the first one-way transmission (301) is connected between the extending section of the annular shelf (200) and the output shaft (3000); and
wherein said third one-way transmission (302) is connected between the input shaft (2000) and the extending section of the annular shelf (200).

15. A clutch control reversible transmission wheel system with bidirectional input and one-way output as claimed in claim 12, wherein:

the planetary gear train includes:
    a ring gear (204) connected to the output shaft (3000) via the first one-way transmission (301); and
    at least one planetary wheel (203) installed on a planetary wheel support arm annular shelf (200) and coupled between the sun wheel (202) and the ring gear (204), said shelf (200) including an extension rotatably coupled between the input shaft (2000) and a third one-way transmission (303) fixed to a shell (500) of the planetary gear train.

16. A clutch control reversible transmission wheel system with bidirectional input and one-way output as claimed in claim 12, wherein:
    the planetary gear train includes:
        a ring gear (204) connected to the output shaft (3000) via the first one-way transmission (301); and
        at least one planetary wheel (203) installed on a planetary wheel support arm annular shelf (200) and coupled between the sun wheel (202) and the ring gear (204), said shelf (200) rotatably coupled to the input shaft (2000) via a third one-way transmission (303).

17. A clutch control reversible transmission wheel system with bidirectional input and one-way output as claimed in claim 12, wherein:
    the planetary gear train includes:
        a ring gear (204) connected to the output shaft (3000) via the first one-way transmission (301); and
        at least one planetary wheel (203) installed on a planetary wheel support arm annular shelf (200) and coupled between the sun wheel (202) and the ring gear (204), said shelf (200) rotatably coupled to the output shaft (3000) via a third one-way transmission (303).

18. A clutch control reversible transmission wheel system with bidirectional input and one-way output as claimed in claim 12, wherein:
    the planetary gear train includes:
        a ring gear (204) connected to the output shaft (3000) via the first one-way transmission (301); and
        at least one planetary wheel (203) installed on a planetary wheel support arm annular shelf (200) and coupled between the sun wheel (202) and the ring gear (204), said shelf (200) rotatably coupled to the ring gear (204) via a third one-way transmission (303), and said first one-way transmission (301) being connected between said ring gear (204) and said output shaft (3000).

19. A clutch control reversible transmission wheel system with bidirectional input and one-way output as claimed in claim 1, wherein:
    said input shaft (2000) and said output shaft (3000) are collinear,
    said first transmission gear train is an epicyclic gear train that includes a first bevel gear (402), a second bevel gear (404) and an epicyclic gear (403) mounted on an epicyclic gear shaft (401),
    said first one-way transmission is coupled between the second bevel gear (404) and the output shaft (3000), and
    said second gear train includes said connectable and releasable clutch device (700) connected in series between input shaft (2000) and said output shaft (3000).

20. A clutch control reversible transmission wheel system with bidirectional input and one-way output as claimed in claim 19, wherein said epicyclic gear shaft (401) is fixed to a shell (500) of the epicyclic gear train.

21. A clutch control reversible transmission wheel system with bidirectional input and one-way output as claimed in claim 20, further comprising a second one-way transmission (305) installed between the input shaft (2000) and the first bevel gear (402).

22. A clutch control reversible transmission wheel system with bidirectional input and one-way output as claimed in claim 19, wherein:
    said epicyclic gear shaft (401) extends from a support arm (400) having an extending section, and
    a second one-way transmission (303) is installed between the extending section of the support arm (400) and a fixed shell (500) of the epicyclic gear train.

23. A clutch control reversible transmission wheel system with bidirectional input and one-way output as claimed in claim 19, wherein:
    said epicyclic gear shaft (401) extends from a support arm (400) coupled to the input shaft (2000) via a second one-way transmission (303) situated on an input side or output side of said first bevel gear (402).

24. A clutch control reversible transmission wheel system with bidirectional input and one-way output as claimed in claim 19, wherein:
    said epicyclic gear shaft (401) extends from a support arm (400) coupled to the output shaft (3000) via a second one-way transmission (303).

25. A clutch control reversible transmission wheel system with bidirectional input and one-way output as claimed in claim 19, wherein:
    said epicyclic gear shaft (401) extends from a support arm (400) coupled to the second bevel gear (404) via a second one-way transmission (303).

26. A clutch control reversible transmission wheel system with bidirectional input and one-way output as claimed in claim 1, wherein:
    said input shaft (2000) is coaxial with and extends into the output shaft (3000), said output shaft (3000) being cylindrical,
    said first transmission gear train is an epicyclic gear train that includes a first bevel gear (402), a second bevel gear (404) and an epicyclic gear (403) mounted on an epicyclic gear shaft (401),
    said first one-way transmission is coupled between the second bevel gear (404) and the output shaft (3000),
    said second gear train includes a second one-way transmission (302) coupled between the input shaft (2000) and the output shaft (3000), and
    said connectable and releasable clutch device (700) is included in said first gear train and connected between said input shaft (2000) and said first bevel gear (402).

27. A clutch control reversible transmission wheel system with bidirectional input and one-way output as claimed in claim 26, wherein said epicyclic gear shaft (401) is fixed to a shell (500) of the epicyclic gear train.

28. A clutch control reversible transmission wheel system with bidirectional input and one-way output as claimed in claim 27, further comprising a third one-way transmission (305) installed between the connectable and releasable clutch device (700) and the first bevel gear (402).

29. A clutch control reversible transmission wheel system with bidirectional input and one-way output as claimed in claim 26, wherein:
    said epicyclic gear shaft (401) extends from a support arm (400) having an extending section, and
    a third one-way transmission (303) is installed between the extending section of the support arm (400) and a fixed shell (500) of the epicyclic gear train.

30. A clutch control reversible transmission wheel system with bidirectional input and one-way output as claimed in claim 19, wherein:
said epicyclic gear shaft (401) extends from a support arm (400) coupled to the input shaft (2000) via a third one-way transmission (303) situated on an input side or an output side of the first bevel gear (402).

31. A clutch control reversible transmission wheel system with bidirectional input and one-way output as claimed in claim 19, wherein:
said epicyclic gear shaft (401) extends from a support arm (400) coupled to the output shaft (3000) via a third one-way transmission (303).

32. A clutch control reversible transmission wheel system with bidirectional input and one-way output as claimed in claim 1,
wherein the input shaft (2000) and the output shaft (3000) are coaxial,
wherein the first gear train comprises:
a first driving wheel (602);
a second driving wheel (603) engaged with and driven by said first driving wheel (602);
a first shaft (604) driven by the second driving wheel (603);
a third driving wheel (616) engaged with and driven by the first shaft (604);
a fourth driving wheel (617) rotatably mounted on a shaft (618) and driven by the third driving wheel (616); and
a fifth driving wheel (615) driven by the fourth driving wheel (617),
wherein the second gear train comprises said first one-way transmission (301) installed between the input shaft (2000) and the output shaft (3000) to drive said output shaft (3000) in said output direction when said input shaft (2000) is rotated in said first input direction,
wherein a second one-way transmission (305) is installed between the input shaft (2000) and the first driving wheel (602) to drive said first driving wheel (602) when the input shaft (2000) is rotated in said second input direction, and
wherein said connectable and releasable clutch device (700) is installed between said fifth driving wheel (615) and said output shaft (3000).

33. A clutch control reversible transmission wheel system with bidirectional input and one-way output as claimed in claim 1,
wherein the input shaft (2000) and the output shaft (3000) are coaxial,
wherein the first gear train comprises:
a first driving wheel (615);
a second driving wheel (617) rotatably mounted on a shaft (618) and driven by said first driving wheel (615);
a third driving wheel (616) driven by the second driving wheel (617);
a first shaft (604) driven by the second driving wheel (617);
a fourth driving wheel (603) engaged with and driven by the first shaft (604);
a fifth driving wheel (602) driven by the fourth driving wheel (603),
wherein the second gear train comprises said first one-way transmission (301) installed between the input shaft (2000) and the output shaft (3000) to drive said output shaft (3000) in said output direction when said input shaft (2000) is rotated in said first input direction,
wherein a second one-way transmission (305) is installed between the input shaft (2000) and the first driving wheel (615) to drive said first driving wheel (615) when the input shaft (2000) is rotated in said second input direction, and
wherein said connectable and releasable clutch device (700) is installed between said fifth driving wheel (602) and said output shaft (3000).

34. A clutch control reversible transmission wheel system with bidirectional input and one-way output as claimed in claim 1,
wherein the input shaft (2000) and the output shaft (3000) are coaxial,
wherein the first gear train comprises:
a first driving wheel (602);
a second driving wheel (603) engaged with and driven by said first driving wheel (602);
a first shaft (604) driven by the second driving wheel (603);
a third driving wheel (606) engaged with and driven by the first shaft (604);
a transmission belt or chain (607) driven by the third driving wheel (606); and
a fourth driving wheel (605) driven by the transmission belt or chain (607),
wherein the second gear train comprises said first one-way transmission (301) installed between the input shaft (2000) and the output shaft (3000) to drive said output shaft (3000) in said output direction when said input shaft (2000) is rotated in said first input direction,
wherein a second one-way transmission (305) is installed between the input shaft (2000) and the first driving wheel (602) to drive said first driving wheel (602) when the input shaft (2000) is rotated in said second input direction, and
wherein said connectable and releasable clutch device (700) is installed between said fourth driving wheel (605) and said output shaft (3000).

35. A clutch control reversible transmission wheel system with bidirectional input and one-way output as claimed in claim 1,
wherein the input shaft (2000) and the output shaft (3000) are coaxial,
wherein the first gear train comprises:
a first driving wheel (605);
a transmission belt or chain (607) driven by said first driving wheel (605);
a second driving wheel (606) driven by the transmission belt or chain (607);
a first shaft (604) driven by the second driving wheel (606);
a third driving wheel (603) engaged with and driven by the first shaft (604);
a fourth driving wheel (602) driven by the third driving wheel (603),
wherein the second gear train comprises said first one-way transmission (301) installed between the input shaft (2000) and the output shaft (3000) to drive said output shaft (3000) in said output direction when said input shaft (2000) is rotated in said first input direction,
wherein a second one-way transmission (305) is installed between the input shaft (2000) and the first driving wheel (605) to drive said first driving wheel (605) when the input shaft (2000) is rotated in said second input direction, and wherein said connectable and releasable clutch device (700) is installed between said fourth driving wheel (602) and said output shaft (3000).

36. A clutch control reversible transmission wheel system with bidirectional input and one-way output as claimed in claim 1,
    wherein the input shaft (2000) and the output shaft (3000) are coaxial,
    wherein the first gear train comprises:
        a first driving wheel (602);
        a second driving wheel (603) engaged with and driven by said first driving wheel (602);
        a first shaft (604) driven by the second driving wheel (603);
        a third driving wheel (616) engaged with and driven by the first shaft (604);
        a fourth driving wheel (617) rotatably mounted on a shaft (618) and driven by the third driving wheel (616); and
        a fifth driving wheel (615) driven by the fourth driving wheel (617),
    wherein the second gear train comprises said first one-way transmission (301) installed between the input shaft (2000) and the output shaft (3000) to drive said output shaft (3000) in said output direction when said input shaft (2000) is rotated in said first input direction,
    wherein a second one-way transmission (305) is installed between the input shaft (2000) and the first driving wheel (602) to drive said first driving wheel (602) when the input shaft (2000) is rotated in said second input direction,
    wherein said connectable and releasable clutch device (700) is installed in series in said input shaft (2000) between said first one-way transmission (301) and said second one-way transmission (305), and
    further comprising a second connectable and releasable clutch device (701) installed between said fifth driving wheel (615) and said output shaft (3000).

37. A clutch control reversible transmission wheel system with bidirectional input and one-way output as claimed in claim 1,
    wherein the input shaft (2000) and the output shaft (3000) are coaxial,
    wherein the first gear train comprises:
        a first driving wheel (615);
        a second driving wheel (617) rotatably mounted on a shaft (618) and driven by said first driving wheel (615);
        a third driving wheel (616) driven by the second driving wheel (617);
        a first shaft (604) driven by the second driving wheel (617);
        a fourth driving wheel (603) engaged with and driven by the first shaft (604);
        a fifth driving wheel (602) driven by the fourth driving wheel (603),
    wherein the second gear train comprises said first one-way transmission (301) installed between the input shaft (2000) and the output shaft (3000) to drive said output shaft (3000) in said output direction when said input shaft (2000) is rotated in said first input direction,
    wherein a second one-way transmission (305) is installed between the input shaft (2000) and the first driving wheel (615) to drive said first driving wheel (615) when the input shaft (2000) is rotated in said second input direction,
    wherein said connectable and releasable clutch device (700) is installed in series in said input shaft (2000) between said first one-way transmission (301) and said second one-way transmission (305), and
    further comprising a second connectable and releasable clutch device (701) installed between said fifth driving wheel (602) and said output shaft (3000).

38. A clutch control reversible transmission wheel system with bidirectional input and one-way output as claimed in claim 1,
    wherein the input shaft (2000) and the output shaft (3000) are coaxial,
    wherein the first gear train comprises:
        a first driving wheel (602);
        a second driving wheel (603) engaged with and driven by said first driving wheel (602);
        a first shaft (604) driven by the second driving wheel (603);
        a third driving wheel (606) engaged with and driven by the first shaft (604);
        a transmission belt or chain (607) driven by the third driving wheel (606); and
        a fourth driving wheel (605) driven by the transmission belt or chain (607),
    wherein the second gear train comprises said first one-way transmission (301) installed between the input shaft (2000) and the output shaft (3000) to drive said output shaft (3000) in said output direction when said input shaft (2000) is rotated in said first input direction,
    wherein a second one-way transmission (305) is installed between the input shaft (2000) and the first driving wheel (602) to drive said first driving wheel (602) when the input shaft (2000) is rotated in said second input direction, and
    wherein said connectable and releasable clutch device (700) is installed in series in said input shaft (2000) between said first one-way transmission (301) and said second one-way transmission (305), and
    further comprising a second connectable and releasable clutch device (701) installed between said fourth driving wheel (605) and said output shaft (3000).

39. A clutch control reversible transmission wheel system with bidirectional input and one-way output as claimed in claim 1,
    wherein the input shaft (2000) and the output shaft (3000) are coaxial,
    wherein the first gear train comprises:
        a first driving wheel (605);
        a transmission belt or chain (607) driven by said first driving wheel (605);
        a second driving wheel (606) driven by the transmission belt or chain (607);
        a first shaft (604) driven by the second driving wheel (606);
        a third driving wheel (603) engaged with and driven by the first shaft (604);
        a fourth driving wheel (602) driven by the fourth driving wheel (603),
    wherein the second gear train comprises said first one-way transmission (301) installed between the input shaft (2000) and the output shaft (3000) to drive said output shaft (3000) in said output direction when said input shaft (2000) is rotated in said first input direction,
    wherein a second one-way transmission (305) is installed between the input shaft (2000) and the first driving wheel (605) to drive said first driving wheel (605) when the input shaft (2000) is rotated in said second input direction, wherein said connectable and releasable clutch device (700) is installed in series in said input shaft (2000) between said first one-way transmission (301) and said second one-way transmission (305), and further comprising a second connectable and releasable clutch device (701) installed between said fourth driving wheel (602) and said output shaft (3000).

40. A clutch control reversible transmission wheel system with bidirectional input and one-way output as claimed in claim 1, wherein the first gear train comprises:
a first driving wheel (602) driven by the input shaft (2000) through a second one-way transmission (305) when the input shaft (2000) is rotated in said first input direction; and
a second driving wheel (603) mounted on the output shaft (3000) and driven by the first driving wheel (602);

wherein the second gear train comprises:
a third driving wheel (605) driven by the input shaft (2000) through the first one-way transmission (301) when the input shaft (2000) is rotated in the second input direction;
a transmission belt or chain (607) driven by the third driving wheel (605);
a fourth driving wheel (606) rotatably mounted on the output shaft (3000) and driven by the transmission belt or chain (607), and wherein said connectable and releasable clutch device (700) is installed between said fourth driving wheel (606) and said output shaft (3000).

41. A clutch control reversible transmission wheel system with bidirectional input and one-way output as claimed in claim 1, wherein the first gear train comprises:
a first driving wheel (602) driven by the input shaft (2000) through a second one-way transmission (305) when the input shaft (2000) is rotated in said first input direction; and
a second driving wheel (603) mounted on the output shaft (3000) and driven by the first driving wheel (602);

wherein the second gear train comprises:
a third driving wheel (615) driven by the input shaft (2000) through the first one-way transmission (301) when the input shaft (2000) is rotated in the second input direction;
a fourth driving wheel (617) mounted on a shaft (618) and driven by the third driving wheel (615);
a fifth driving wheel (616) rotatably mounted on the output shaft (3000) and driven by the fourth driving wheel (617), and wherein said connectable and releasable clutch device (700) is installed between said fifth driving wheel (616) and said output shaft (3000).

42. A clutch control reversible transmission wheel system with bidirectional input and one-way output as claimed in claim 1, wherein the first gear train comprises:
a first driving wheel (602) driven by the input shaft (2000) through a second one-way transmission (305) when the input shaft (2000) is rotated in said first input direction; and
a second driving wheel (603) mounted on the output shaft (3000) and driven by the first driving wheel (602);

wherein the second gear train comprises:
a third driving wheel (605) driven by the input shaft (2000) through the first one-way transmission (301) when the input shaft (2000) is rotated in the second input direction;
a transmission belt or chain (607) driven by the third driving wheel (605);
a fourth driving wheel (606) rotatably mounted on the output shaft (3000) and driven by the transmission belt or chain (607), wherein said connectable and releasable clutch device (700) is installed in series in said input shaft (2000) between said first one-way transmission (301) and said second one-way transmission (305), and further comprising a second connectable and releasable clutch device (701) installed between said input shaft (2000) and said first one-way transmission (301).

43. A clutch control reversible transmission wheel system with bidirectional input and one-way output as claimed in claim 1, wherein the first gear train comprises:
a first driving wheel (602) driven by the input shaft (2000) through a second one-way transmission (305) when the input shaft (2000) is rotated in said first input direction; and
a second driving wheel (603) mounted on the output shaft (3000) and driven by the first driving wheel (602);

wherein the second gear train comprises:
a third driving wheel (615) driven by the input shaft (2000) through the first one-way transmission (301) when the input shaft (2000) is rotated in the second input direction;
a fourth driving wheel (617) mounted on a shaft (618) and driven by the third driving wheel (615);
a fifth driving wheel (616) rotatably mounted on the output shaft (3000) and driven by the fourth driving wheel (617), wherein said connectable and releasable clutch device (700) is installed in series in said input shaft (2000) between said first one-way transmission (301) and said second one-way transmission (305), and further comprising a second connectable and releasable clutch device (701) installed between said input shaft (2000) and said first one-way transmission (301).

* * * * *